(12) United States Patent
Fadell et al.

(10) Patent No.: US 9,995,499 B2
(45) Date of Patent: Jun. 12, 2018

(54) ELECTRONIC DEVICE CONTROLLER WITH USER-FRIENDLY INSTALLATION FEATURES

(71) Applicant: Google LLC, Mountain View, CA (US)

(72) Inventors: Anthony Michael Fadell, Portola Valley, CA (US); Matthew Lee Rogers, Los Gatos, CA (US); David Sloo, Menlo Park, CA (US); Mark D. Stefanski, Palo Alto, CA (US); Yoky Matsuoka, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 0 days. days.

(21) Appl. No.: 15/400,107

(22) Filed: Jan. 6, 2017

(65) Prior Publication Data

US 2017/0138629 A1 May 18, 2017

Related U.S. Application Data

(63) Continuation of application No. 14/743,699, filed on Jun. 18, 2015, now Pat. No. 9,575,496, which is a
(Continued)

(51) Int. Cl.
| | |
|---|---|
| *F24F 11/00* | (2018.01) |
| *G05B 15/02* | (2006.01) |
| *G05D 23/19* | (2006.01) |

(52) U.S. Cl.
CPC ...... *F24F 11/0012* (2013.01); *F24F 11/0086* (2013.01); *G05B 15/02* (2013.01);
(Continued)

(58) Field of Classification Search
CPC ............... F24F 11/0012; F24F 11/0086; F24F 2011/0091; F24F 2221/32;
(Continued)

(56) References Cited

U.S. PATENT DOCUMENTS

| | | | |
|---|---|---|---|
| 1,639,299 A | 8/1927 | Kinnard | |
| 2,101,637 A | 12/1937 | Howlett | |

(Continued)

FOREIGN PATENT DOCUMENTS

| | | |
|---|---|---|
| CN | 101305248 A | 11/2008 |
| CN | 101522447 A | 9/2009 |

(Continued)

OTHER PUBLICATIONS

Energy Joule. Ambient Devices, Jul. 23, 2011. Retrieved from the Internet: <http://web.archive.org/web/20110723210421/http://www.ambientdevices.com/products/energyjoule.html> on Aug. 1, 2012, 3 pages.

(Continued)

*Primary Examiner* — Mohammad M Ali
(74) *Attorney, Agent, or Firm* — Kilpatrick Townsend & Stockton LLP

(57) ABSTRACT

Various arrangements for installing or configuring an electronic device are presented. The device may determine which wire connectors of a set of one or more wire connectors have a wire attached. A user inquiry may be output based on the electronic device identifying the wire connector with which the wire has been connected. The electronic device may be operated based on the response to the user inquiry and the electronic device identifying the wire connector with which the wire has been connected.

33 Claims, 21 Drawing Sheets

Related U.S. Application Data continuation of application No. 13/831,152, filed on Mar. 14, 2013, now Pat. No. 9,092,039, which is a continuation-in-part of application No. 13/632,148, filed on Sep. 30, 2012, now Pat. No. 8,544,285, and a continuation-in-part of application No. 13/034,666, filed on Feb. 24, 2011, now Pat. No. 9,494,332, and a continuation-in-part of application No. 13/034,678, filed on Feb. 24, 2011, now Pat. No. 8,752,771, and a continuation-in-part of application No. 13/269,501, filed on Oct. 7, 2011, now Pat. No. 8,918,219.

(60) Provisional application No. 61/627,996, filed on Oct. 21, 2011, provisional application No. 61/415,771, filed on Nov. 19, 2010, provisional application No. 61/429,093, filed on Dec. 31, 2010.

(52) U.S. Cl.
CPC .. *G05D 23/1917* (2013.01); *F24F 2011/0091* (2013.01); *F24F 2221/32* (2013.01); *G05B 2219/2614* (2013.01)

(58) Field of Classification Search
CPC ....... F24F 2011/0038; F24F 2011/0046; F24F 2011/0047; F24F 7/007
USPC .......................................................... 62/157
See application file for complete search history.

(56) References Cited

U.S. PATENT DOCUMENTS

| | | |
|---|---|---|
| 2,492,774 A | 12/1949 | Wild |
| 2,558,648 A | 6/1951 | Gausmann |
| 3,025,484 A | 3/1962 | Cunningham |
| 3,948,441 A | 4/1976 | Perkins et al. |
| 3,991,357 A | 11/1976 | Kaminski |
| 4,049,973 A | 9/1977 | Lambert |
| 4,146,085 A | 3/1979 | Wills |
| 4,157,506 A | 6/1979 | Spencer |
| 4,177,923 A | 12/1979 | Krump |
| 4,249,696 A | 2/1981 | Donnelly et al. |
| 4,267,429 A | 5/1981 | Fleer |
| 4,308,991 A | 1/1982 | Peinetti et al. |
| 4,316,577 A | 2/1982 | Adams et al. |
| 4,421,271 A | 12/1983 | Shavit |
| 4,460,125 A | 7/1984 | Barker et al. |
| 4,528,459 A | 7/1985 | Wiegel |
| 4,610,142 A | 9/1986 | Davis |
| 4,613,139 A | 9/1986 | Robinson, II et al. |
| 4,621,336 A | 11/1986 | Brown |
| 4,632,303 A | 12/1986 | Rodittis |
| 4,669,654 A | 6/1987 | Levine et al. |
| 4,695,246 A | 9/1987 | Beilfuss et al. |
| 4,741,476 A | 5/1988 | Russo et al. |
| 4,751,961 A | 6/1988 | Levine et al. |
| 4,768,706 A | 9/1988 | Parfitt |
| 4,798,971 A | 1/1989 | Gravely |
| 4,842,510 A | 6/1989 | Grunden et al. |
| 4,872,828 A | 10/1989 | Mierzwinski et al. |
| 4,898,229 A | 2/1990 | Brown et al. |
| 4,948,040 A | 8/1990 | Kobayashi et al. |
| 4,948,044 A | 8/1990 | Cacciatore |
| 4,955,806 A | 9/1990 | Grunden et al. |
| 4,971,136 A | 11/1990 | Mathur et al. |
| 5,000,382 A | 3/1991 | Stedman |
| 5,005,365 A | 4/1991 | Lynch |
| D321,903 S | 11/1991 | Chepaitis |
| 5,065,813 A | 11/1991 | Berkeley et al. |
| 5,107,918 A | 4/1992 | McFarlane et al. |
| 5,127,464 A | 7/1992 | Butler et al. |
| 5,158,477 A | 10/1992 | Testa et al. |
| 5,161,606 A | 11/1992 | Berkeley et al. |
| 5,175,439 A | 12/1992 | Haerer et al. |
| 5,181,389 A | 1/1993 | Hanson et al. |
| 5,224,649 A | 7/1993 | Brown et al. |
| 5,251,813 A | 10/1993 | Kniepkamp |
| 5,255,179 A | 10/1993 | Zekan et al. |
| D341,848 S | 11/1993 | Bigelow et al. |
| 5,260,669 A | 11/1993 | Higgins et al. |
| 5,277,363 A | 1/1994 | Hart |
| 5,294,047 A | 3/1994 | Schwer et al. |
| 5,303,612 A | 4/1994 | Odom et al. |
| 5,318,224 A | 6/1994 | Darby et al. |
| 5,347,982 A | 9/1994 | Binzer et al. |
| 5,352,930 A | 10/1994 | Ratz |
| 5,381,950 A | 1/1995 | Aldridge |
| 5,395,042 A | 3/1995 | Riley et al. |
| 5,415,346 A | 5/1995 | Bishop |
| 5,422,808 A | 6/1995 | Catanese, Jr. et al. |
| 5,450,999 A * | 9/1995 | Scholten ............... F24F 11/0009 236/49.3 |
| 5,452,762 A | 9/1995 | Zillner, Jr. |
| 5,456,407 A | 10/1995 | Stalsberg et al. |
| 5,460,327 A | 10/1995 | Hill et al. |
| 5,462,225 A | 10/1995 | Massara et al. |
| 5,467,921 A | 11/1995 | Shreeve et al. |
| 5,482,209 A | 1/1996 | Cochran et al. |
| 5,485,953 A | 1/1996 | Bassett et al. |
| 5,485,954 A * | 1/1996 | Guy .................... G05D 23/1904 236/46 R |
| 5,495,887 A * | 3/1996 | Kathnelson .......... F24F 11/0009 165/11.1 |
| 5,506,569 A | 4/1996 | Rowlette |
| 5,544,036 A | 8/1996 | Brown, Jr. et al. |
| 5,555,927 A | 9/1996 | Shah |
| 5,570,837 A | 11/1996 | Brown et al. |
| 5,595,342 A | 1/1997 | McNair et al. |
| 5,603,451 A | 2/1997 | Helander et al. |
| 5,611,484 A | 3/1997 | Uhrich |
| 5,627,531 A | 5/1997 | Posso et al. |
| 5,634,590 A * | 6/1997 | Gorski ................ G05D 23/1917 236/47 |
| 5,635,896 A | 6/1997 | Tinsley et al. |
| 5,646,349 A | 7/1997 | Twigg et al. |
| 5,655,709 A | 8/1997 | Garnett et al. |
| 5,673,850 A | 10/1997 | Uptegraph |
| 5,690,277 A | 11/1997 | Flood |
| 5,697,552 A | 12/1997 | McHugh et al. |
| 5,736,795 A | 4/1998 | Zuehlke et al. |
| D396,488 S | 7/1998 | Kunkler |
| 5,779,143 A | 7/1998 | Michaud et al. |
| 5,808,294 A | 9/1998 | Neumann |
| 5,808,602 A | 9/1998 | Sellers |
| 5,903,139 A | 5/1999 | Kompelien |
| 5,918,474 A | 7/1999 | Khanpara et al. |
| 5,931,378 A | 8/1999 | Schramm |
| 5,950,709 A | 9/1999 | Krueger et al. |
| 5,957,374 A | 9/1999 | Bias et al. |
| 5,959,621 A | 9/1999 | Nawaz et al. |
| 6,020,881 A | 2/2000 | Naughton et al. |
| 6,032,867 A | 3/2000 | Dushane et al. |
| 6,060,719 A | 5/2000 | DiTucci et al. |
| 6,072,784 A | 6/2000 | Agrawal et al. |
| D428,399 S | 7/2000 | Kahn et al. |
| 6,084,518 A | 7/2000 | Jamieson |
| 6,089,310 A | 7/2000 | Toth et al. |
| 6,093,914 A | 7/2000 | Diekmann et al. |
| 6,095,427 A | 8/2000 | Hoium et al. |
| 6,102,749 A | 8/2000 | Lynn et al. |
| D435,473 S | 12/2000 | Eckel et al. |
| 6,164,374 A | 12/2000 | Rhodes et al. |
| 6,196,468 B1 | 3/2001 | Young |
| 6,206,295 B1 | 3/2001 | LaCoste |
| 6,207,899 B1 | 3/2001 | Gillespie |
| 6,211,921 B1 | 4/2001 | Cherian et al. |
| 6,213,404 B1 | 4/2001 | Dushane et al. |
| 6,222,719 B1 | 4/2001 | Kadah |
| 6,275,160 B1 | 8/2001 | Ha |
| 6,286,764 B1 | 9/2001 | Garvey et al. |
| 6,295,823 B1 | 10/2001 | Odom et al. |
| 6,298,285 B1 | 10/2001 | Addink et al. |
| D450,059 S | 11/2001 | Itou |

(56) References Cited

U.S. PATENT DOCUMENTS

| | | |
|---|---|---|
| 6,315,211 B1 | 11/2001 | Sartain et al. |
| 6,318,639 B1 | 11/2001 | Toth |
| 6,336,593 B1 | 1/2002 | Bhatnagar |
| 6,347,747 B1 | 2/2002 | Nesbitt |
| 6,351,693 B1 | 2/2002 | Monie et al. |
| 6,356,038 B2 | 3/2002 | Bishel |
| 6,437,999 B1 | 8/2002 | Wittenbreder |
| 6,438,241 B1 | 8/2002 | Silfvast et al. |
| 6,453,687 B2 | 9/2002 | Sharood et al. |
| D464,660 S | 10/2002 | Weng et al. |
| 6,460,774 B2 | 10/2002 | Sumida |
| 6,502,758 B2 | 1/2003 | Cottrell |
| 6,509,838 B1 | 1/2003 | Payne et al. |
| 6,513,723 B1 | 2/2003 | Mueller et al. |
| 6,519,509 B1 | 2/2003 | Nierlich et al. |
| D471,825 S | 3/2003 | Peabody |
| 6,560,977 B1 | 5/2003 | Hupfel et al. |
| 6,566,768 B2 | 5/2003 | Zimmerman et al. |
| 6,595,430 B1 | 7/2003 | Shah |
| 6,606,871 B2 | 8/2003 | Butcher |
| 6,622,925 B2 | 9/2003 | Carner et al. |
| 6,623,311 B1 | 9/2003 | Dehan |
| D480,401 S | 10/2003 | Kahn et al. |
| 6,636,197 B1 | 10/2003 | Goldenberg et al. |
| 6,641,054 B2 | 11/2003 | Morey |
| 6,641,055 B1 | 11/2003 | Tiernan |
| 6,644,557 B1 | 11/2003 | Jacobs |
| 6,657,418 B2 | 12/2003 | Atherton |
| D485,279 S | 1/2004 | DeCombe |
| 6,726,112 B1 | 4/2004 | Ho |
| D491,956 S | 6/2004 | Ombao et al. |
| 6,743,010 B2 | 6/2004 | Bridgeman et al. |
| 6,789,739 B2 | 9/2004 | Rosen |
| 6,792,766 B2 | 9/2004 | Osborne et al. |
| 6,794,771 B2 | 9/2004 | Orloff |
| 6,798,341 B1 | 9/2004 | Eckel et al. |
| D497,617 S | 10/2004 | Decombe et al. |
| 6,804,117 B2 | 10/2004 | Phillips et al. |
| 6,814,299 B1 | 11/2004 | Carey |
| 6,824,069 B2 | 11/2004 | Rosen |
| 6,826,454 B2 | 11/2004 | Sulfstede |
| 6,851,621 B1 | 2/2005 | Wacker et al. |
| 6,851,967 B2 | 2/2005 | Miyoshi et al. |
| D503,631 S | 4/2005 | Peabody |
| 6,886,754 B2 | 5/2005 | Smith et al. |
| 6,888,078 B2 | 5/2005 | Loeffelholz et al. |
| 6,888,441 B2 | 5/2005 | Carey |
| 6,933,655 B2 | 8/2005 | Morrison et al. |
| 6,951,306 B2 | 10/2005 | DeLuca |
| 6,956,463 B2 | 10/2005 | Crenella et al. |
| D511,527 S | 11/2005 | Hernandez et al. |
| 6,997,390 B2 | 2/2006 | Alles |
| 7,000,849 B2 | 2/2006 | Ashworth et al. |
| 7,028,912 B1 | 4/2006 | Rosen |
| 7,035,805 B1 | 4/2006 | Miller |
| 7,055,759 B2 | 6/2006 | Wacker et al. |
| 7,083,109 B2 | 8/2006 | Pouchak |
| 7,108,194 B1 | 9/2006 | Hankins, II |
| 7,109,970 B1 | 9/2006 | Miller |
| 7,111,788 B2 | 9/2006 | Reponen |
| 7,114,554 B2 | 10/2006 | Bergman et al. |
| 7,140,551 B2 | 11/2006 | de Pauw et al. |
| 7,141,748 B2 | 11/2006 | Tanaka et al. |
| 7,142,948 B2 | 11/2006 | Metz |
| 7,152,806 B1 | 12/2006 | Rosen |
| 7,156,318 B1 | 1/2007 | Rosen |
| 7,159,789 B2 | 1/2007 | Schwendinger et al. |
| 7,159,790 B2 | 1/2007 | Schwendinger et al. |
| 7,167,079 B2 | 1/2007 | Smyth et al. |
| 7,174,239 B2 | 2/2007 | Butler et al. |
| 7,181,317 B2 | 2/2007 | Amundson et al. |
| 7,188,482 B2 | 3/2007 | Sadegh et al. |
| 7,200,467 B2 | 4/2007 | Schanin et al. |
| 7,209,870 B2 | 4/2007 | Simmons et al. |
| 7,222,494 B2 | 5/2007 | Peterson et al. |
| 7,222,800 B2 | 5/2007 | Wruck |
| 7,225,054 B2 | 5/2007 | Amundson et al. |
| 7,225,057 B2 | 5/2007 | Froman et al. |
| D544,877 S | 6/2007 | Sasser |
| 7,258,280 B2 | 8/2007 | Wolfson |
| D550,691 S | 9/2007 | Hally et al. |
| 7,264,175 B2 | 9/2007 | Schwendinger et al. |
| 7,274,972 B2 | 9/2007 | Amundson et al. |
| 7,287,709 B2 | 10/2007 | Proffitt et al. |
| 7,299,996 B2 | 11/2007 | Garrett et al. |
| 7,302,642 B2 | 11/2007 | Smith et al. |
| 7,331,852 B2 | 2/2008 | Ezell et al. |
| 7,333,880 B2 | 2/2008 | Brewster et al. |
| D566,587 S | 4/2008 | Rosen |
| 7,360,370 B2 | 4/2008 | Shah et al. |
| 7,402,780 B2 | 7/2008 | Mueller |
| 7,418,663 B2 | 8/2008 | Pettinati et al. |
| 7,434,742 B2 | 10/2008 | Mueller et al. |
| 7,440,767 B2 | 10/2008 | Ballay |
| 7,451,937 B2 | 11/2008 | Flood et al. |
| 7,455,240 B2 | 11/2008 | Chapman, Jr. et al. |
| 7,476,988 B2 | 1/2009 | Mulhouse et al. |
| D588,152 S | 3/2009 | Okada |
| 7,509,753 B2 | 3/2009 | Nicosia et al. |
| 7,510,126 B2 | 3/2009 | Rossi et al. |
| D589,792 S | 4/2009 | Clabough et al. |
| D590,412 S | 4/2009 | Saft et al. |
| D593,120 S | 5/2009 | Bouchard et al. |
| 7,537,171 B2 | 5/2009 | Mueller et al. |
| D594,015 S | 6/2009 | Singh et al. |
| D595,309 S | 6/2009 | Saski et al. |
| 7,555,364 B2 | 6/2009 | Poth et al. |
| D596,194 S | 7/2009 | Vu et al. |
| D597,101 S | 7/2009 | Chaudhri et al. |
| 7,558,648 B2 | 7/2009 | Hoglund et al. |
| 7,562,536 B2 | 7/2009 | Harrod et al. |
| 7,566,263 B2 | 7/2009 | Snyder |
| D598,463 S | 8/2009 | Hirsch et al. |
| 7,571,014 B1 | 8/2009 | Lambourne et al. |
| 7,571,865 B2 | 8/2009 | Nicodem et al. |
| 7,575,179 B2 | 8/2009 | Morrow et al. |
| D599,810 S | 9/2009 | Scalisi et al. |
| 7,584,899 B2 | 9/2009 | de Pauw et al. |
| 7,600,694 B2 | 10/2009 | Helt et al. |
| D603,277 S | 11/2009 | Clausen et al. |
| D603,421 S | 11/2009 | Ebeling et al. |
| D604,740 S | 11/2009 | Matheny et al. |
| 7,614,567 B2 | 11/2009 | Chapman, Jr. et al. |
| 7,620,996 B2 | 11/2009 | Torres et al. |
| D607,001 S | 12/2009 | Ording |
| 7,624,931 B2 | 12/2009 | Chapman, Jr. et al. |
| 7,634,504 B2 | 12/2009 | Amundson |
| 7,641,126 B2 | 1/2010 | Schultz et al. |
| 7,644,869 B2 | 1/2010 | Hoglund et al. |
| 7,648,077 B2 | 1/2010 | Rossi et al. |
| 7,667,163 B2 | 2/2010 | Ashworth et al. |
| 7,673,809 B2 | 3/2010 | Juntunen |
| D613,301 S | 4/2010 | Lee et al. |
| D614,194 S | 4/2010 | Guntaur et al. |
| D614,196 S | 4/2010 | Guntaur et al. |
| 7,693,582 B2 | 4/2010 | Bergman et al. |
| 7,703,694 B2 | 4/2010 | Mueller et al. |
| D614,976 S | 5/2010 | Skafdrup et al. |
| D615,546 S | 5/2010 | Lundy et al. |
| D616,460 S | 5/2010 | Pearson et al. |
| 7,721,209 B2 | 5/2010 | Tilton |
| 7,726,581 B2 | 6/2010 | Naujok et al. |
| D619,613 S | 7/2010 | Dunn |
| 7,748,640 B2 | 7/2010 | Roher et al. |
| 7,755,220 B2 | 7/2010 | Sorg et al. |
| 7,761,189 B2 | 7/2010 | Froman et al. |
| 7,775,452 B2 | 8/2010 | Shah et al. |
| 7,802,618 B2 | 9/2010 | Simon et al. |
| D625,325 S | 10/2010 | Vu et al. |
| D625,734 S | 10/2010 | Kurozumi et al. |
| D626,133 S | 10/2010 | Murphy et al. |
| 7,809,472 B1 | 10/2010 | Silva et al. |
| 7,821,218 B2 | 10/2010 | Butler et al. |
| 7,823,076 B2 | 10/2010 | Borovsky et al. |

(56) References Cited

U.S. PATENT DOCUMENTS

| | | |
|---|---|---|
| RE41,922 E | 11/2010 | Gough et al. |
| 7,841,542 B1 | 11/2010 | Rosen |
| 7,844,764 B2 | 11/2010 | Williams |
| 7,845,576 B2 | 12/2010 | Siddaramanna et al. |
| 7,847,681 B2 | 12/2010 | Singhal et al. |
| 7,849,698 B2 | 12/2010 | Harrod |
| 7,861,179 B2 | 12/2010 | Reed |
| D630,649 S | 1/2011 | Tokunaga et al. |
| 7,890,195 B2 | 2/2011 | Bergman et al. |
| 7,900,849 B2 | 3/2011 | Barton et al. |
| 7,904,209 B2 | 3/2011 | Podgorny et al. |
| 7,904,830 B2 | 3/2011 | Hoglund et al. |
| 7,913,925 B2 | 3/2011 | Ashworth |
| D638,835 S | 5/2011 | Akana et al. |
| D640,269 S | 6/2011 | Chen |
| D640,273 S | 6/2011 | Arnold et al. |
| D640,278 S | 6/2011 | Woo |
| D640,285 S | 6/2011 | Woo |
| D641,373 S | 7/2011 | Gardner et al. |
| 7,984,384 B2 | 7/2011 | Chaudhri et al. |
| D643,045 S | 8/2011 | Woo |
| D648,735 S | 11/2011 | Arnold et al. |
| 8,067,912 B2 | 11/2011 | Mullin |
| D651,529 S | 1/2012 | Mongell et al. |
| 8,091,375 B2 | 1/2012 | Crawford |
| 8,091,794 B2 | 1/2012 | Siddaramanna et al. |
| 8,136,052 B2 | 3/2012 | Shin et al. |
| D656,950 S | 4/2012 | Shallcross et al. |
| D656,952 S | 4/2012 | Weir et al. |
| 8,156,060 B2 | 4/2012 | Borzestowski et al. |
| 8,166,395 B2 | 4/2012 | Omi et al. |
| D658,674 S | 5/2012 | Shallcross et al. |
| D660,732 S | 5/2012 | Bould et al. |
| 8,174,381 B2 | 5/2012 | Imes et al. |
| 8,185,164 B2 | 5/2012 | Kim |
| 8,195,313 B1 | 6/2012 | Fadell et al. |
| D663,743 S | 7/2012 | Tanghe et al. |
| D663,744 S | 7/2012 | Tanghe et al. |
| D664,559 S | 7/2012 | Ismail et al. |
| 8,219,249 B2 | 7/2012 | Harrod et al. |
| 8,223,134 B1 | 7/2012 | Forstall et al. |
| 8,234,581 B2 | 7/2012 | Kake |
| D664,978 S | 8/2012 | Tanghe et al. |
| D665,397 S | 8/2012 | Naranjo et al. |
| 8,243,017 B2 | 8/2012 | Brodersen et al. |
| 8,253,704 B2 | 8/2012 | Jang |
| 8,253,747 B2 | 8/2012 | Niles et al. |
| 8,255,090 B2 | 8/2012 | Frader-Thompson et al. |
| 8,265,798 B2 | 9/2012 | Imes |
| 8,280,536 B1 | 10/2012 | Fadell et al. |
| 8,281,244 B2 | 10/2012 | Neuman et al. |
| 8,292,494 B2 | 10/2012 | Rosa et al. |
| D671,136 S | 11/2012 | Barnett et al. |
| 8,316,022 B2 | 11/2012 | Matsuda et al. |
| D673,171 S | 12/2012 | Peters et al. |
| D673,172 S | 12/2012 | Peters et al. |
| 8,341,557 B2 | 12/2012 | Pisula et al. |
| D677,180 S | 3/2013 | Plitkins et al. |
| 8,406,816 B2 | 3/2013 | Marui et al. |
| 8,415,829 B2 | 4/2013 | Di Cristofaro |
| 8,442,695 B2 | 5/2013 | Imes et al. |
| 8,442,752 B2 | 5/2013 | Wijaya et al. |
| 8,446,381 B2 | 5/2013 | Molard et al. |
| 8,489,243 B2 | 7/2013 | Fadell et al. |
| 8,544,285 B2 | 10/2013 | Stefanski et al. |
| 8,554,376 B1 | 10/2013 | Matsuoka et al. |
| 8,594,850 B1 | 11/2013 | Gourlay et al. |
| 8,600,561 B1 | 12/2013 | Modi et al. |
| 8,630,742 B1 | 1/2014 | Stefanski et al. |
| 8,689,572 B2 | 4/2014 | Evans et al. |
| 8,706,270 B2 | 4/2014 | Fadell et al. |
| 8,708,242 B2 | 4/2014 | Conner et al. |
| 8,752,771 B2 | 6/2014 | Warren et al. |
| 8,757,507 B2 | 6/2014 | Fadell et al. |
| 8,918,219 B2 | 12/2014 | Sloo et al. |
| 8,944,338 B2 | 2/2015 | Warren et al. |
| 9,121,623 B2 | 9/2015 | Filson et al. |
| 2002/0005435 A1 | 1/2002 | Cottrell |
| 2002/0074865 A1 | 6/2002 | Zimmerman et al. |
| 2003/0034898 A1 | 2/2003 | Shamoon et al. |
| 2003/0037555 A1 | 2/2003 | Street et al. |
| 2003/0042320 A1 | 3/2003 | Decker |
| 2003/0064335 A1 | 4/2003 | Canon |
| 2003/0069648 A1 | 4/2003 | Douglas et al. |
| 2003/0090243 A1 | 5/2003 | Atherton |
| 2003/0112262 A1 | 6/2003 | Adatia et al. |
| 2003/0154004 A1 | 8/2003 | Kroeger |
| 2003/0231001 A1 | 12/2003 | Bruning |
| 2004/0034484 A1 | 2/2004 | Solomita, Jr. et al. |
| 2004/0055446 A1 | 3/2004 | Robbin et al. |
| 2004/0058637 A1 | 3/2004 | Laiti |
| 2004/0074978 A1 | 4/2004 | Rosen |
| 2004/0113748 A1 | 6/2004 | Carey |
| 2004/0120084 A1 | 6/2004 | Readio et al. |
| 2004/0130454 A1 | 7/2004 | Barton |
| 2004/0164238 A1 | 8/2004 | Xu et al. |
| 2004/0193324 A1 | 9/2004 | Hoog et al. |
| 2004/0209209 A1 | 10/2004 | Chodacki et al. |
| 2004/0238651 A1 | 12/2004 | Juntunen et al. |
| 2004/0245349 A1 | 12/2004 | Smith |
| 2004/0245352 A1 | 12/2004 | Smith |
| 2004/0256472 A1 | 12/2004 | DeLuca |
| 2004/0260427 A1 | 12/2004 | Wimsatt |
| 2004/0262410 A1 | 12/2004 | Hull |
| 2005/0040250 A1 | 2/2005 | Wruck |
| 2005/0043907 A1 | 2/2005 | Eckel et al. |
| 2005/0071780 A1 | 3/2005 | Muller et al. |
| 2005/0080493 A1 | 4/2005 | Arntson |
| 2005/0090915 A1 | 4/2005 | Geiwitz |
| 2005/0103875 A1 | 5/2005 | Ashworth et al. |
| 2005/0119766 A1 | 6/2005 | Amundson et al. |
| 2005/0119793 A1 | 6/2005 | Amundson et al. |
| 2005/0145705 A1 | 7/2005 | Shah et al. |
| 2005/0159846 A1 | 7/2005 | Van Ostrand et al. |
| 2005/0159847 A1 | 7/2005 | Shah et al. |
| 2005/0195757 A1 | 9/2005 | Kidder et al. |
| 2005/0204997 A1 | 9/2005 | Fournier |
| 2005/0270151 A1 | 12/2005 | Winick |
| 2005/0279840 A1 | 12/2005 | Schwendinger et al. |
| 2005/0279841 A1 | 12/2005 | Schwendinger et al. |
| 2005/0287424 A1 | 12/2005 | Schwendinger et al. |
| 2006/0000919 A1 | 1/2006 | Schwendinger et al. |
| 2006/0090066 A1 | 4/2006 | Maze et al. |
| 2006/0102731 A1 | 5/2006 | Mueller et al. |
| 2006/0102732 A1 | 5/2006 | Garrett et al. |
| 2006/0124759 A1 | 6/2006 | Rossi et al. |
| 2006/0184284 A1 | 8/2006 | Froman et al. |
| 2006/0186214 A1 | 8/2006 | Simon et al. |
| 2006/0196953 A1 | 9/2006 | Simon et al. |
| 2006/0206220 A1 | 9/2006 | Amundson |
| 2006/0219799 A1 | 10/2006 | Schultz et al. |
| 2007/0001830 A1 | 1/2007 | Dagci et al. |
| 2007/0029397 A1 | 2/2007 | Mueller |
| 2007/0045430 A1 | 3/2007 | Chapman et al. |
| 2007/0045432 A1 | 3/2007 | Juntunen |
| 2007/0045433 A1 | 3/2007 | Chapman et al. |
| 2007/0045441 A1 | 3/2007 | Ashworth et al. |
| 2007/0045444 A1 | 3/2007 | Gray et al. |
| 2007/0050732 A1 | 3/2007 | Chapman et al. |
| 2007/0057076 A1 | 3/2007 | Orozco |
| 2007/0057079 A1 | 3/2007 | Stark et al. |
| 2007/0084941 A1 | 4/2007 | de Pauw et al. |
| 2007/0095082 A1 | 5/2007 | Garrett et al. |
| 2007/0103824 A1 | 5/2007 | Patterson et al. |
| 2007/0105252 A1 | 5/2007 | Lee et al. |
| 2007/0114848 A1 | 5/2007 | Mulhouse et al. |
| 2007/0115135 A1 | 5/2007 | Mulhouse et al. |
| 2007/0115902 A1 | 5/2007 | Shamoon et al. |
| 2007/0131787 A1 | 6/2007 | Rossi et al. |
| 2007/0132503 A1 | 6/2007 | Nordin |
| 2007/0157639 A1 | 7/2007 | Harrod |
| 2007/0158442 A1 | 7/2007 | Chapman et al. |
| 2007/0158444 A1 | 7/2007 | Naujok et al. |
| 2007/0173978 A1 | 7/2007 | Fein et al. |

(56) References Cited

U.S. PATENT DOCUMENTS

| | | |
|---|---|---|
| 2007/0177857 A1 | 8/2007 | Troost et al. |
| 2007/0183475 A1 | 8/2007 | Hutcherson |
| 2007/0183478 A1 | 8/2007 | Becker et al. |
| 2007/0205297 A1 | 9/2007 | Finkam et al. |
| 2007/0208461 A1 | 9/2007 | Chase |
| 2007/0220907 A1 | 9/2007 | Ehlers |
| 2007/0221741 A1 | 9/2007 | Wagner et al. |
| 2007/0225867 A1 | 9/2007 | Moorer et al. |
| 2007/0227721 A1 | 10/2007 | Springer et al. |
| 2007/0227862 A1 | 10/2007 | Yim et al. |
| 2007/0228183 A1* | 10/2007 | Kennedy .............. F24F 11/0012 236/1 C |
| 2007/0241203 A1 | 10/2007 | Wagner et al. |
| 2007/0246553 A1 | 10/2007 | Morrow et al. |
| 2007/0257120 A1 | 11/2007 | Chapman et al. |
| 2007/0266575 A1 | 11/2007 | Nash |
| 2007/0272527 A1 | 11/2007 | Mattlar et al. |
| 2007/0278320 A1 | 12/2007 | Lunacek et al. |
| 2007/0296280 A1 | 12/2007 | Sorg et al. |
| 2008/0006709 A1 | 1/2008 | Ashworth et al. |
| 2008/0015742 A1 | 1/2008 | Kulyk et al. |
| 2008/0048046 A1 | 2/2008 | Wagner et al. |
| 2008/0054082 A1 | 3/2008 | Evans et al. |
| 2008/0054084 A1 | 3/2008 | Olson |
| 2008/0094010 A1 | 4/2008 | Black |
| 2008/0099568 A1 | 5/2008 | Nicodem et al. |
| 2008/0114495 A1 | 5/2008 | Suyama |
| 2008/0128523 A1 | 6/2008 | Hoglund et al. |
| 2008/0133956 A1 | 6/2008 | Fadell |
| 2008/0142344 A1 | 6/2008 | Hickam |
| 2008/0147242 A1 | 6/2008 | Roher et al. |
| 2008/0151458 A1 | 6/2008 | Beland et al. |
| 2008/0161977 A1 | 7/2008 | Takach et al. |
| 2008/0179412 A1 | 7/2008 | Rhodes |
| 2008/0183335 A1 | 7/2008 | Poth et al. |
| 2008/0185450 A1 | 8/2008 | Kwon et al. |
| 2008/0191045 A1 | 8/2008 | Harter |
| 2008/0202135 A1 | 8/2008 | Francis |
| 2008/0215240 A1 | 9/2008 | Howard et al. |
| 2008/0221737 A1 | 9/2008 | Josephson et al. |
| 2008/0238660 A1 | 10/2008 | Dayton et al. |
| 2008/0245480 A1 | 10/2008 | Knight et al. |
| 2008/0256475 A1 | 10/2008 | Amundson et al. |
| 2008/0273754 A1 | 11/2008 | Hick et al. |
| 2008/0290183 A1 | 11/2008 | Laberge et al. |
| 2009/0001180 A1 | 1/2009 | Siddaramanna et al. |
| 2009/0001181 A1 | 1/2009 | Siddaramanna et al. |
| 2009/0007192 A1* | 1/2009 | Singh .................. H04L 67/06 725/75 |
| 2009/0012959 A1 | 1/2009 | Ylivainio et al. |
| 2009/0024927 A1 | 1/2009 | Schrock et al. |
| 2009/0057425 A1 | 3/2009 | Sullivan et al. |
| 2009/0065595 A1 | 3/2009 | Kates |
| 2009/0079705 A1 | 3/2009 | Sizelove |
| 2009/0095106 A1 | 4/2009 | Hollender |
| 2009/0099697 A1 | 4/2009 | Li et al. |
| 2009/0140056 A1 | 6/2009 | Leen |
| 2009/0140057 A1 | 6/2009 | Leen |
| 2009/0140064 A1 | 6/2009 | Schultz et al. |
| 2009/0140065 A1 | 6/2009 | Juntunen et al. |
| 2009/0143879 A1 | 6/2009 | Amundson et al. |
| 2009/0143880 A1 | 6/2009 | Amundson et al. |
| 2009/0143916 A1 | 6/2009 | Boll et al. |
| 2009/0143918 A1 | 6/2009 | Amundson et al. |
| 2009/0158188 A1 | 6/2009 | Bray et al. |
| 2009/0194601 A1 | 8/2009 | Flohr |
| 2009/0195349 A1 | 8/2009 | Frader-Thompson et al. |
| 2009/0208888 A1 | 8/2009 | Schwartzman |
| 2009/0215534 A1 | 8/2009 | Wilson et al. |
| 2009/0236433 A1 | 9/2009 | Mueller et al. |
| 2009/0259713 A1 | 10/2009 | Blumrich et al. |
| 2009/0261174 A1 | 10/2009 | Butler et al. |
| 2009/0263773 A1 | 10/2009 | Kotlyar et al. |
| 2009/0273610 A1 | 11/2009 | Busch et al. |
| 2009/0281667 A1* | 11/2009 | Masui ................... F24F 11/006 700/276 |
| 2009/0283603 A1 | 11/2009 | Peterson et al. |
| 2009/0312968 A1 | 12/2009 | Phillips |
| 2010/0000239 A1 | 1/2010 | Lifson et al. |
| 2010/0000417 A1 | 1/2010 | Tetreault et al. |
| 2010/0006660 A1 | 1/2010 | Leen et al. |
| 2010/0012737 A1 | 1/2010 | Kates |
| 2010/0015905 A1* | 1/2010 | Hu ......................... F24F 7/007 454/258 |
| 2010/0025483 A1 | 2/2010 | Hoeynck et al. |
| 2010/0070085 A1 | 3/2010 | Harrod et al. |
| 2010/0070086 A1 | 3/2010 | Harrod et al. |
| 2010/0070089 A1 | 3/2010 | Harrod et al. |
| 2010/0070093 A1 | 3/2010 | Harrod et al. |
| 2010/0070099 A1 | 3/2010 | Watson et al. |
| 2010/0070907 A1 | 3/2010 | Harrod et al. |
| 2010/0076605 A1 | 3/2010 | Harrod et al. |
| 2010/0082174 A1* | 4/2010 | Weaver .................. H02J 3/14 700/295 |
| 2010/0084482 A1 | 4/2010 | Kennedy et al. |
| 2010/0084918 A1 | 4/2010 | Fells et al. |
| 2010/0101854 A1* | 4/2010 | Wallaert ................ F24F 11/00 174/502 |
| 2010/0106305 A1 | 4/2010 | Pavlak et al. |
| 2010/0106322 A1 | 4/2010 | Grohman |
| 2010/0106334 A1* | 4/2010 | Grohman .............. F24F 11/006 700/278 |
| 2010/0107070 A1 | 4/2010 | Devineni et al. |
| 2010/0107076 A1 | 4/2010 | Grohman et al. |
| 2010/0107103 A1 | 4/2010 | Wallaert et al. |
| 2010/0114382 A1 | 5/2010 | Ha et al. |
| 2010/0131112 A1 | 5/2010 | Amundson et al. |
| 2010/0163635 A1 | 7/2010 | Ye |
| 2010/0182743 A1 | 7/2010 | Roher |
| 2010/0193592 A1 | 8/2010 | Simon et al. |
| 2010/0198425 A1 | 8/2010 | Donovan |
| 2010/0250009 A1 | 9/2010 | Lifson et al. |
| 2010/0261465 A1 | 10/2010 | Rhoads et al. |
| 2010/0273610 A1 | 10/2010 | Johnson |
| 2010/0289643 A1 | 11/2010 | Trundle et al. |
| 2010/0298985 A1 | 11/2010 | Hess et al. |
| 2010/0314458 A1 | 12/2010 | Votaw et al. |
| 2010/0318227 A1 | 12/2010 | Steinberg et al. |
| 2011/0015798 A1 | 1/2011 | Golden et al. |
| 2011/0015802 A1 | 1/2011 | Imes |
| 2011/0016017 A1 | 1/2011 | Carlin et al. |
| 2011/0025257 A1 | 2/2011 | Weng |
| 2011/0029488 A1 | 2/2011 | Fuerst et al. |
| 2011/0046756 A1 | 2/2011 | Park |
| 2011/0046806 A1 | 2/2011 | Nagel et al. |
| 2011/0077758 A1 | 3/2011 | Tran et al. |
| 2011/0137467 A1 | 6/2011 | Leen et al. |
| 2011/0152024 A1 | 6/2011 | Kuehl |
| 2011/0160918 A1 | 6/2011 | McMasters et al. |
| 2011/0166712 A1 | 7/2011 | Kramer et al. |
| 2011/0167369 A1 | 7/2011 | van Os |
| 2011/0241624 A1 | 10/2011 | Park et al. |
| 2011/0253796 A1 | 10/2011 | Posa et al. |
| 2011/0282937 A1 | 11/2011 | Deshpande et al. |
| 2012/0017611 A1 | 1/2012 | Coffel et al. |
| 2012/0024969 A1 | 2/2012 | Kates |
| 2012/0031984 A1 | 2/2012 | Feldmeier et al. |
| 2012/0065783 A1 | 3/2012 | Fadell et al. |
| 2012/0066168 A1 | 3/2012 | Fadell et al. |
| 2012/0101637 A1 | 4/2012 | Imes et al. |
| 2012/0125559 A1 | 5/2012 | Fadell et al. |
| 2012/0125592 A1 | 5/2012 | Fadell et al. |
| 2012/0126019 A1 | 5/2012 | Warren et al. |
| 2012/0126020 A1 | 5/2012 | Filson et al. |
| 2012/0126021 A1 | 5/2012 | Warren et al. |
| 2012/0128025 A1 | 5/2012 | Huppi et al. |
| 2012/0130546 A1 | 5/2012 | Matas et al. |
| 2012/0130547 A1 | 5/2012 | Fadell et al. |
| 2012/0130548 A1 | 5/2012 | Fadell et al. |
| 2012/0130679 A1 | 5/2012 | Fadell et al. |
| 2012/0131504 A1 | 5/2012 | Fadell et al. |
| 2012/0179300 A1 | 7/2012 | Warren et al. |
| 2012/0186774 A1 | 7/2012 | Matsuoka et al. |

(56) References Cited

U.S. PATENT DOCUMENTS

| | | |
|---|---|---|
| 2012/0191257 A1 | 7/2012 | Corcoran et al. |
| 2012/0199660 A1 | 8/2012 | Warren et al. |
| 2012/0203379 A1 | 8/2012 | Sloo et al. |
| 2012/0229521 A1 | 9/2012 | Hales, IV et al. |
| 2012/0233478 A1 | 9/2012 | Mucignat et al. |
| 2012/0239207 A1 | 9/2012 | Fadell et al. |
| 2012/0239221 A1 | 9/2012 | Mighdoll et al. |
| 2012/0248211 A1 | 10/2012 | Warren et al. |
| 2012/0252430 A1 | 10/2012 | Imes et al. |
| 2012/0258776 A1 | 10/2012 | Lord et al. |
| 2012/0273580 A1 | 11/2012 | Warren et al. |
| 2012/0296488 A1 | 11/2012 | Dharwada et al. |
| 2013/0014057 A1 | 1/2013 | Reinpoldt et al. |
| 2013/0046397 A1 | 2/2013 | Fadell et al. |
| 2013/0073506 A1 | 3/2013 | Camp et al. |
| 2013/0087629 A1 | 4/2013 | Stefanski et al. |
| 2013/0099010 A1 | 4/2013 | Filson et al. |
| 2013/0173064 A1 | 7/2013 | Fadell et al. |
| 2014/0005837 A1 | 1/2014 | Fadell et al. |
| 2014/0084072 A1 | 3/2014 | Conner et al. |

FOREIGN PATENT DOCUMENTS

| | | |
|---|---|---|
| CN | 101849311 A | 9/2010 |
| DE | 19609390 A1 | 9/1997 |
| EP | 207295 | 1/1987 |
| EP | 434926 | 7/1991 |
| EP | 447458 | 9/1991 |
| EP | 510807 | 10/1992 |
| EP | 660287 | 6/1995 |
| EP | 690363 | 1/1996 |
| EP | 720077 | 7/1996 |
| EP | 802471 | 10/1997 |
| EP | 1065079 | 1/2001 |
| EP | 1184804 B1 | 3/2002 |
| EP | 1731984 | 12/2006 |
| EP | 1283396 | 3/2007 |
| EP | 2157492 | 2/2010 |
| EP | 2302326 | 3/2011 |
| EP | 1703356 | 9/2011 |
| GB | 2212317 | 5/1992 |
| GB | 2294828 A | 5/1996 |
| JP | 59106311 | 6/1984 |
| JP | 09298780 | 11/1997 |
| JP | 2002087050 | 3/2002 |
| JP | 2003054290 | 2/2003 |
| NL | 1024986 | 6/2005 |
| SI | 20556 | 10/2001 |
| TW | 274364 | 4/1996 |
| TW | 316955 | 10/1997 |
| TW | 362230 | 6/1999 |
| TW | 532469 | 5/2003 |
| TW | 535320 B | 6/2003 |
| TW | 2007009529 | 3/2007 |
| TW | 201232994 A | 8/2012 |
| WO | 0248851 | 6/2002 |
| WO | 2005019740 | 3/2005 |
| WO | 2007027554 | 3/2007 |
| WO | 2008054938 | 5/2008 |
| WO | 2009073496 | 6/2009 |
| WO | 2011128416 | 10/2011 |
| WO | 2012068436 | 5/2012 |
| WO | 2012068437 | 5/2012 |
| WO | 2012068437 A3 | 5/2012 |
| WO | 2012068453 | 5/2012 |
| WO | 2012068459 | 5/2012 |
| WO | 2012068495 | 5/2012 |
| WO | 2012068503 | 5/2012 |
| WO | 2012068507 | 5/2012 |
| WO | 2012068447 | 1/2013 |
| WO | 2013052389 | 4/2013 |
| WO | 2013058820 A1 | 4/2013 |

OTHER PUBLICATIONS

Honeywell CT2700, An Electronic Round Programmable Thermostat—User's Guide, Honeywell Inc., 1997, 8 pages.

Honeywell CT8775AC, The digital Round Non-Programmable Thermostats—Owner's Guide, Honeywell International Inc., 2003, 20 pages.

Honeywell T8700C, An Electronic Round Programmable Thermostat—Owner's Guide, Honeywell Inc., 1997, 12 pages.

Honeywell T8775, The Digital Round Thermostat, Honeywell, 2003, 2 pages.

Honeywell T8775AC Digital Round Thermostat Manual No. 69-1679EF-1, www.honeywell.com/yourhome, Jun. 2004, pp. 1-16.

ICY 3815TT-001 Timer-Thermostat Package Box ICY BV Product Bar Code No. 8717953007902, 2009, 2 pages.

Introducing the New Smart Si Thermostat Datasheet [online]. Ecobee, Mar. 12, 2012. Retrieved from the Internet: <URL: https://www.ecobee.com/solutions/home/smart-si/> on Feb. 25, 2013, 4 pages.

The Clever Thermostat, ICY BV Web Page, http://www.icy.nl/en/consumer/products/clever-thermostat, ICY BV, 2012, 1 page.

The Clever Thermostat User Manual and Installation Guide, ICY BV ICY3815 Timer-Thermostat, 2009, pp. 1-36.

Salus, "S-Series Digital Thermostat Instruction Manual-ST620 Model No. Instruction Manual", www.salus-tech.com, Version 005, Apr. 29, 2010, 24 pages.

Arens et al., "Demand Response Electrical Appliance Manager—User Interface Design, Development and Testing", Poster, Demand Response Enabling Technology Development, University of California Berkeley, 2005, 1 page.

Arens et al., "Demand Response Enabled Thermostat—Control Strategies and Interface", Demand Response Enabling Technology Development Poster, University of California Berkeley, 2004, 1 page.

Arens et al., "Demand Response Enabling Technology Development", Phase I Report: Jun. 2003-Nov. 2005, University of California Berkeley, Apr. 4, 2006, pp. 1-108.

Arens et al., "New Thermostat Demand Response Enabling Technology", Poster, University of California Berkeley, Jun. 10, 2004.

Auslander et al., "UC Berkeley DR Research Energy Management Group", Power Point Presentation, DR ETD Workshop, State of California Energy Commission, Jun. 11, 2007, pp. 1-35.

Chen et al., "Demand Response-Enabled Residential Thermostat Controls", Abstract, ACEEE Summer Study on Energy Efficiency in Buildings, Mechanical Engineering Dept. and Architecture Dept., University of California Berkeley, 2008, pp. 1-24 through 1-36.

Green, "Thermo Heat Tech Cool", Popular Mechanics Electronic Thermostat Guide, Oct. 1985, pp. 155-158.

Meier et al., "Thermostat Interface Usability: A Survey", Ernest Orlando Lawrence Berkeley National Laboratory, Environmental Energy Technologies Division, Berkeley California, Sep. 2010, pp. 1-73.

Peffer et al., "A Tale of Two Houses: The Human Dimension of Demand Response Enabling Technology from a Case Study of Adaptive Wireless Thermostat", Abstract, ACEEE Summer Study on Energy Efficiency in Buildings, Architecture Dept. and Mechanical Engineering Dept., University of California Berkeley, 2008, pp. 7-242 through 7-253.

Peffer et al., "Smart Comfort at Home: Design of a Residential Thermostat to Achieve Thermal Comfort, and Save Money and Peak Energy", University of California Berkeley, Mar. 2007, 1 page.

Sanford, "iPod (Click Wheel) (2004)", www.apple-history.com. Retrieved from: <http://apple-history.com/ipod> on Apr. 9, 2012, 2 pages.

U.S. Appl. No. 60/512,886, Volkswagen Rotary Knob for Motor Vehicle—English Translation of German Application filed Oct. 20, 2003.

Wright et al., "DR ETD—Summary of New Thermostate, TempNode, & New Meter (UC Berkeley Project)", Power Point Presentation, Public Interest Energy Research, University of California Berkeley. Retrieved from: <http://dr.berkeley.edu/dream/presentations/2005_6CEC.pdf>, 2005, pp. 1-49.

(56) References Cited

OTHER PUBLICATIONS

Detroitborg, Nest Learning Thermostat: Unboxing and Review, [online], Feb. 10, 2012. Retrieved from the Internet: <URL: http://www.youtube.com/watch?v=KrgcOL4oLzc> on Aug. 22, 2013, 4 pages.
Stigge, Jr., B. J. (2001). *Informed Home Energy Behavior: Developing a tool for homeowners to monitor, plan and learn about energy conservation* (Master's thesis). Massachusetts Institute of Technology, Cambridge.
Aprilaire Electronic Thermostats Model 8355 User's Manual, Research Products Corporation, Dec. 2000, 16 pages.
Braeburn 5300 Installer Guide, Braeburn Systems, LLC, Dec. 9, 2009, 10 pages.
Braeburn Model 5200, Braeburn Systems, LLC, Jul. 20, 2011, 11 pages.
Ecobee Smart Thermostat Installation Manual, Jun. 29, 2011, 20 pages.
Ecobee Smart Thermostat User Manual, May 11, 2010, 20 pages.
Honeywell Installation Guide FocusPRO TH6000 Series, Honeywell International, Inc., Jan. 5, 2012, 24 pages.
Honeywell Operating Manual FocusPRO TH6000 Series, Honeywell International, Inc., Mar. 25, 2011, 80 pages.
Honeywell Prestige IAQ Product Data 2, Honeywell International, Inc., Jan. 12, 2012, 126 pages.
Honeywell Prestige THX9321-9421 Operating Manual, Honeywell International, Inc., Jul. 6, 2011, 120 pages.
Hunter Internet Thermostat Installation Guide, Hunter Fan Co., Aug. 14, 2012, 8 pages.
Lennox ComfortSense 5000 Owners Guide, Lennox Industries, Inc., Feb. 2008, 32 pages.
Lennox ComfortSense 7000 Owners Guide, Lennox Industries, Inc., May 2009, 15 pages.
Lennox iComfort Manual, Lennox Industries, Inc., Dec. 2010, 20 pages.
RobertShaw Product Manual 9620, Maple Chase Company, Jun. 12, 2001, 14 pages.
RobertShaw Product Manual 9825i2, Maple Chase Company, Jul. 17, 2006, 36 pages.
SYSTXBBUID01 Evolution Control Installation Instructions, Bryant, Feb. 2004, 16 pages.
SYSTXCCUIZ01-V Infinity Control Installation Instructions, Carrier Corp, May 31, 2012, 20 pages.
TB-PAC, TB-PHP, Base Series Programmable Thermostats, Carrier Corp, May 14, 2012, 8 pages.
TP-PAC, TP-PHP, TP-NAC, TP-NHP Performance Series AC/HP Thermostat Installation Instructions, Carrier Corp., Sep. 2007, 56 pages.
Trane Communicating Thermostats for Fan Coil, Trane, May 2011, 32 pages.
Trane Communicating Thermostats for Heat Pump Control, Trane, May 2011, 32 pages.
Trane Install XL600 Installation Manual, Trane, Mar. 2006, 16 pages.
Trane XL950 Installation Guide, Trane, Mar. 2011, 20 pages.
Venstar T2900 Manual, Venstar, Inc., Apr. 2008, 113 pages.
VisionPRO TH8000 Series Installation Guide, Honeywell International, Inc., Jan. 2012, 12 pages.
VisionPRO TH8000 Series Operating Manual, Honeywell International, Inc., Mar. 2011, 96 pages.
VisionPRO Wi-Fi Programmable Thermostat User Guide, Honeywell International Inc., Aug. 2012, 48 pages.
Lux PSPU732T Manual, Lux Products Corporation, Jan. 6, 2009, 48 pages.
Venstar T5800 Manual, Venstar, Inc., Sep. 7, 2011, 63 pages.
White Rodgers (Emerson) Model 1F81-261 Installation and Operating Instructions, White Rodgers, Apr. 15, 2010, 8 pages.
White Rodgers (Emerson) Model IF98EZ-1621 Homeowner's User Guide, White Rodgers, Jan. 25, 2012, 28 pages.
International Patent Application No. PCT/US2011/061470 International Search Report & Written Opinion dated Apr. 3, 2012, 11 pages.
International Patent Application No. PCT/US2012/058207 International Search Report & Written Opinion dated Jan. 11, 2013, 10 pages.
Gao et al., "The Self-Programming Thermostat: Optimizing Setback Schedules Based on Home Occupancy Patterns", In Proceedings of the First ACM Workshop on Embedded Sensing Systems for Energy-Efficiency in Buildings, Nov. 3, 2009, 6 pages.
International Patent Application No. PCT/US2012/030084 International Search Report & Written Opinion dated Jul. 6, 2012, 7 pages.
International Preliminary Report on Patentability dated Apr. 8, 2014, for International Patent Application No. PCT/US2012/058207 filed Sep. 30, 2012, 6 pages.
International Patent Application No. PCT/US2011/061391 International Search Report dated Apr. 11, 2012, 3 pages.
Written Opinion dated Apr. 11, 2012, for International Patent Application PCT/US2011/061391 filed Nov. 18, 2011, 5 pages.
International Preliminary Report on Patentability dated Feb. 25, 2014, for International Patent Application PCT/US2011/061391 filed Nov. 18, 2011, 6 pages.
International Patent Application No. PCT/US2011/061344 International Search Report dated Jun. 7, 2012, 4 pages.
Shadrach, Energy Scavenging for Wireless Sensor Nodes with a Focus on Vibration to Electricity Conversion, Dissertation [online], Retrieved from the Internet: <URL: http://users.cecs.anu.edu.au/~Shad.Roundy/paper/ShadThesis.pdf>, Jun. 2003, 297 pages.
Advanced Model Owner's Manual Bay Web Thermostat, Oct. 6, 2011, 31 pages. Retrieved from <http:www.bayweb.com/wp-content/uploads/BW-WT4-2DOC.pdf> on Nov. 7, 2012.
Ecobee Smart Si Thermostat Installation Manual, Ecobee, Apr. 3, 2012, 40 pages.
Ecobee Smart Si Thermostat User Manual, Ecobee, Apr. 3, 2012, 44 pages.
International Search Report and Written Opinion dated Apr. 3, 2012, for International Patent Application No. PCT/US2011/061339 filed on Nov. 18, 2011, all pages.
International Preliminary Report on Patentability dated May 30, 2013, for International Patent Application No. PCT/US2011/061339 filed on Nov. 18, 2011, all pages.
International Preliminary Report on Patentability dated May 1, 2014, for International Patent Application No. PCT/US2012/030084 filed on Mar. 22, 2012, all pages.
International Search Report and Written Opinion dated Jan. 22, 2013, for International Patent Application No. PCT/US2012/061148 filed on Oct. 19, 2012, all pages.
International Preliminary Report on Patentability dated May 1, 2014, for International Patent Application No. PCT/US2012/061148 filed on Oct. 19, 2012, all pages.
Taiwanese Office Action dated Mar. 18, 2014, for ROC (Taiwan) Patent Application No. 100142429 filed on Nov. 8, 2011, all pages.
Taiwanese Office Action dated May 5, 2014, for ROC (Taiwan) Patent Application No. 100142428 filed on Nov. 18, 2011, all pages.
Taiwanese Office Action dated Sep. 30, 2014, for ROC (Taiwan) Patent Application No. 100142428 filed on Nov. 18, 2011, all pages.
U.S. Patent Office Action dated Dec. 23, 2014, for U.S. Appl. No. 14/504,220, filed Oct. 1, 2014, all pages.
Notice of Allowance and Fee(s) Due dated Jul. 18, 2016, for U.S. Appl. No. 14/685,477, 9 pages.
Notice of Allowance and Fee(s) Due dated Aug. 31, 2016, for U.S. Appl. No. 14/685,477, 7 pages.

\* cited by examiner

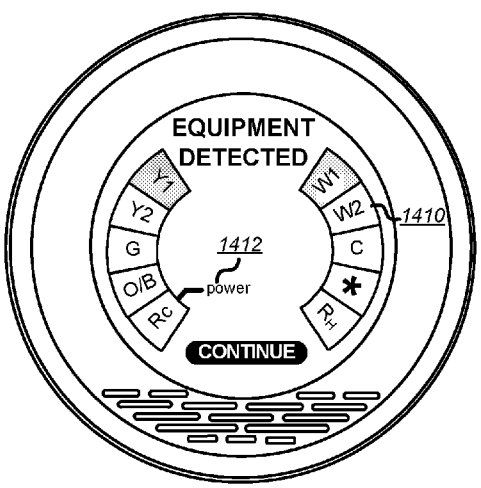
FIG. 14A    FIG. 14B
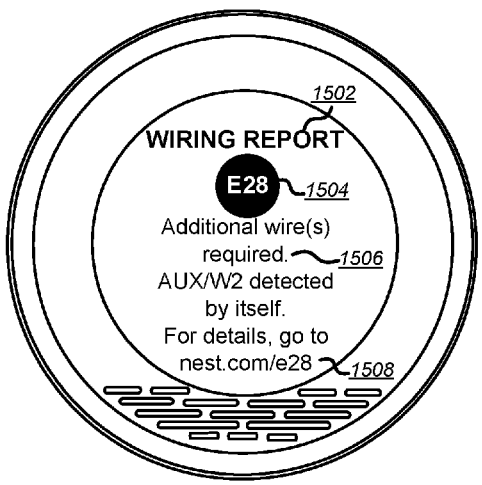
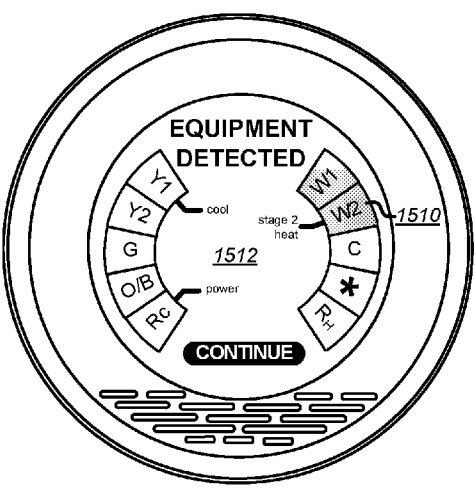
FIG. 15A    FIG. 15B

ELECTRONIC DEVICE CONTROLLER WITH USER-FRIENDLY INSTALLATION FEATURES

CROSS-REFERENCES To RELATED APPLICATIONS

This application is a continuation of U.S. patent application Ser. No. 14/743,699, filed Jun. 18, 2015, which is a continuation of U.S. patent application Ser. No. 13/831,152, filed Mar. 14, 2013, now U.S. Pat. No. 9,092,039, granted Jul. 28, 2015, which is a continuation-in-part of each of the following commonly assigned applications: U.S. Ser. No. 13/632,148 filed Sep. 30, 2012, now U.S. Pat. No. 8,544,285, granted Oct. 1, 2013; U.S. Ser. No. 13/269,501 filed Oct. 7, 2011, now U.S. Pat. No. 8,918,219, granted Dec. 23, 2014; U.S. Ser. No. 13/034,666 filed Feb. 24, 2011, now U.S. Pat. No. 9,494,332, granted Nov. 15, 2016; and U.S. Ser. No. 13/034,678 filed Feb. 24, 2011, now U.S. Pat. No. 8,752,771, granted Jun. 17, 2014. U.S. Ser. No. 13/632,148 claims the benefit of U.S. Provisional Application No. 61/627,996 filed Oct. 21, 2011. U.S. Ser. No. 13/269,501 claims the benefit of: U.S. Provisional No. 61/415,771 filed Nov. 19, 2010; and U.S. Provisional No. 61/429,093 filed Dec. 31, 2010. Each of the above-referenced patent applications is incorporated herein by reference in its entirety for all purposes.

FIELD

This patent specification relates to systems and methods for the monitoring and control of energy-consuming systems or other resource-consuming systems. More particularly, this patent specification relates to a user interface for facilitating user installation of control units that govern the operation of energy-consuming systems, household devices, or other resource-consuming systems, including user interface methods for facilitating user installation of thermostats that govern the operation of heating, ventilation, and air conditioning (HVAC) systems.

BACKGROUND

While substantial effort and attention continues toward the development of newer and more sustainable energy supplies, the conservation of energy by increased energy efficiency remains crucial to the world's energy future. According to an October 2010 report from the U.S. Department of Energy, heating and cooling account for 56% of the energy use in a typical U.S. home, making it the largest energy expense for most homes. Along with improvements in the physical plant associated with home heating and cooling (e.g., improved insulation, higher efficiency furnaces), substantial increases in energy efficiency can be achieved by better control and regulation of home heating and cooling equipment. By activating heating, ventilation, and air conditioning (HVAC) equipment for judiciously selected time intervals and carefully chosen operating levels, substantial energy can be saved while at the same time keeping the living space suitably comfortable for its occupants.

Historically, however, most known HVAC thermostatic control systems have tended to fall into one of two opposing categories, neither of which is believed be optimal in most practical home environments. In a first category are many simple, non-programmable home thermostats, each typically consisting of a single mechanical or electrical dial for setting a desired temperature and a single HEAT-FAN-OFF-AC switch. While being easy to use for even the most unsophisticated occupant, any energy-saving control activity, such as adjusting the nighttime temperature or turning off all heating/cooling just before departing the home, must be performed manually by the user. As such, substantial energy-saving opportunities are often missed for all but the most vigilant users. Moreover, more advanced energy-saving settings are not provided, such as the ability to specify a custom temperature swing, i.e., the difference between the desired set temperature and actual current temperature (such as 1 to 3 degrees) required to trigger turn-on of the heating/cooling unit.

In a second category, on the other hand, are many programmable thermostats, which have become more prevalent in recent years in view of Energy Star (US) and TCO (Europe) standards, and which have progressed considerably in the number of different settings for an HVAC system that can be individually manipulated. Unfortunately, however, users are often intimidated by a dizzying array of switches and controls laid out in various configurations on the face of the thermostat or behind a panel door on the thermostat, and seldom adjust the manufacturer defaults to optimize their own energy usage. Thus, even though the installed programmable thermostats in a large number of homes are technologically capable of operating the HVAC equipment with energy-saving profiles, it is often the case that only the one-size-fits-all manufacturer default profiles are ever implemented in a large number of homes. Indeed, in an unfortunately large number of cases, a home user may permanently operate the unit in a "temporary" or "hold" mode, manually manipulating the displayed set temperature as if the unit were a simple, non-programmable thermostat.

In a more general sense, important issues arise at the interface between (i) energy-saving technologies that might be achievable using known sensing and processing methods, and (ii) the actual widespread user adoption of devices that implement such energy-saving technologies and the integration of those devices into their daily routines and environment. It has been found especially important that the "first contact" between a user and an energy-saving device constitute a particularly easy, enjoyable, and pleasant experience, or else the user can quickly "turn off" or "tune out" to the device and its energy-saving advantages.

Although the scope of the present teachings hereinbelow is not necessarily limited to thermostats but rather can extend to a variety of different smart-home devices, the installation of an intelligent, energy-saving, network-connected thermostat presents particular issues that are well addressed by one or more of the embodiments herein. One the one hand, it is desirable to provide an intelligent, energy-saving, network-connected a thermostat that accommodates easy do-it-yourself installation for ordinary users who desire to perform their own installation. On the other hand, because HVAC equipment configurations in some homes can get rather complex, and because the consequences of improper installation can sometimes be severe, it is sometimes important that professionals get involved in the installation process.

It would be desirable to provide an intelligent, energy-saving, network-connected thermostat that can provide both do-it-yourself simplicity in scenarios where that is proper and safe, and yet that also has the ability to accommodate more complex HVAC systems and identify the potential need for professional assistance, all while being user-friendly and providing a pleasing first contact with the user as well as any professionals who may ultimately get involved. Other issues arise as would be apparent to a person skilled in the art in view of the present disclosure.

SUMMARY

According to some other embodiments, a method is described for installing and configuring a thermostat for controlling a heating, ventilation, and air conditioning (HVAC) system wherein the thermostat is configured to control different types of HVAC system components. The described method includes determining identities of a first subset of a plurality of HVAC connectors into which corresponding HVAC wires have been inserted, wherein the plurality of HVAC connectors are configured to receive a corresponding plurality of HVAC control wires corresponding to the HVAC system, each HVAC connector having an identifier that identifies one or more HVAC functionalities associated with that HVAC connector. The method also includes selecting and displaying a first user inquiry to a user presented on a user interface comprising an electronic display disposed within a housing of the thermostat, the first user inquiry selected from a group of user inquires each of which requests information regarding a type of system component to be controlled by the thermostat, and the selection of the first inquiry being based at least in part on the determined identities of the first subset of the plurality of HVAC connectors into which corresponding HVAC wires have been inserted, the selecting and displaying being performed at least in part by a processing system disposed within the housing of the thermostat and coupled to the user interface, the processing system being configured to be in operative communication with one or more temperature sensors for determining an ambient air temperature, in operative communication with one or more input devices including the user interface, and still in further operative communication with the HVAC system to control the HVAC system based at least in part on a comparison of a measured ambient temperature and a setpoint temperature value. The user is allowed, in response to the displayed first inquiry, to select between at least two types of system components to be controlled by the HVAC controller. The first selection by the user is accepted using the user interface, the selection identifying a type of system component to be controlled by the HVAC controller, and the processing system modifies configuration information of the thermostat based at least in part on the first selection. The modified configuration information of the thermostat is then used when controlling one or more HVAC system components of the HVAC system by the processing system.

According to some embodiments, a thermostat is described that includes a housing, a user interface including an electronic display, and a processing system disposed within the housing. The processing system is coupled to the user interface and is configured to be in operative communication with one or more temperature sensors for determining an ambient air temperature, in operative communication with one or more input devices including the user interface for receiving input from a user, and in still further operative communication with a heating, ventilation, and air conditioning (HVAC) system to control the HVAC system based at least in part on a comparison of a measured ambient temperature and a setpoint temperature value. The thermostat also includes a plurality of HVAC connectors configured to receive a corresponding plurality of HVAC control wires corresponding to the HVAC system, each HVAC connector having an identifier that identifies one or more HVAC functionalities associated with that HVAC connector, and a connection sensing module coupled to the HVAC connectors and configured to determine the identities of a first subset of the HVAC connectors into which corresponding HVAC wires have been inserted. The processing system is further configured to: select and display a first user inquiry to a user presented on the electronic display of the user interface, the first user inquiry selected from a group of user inquires each of which requests information regarding a type of system component to be controlled by the thermostat, and the selection of the first inquiry being based at least in part on determined identities of the first subset of the plurality of HVAC connectors into which corresponding HVAC wires have been inserted; allow the user, in response to the displayed first inquiry, to select between at least two types of system components to be controlled by the HVAC controller; accept a first selection by the user using the user interface, the selection identifying a type of system component to be controlled by the HVAC controller; modify configuration information of the thermostat based at least in part on the first selection; and control one or more HVAC system components of the HVAC system using the modified configuration information.

A further understanding of the nature and advantages of the present invention may be realized by reference to the remaining portions of the specification and the drawings. Also note that other embodiments may be described in the following disclosure and claims.

BRIEF DESCRIPTION OF THE DRAWINGS

The inventive body of work will be readily understood by referring to the following detailed description in conjunction with the accompanying drawings, in which:

FIG. 14A illustrates a user interface of a thermostat for providing an output describing a wiring error, according to one embodiment.

FIG. 14B illustrates a user interface of a thermostat providing a graphical output of mechanical wiring connections that have been detected, according to one embodiment.

FIG. 15A illustrates a user interface of a thermostat providing a graphical output of multiple wiring connections, according to one embodiment.

FIG. 15B illustrates a corresponding user interface of a thermostat providing a graphical wiring diagram, according to one embodiment.

DETAILED DESCRIPTION

Figure 1:
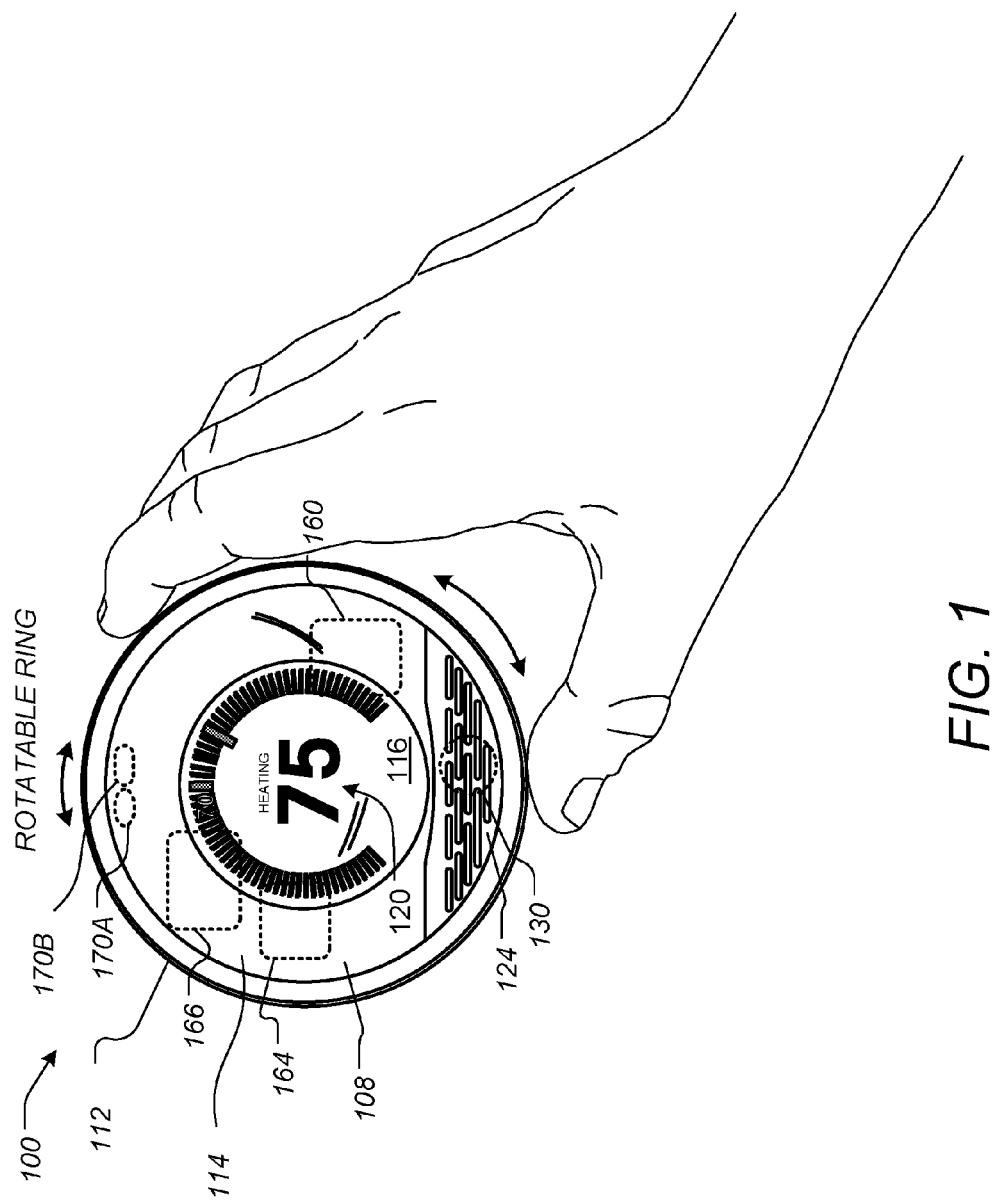
FIG. 1 illustrates a perspective view of a thermostat, according to one embodiment.

In the following detailed description, for purposes of explanation, numerous specific details are set forth to provide a thorough understanding of the various embodiments of the present invention. Those of ordinary skill in the art will realize that these various embodiments of the present invention are illustrative only and are not intended to be limiting in any way. Other embodiments of the present invention will readily suggest themselves to such skilled persons having the benefit of this disclosure.

In addition, for clarity purposes, not all of the routine features of the embodiments described herein are shown or described. One of ordinary skill in the art would readily appreciate that in the development of any such actual embodiment, numerous embodiment-specific decisions may be required to achieve specific design objectives. These design objectives will vary from one embodiment to another and from one developer to another. Moreover, it will be appreciated that such a development effort might be complex and time-consuming but would nevertheless be a routine engineering undertaking for those of ordinary skill in the art having the benefit of this disclosure.

It is to be appreciated that while one or more embodiments are described further herein in the context of typical HVAC system used in a residential home, such as single-family residential home, the scope of the present teachings is not so limited. More generally, thermostats according to one or more of the preferred embodiments are applicable for a wide variety of enclosures having one or more HVAC systems including, without limitation, duplexes, townhomes, multi-unit apartment buildings, hotels, retail stores, office buildings, and industrial buildings. Further, it is to be appreciated that while the terms user, customer, installer, homeowner, occupant, guest, tenant, landlord, repair person, and/or the like may be used to refer to the person or persons who are interacting with the thermostat or other device or user interface in the context of one or more scenarios described herein, these references are by no means to be considered as limiting the scope of the present teachings with respect to the person or persons who are performing such actions.

EXEMPLARY THERMOSTAT EMBODIMENTS

Provided according to one or more embodiments are systems, methods, and computer program products for controlling one or more HVAC systems based on one or more versatile sensing and control units (VSCU units), each VSCU unit being configured and adapted to provide sophisticated, customized, energy-saving HVAC control functionality while at the same time being visually appealing, non-intimidating, and easy to use. The term "thermostat" is used herein below to represent a particular type of VSCU unit (Versatile Sensing and Control) that is particularly applicable for HVAC control in an enclosure. Although "thermostat" and "VSCU unit" may be seen as generally interchangeable for the contexts of HVAC control of an enclosure, it is within the scope of the present teachings for each of the embodiments herein to be applied to VSCU units having control functionality over measurable characteristics other than temperature (e.g., pressure, flow rate, height, position, velocity, acceleration, capacity, power, loudness, brightness) for any of a variety of different control systems involving the governance of one or more measurable characteristics of one or more physical systems, and/or the governance of other energy or resource consuming systems such as water usage systems, air usage systems, systems involving the usage of other natural resources, and systems involving the usage of various other forms of energy.

FIGS. 1-5 and the descriptions in relation thereto provide exemplary embodiments of thermostat hardware and/or software that can be used to implement the specific embodiments of the appended claims. This thermostat hardware and/or software is not meant to be limiting, and is presented to provide an enabling disclosure. FIG. 1 illustrates a perspective view of a thermostat 100, according to one embodiment. In this specific embodiment, the thermostat 100 can be controlled by at least two types of user input, the first being a rotation of the outer ring 112, and the second being an inward push on an outer cap 108 until an audible and/or tactile "click" occurs. As used herein, these two types of user inputs, may be referred to as "manipulating" the thermostat. In other embodiments, manipulating the thermostat may also include pressing keys on a keypad, voice recognition commands, and/or any other type of input that can be used to change or adjust settings on the thermostat 100.

For this embodiment, the outer cap 108 can comprise an assembly that includes the outer ring 112, a cover 114, an electronic display 116, and a metallic portion 124. Each of these elements, or the combination of these elements, may be referred to as a "housing" for the thermostat 100. Simultaneously, each of these elements, or the combination of these elements, may also form a user interface. The user interface may specifically include the electronic display 116. In FIG. 1, the user interface 116 may be said to operate in an active display mode. The active display mode may include providing a backlight for the electronic display 116. In other embodiments, the active display mode may increase the intensity and/or light output of the electronic display 116 such that a user can easily see displayed settings of the thermostat 100, such as a current temperature, a setpoint temperature, an HVAC function, and/or the like. The active display mode may be contrasted with an inactive display mode (not shown). The inactive display mode can disable a backlight, reduce the amount of information displayed, lessen the intensity of the display, and/or altogether turn off the electronic display 116, depending on the embodiment.

Depending on the settings of the thermostat 100, the active display mode and the inactive display mode of the electronic display 116 may also or instead be characterized by the relative power usage of each mode. In one embodiment, the active display mode may generally require substantially more electrical power than the inactive display mode. In some embodiments, different operating modes of the electronic display 116 may instead be characterized completely by their power usage. In these embodiments, the different operating modes of the electronic display 116 may be referred to as a first mode and a second mode, where the user interface requires more power when operating in the first mode than when operating in the second mode.

According to some embodiments the electronic display 116 may comprise a dot-matrix layout (individually addressable) such that arbitrary shapes can be generated, rather than being a segmented layout. According to some embodiments, a combination of dot-matrix layout and segmented layout is employed. According to some embodiments, electronic display 116 may be a backlit color liquid crystal display (LCD). An example of information displayed on the electronic display 116 is illustrated in FIG. 1, and includes central numerals 120 that are representative of a current setpoint temperature. According to some embodiments, metallic portion 124 can have a number of slot-like openings so as to facilitate the use of sensors 130, such as a passive infrared motion sensor (PIR), mounted beneath the slot-like openings.

According to some embodiments, the thermostat 100 can include additional components, such as a processing system 160, display driver 164, and a wireless communications system 166. The processing system 160 can be adapted or configured to cause the display driver 164 to cause the electronic display 116 to display information to the user. The processing system 160 can also be configured to receive user input via the rotatable ring 112. These additional components, including the processing system 160, can be enclosed within the housing, as displayed in FIG. 1. These additional components are described in further detail herein below.

The processing system 160, according to some embodiments, is capable of carrying out the governance of the thermostat's operation. For example, processing system 160 can be further programmed and/or configured to maintain and update a thermodynamic model for the enclosure in which the HVAC system is installed. According to some embodiments, the wireless communications system 166 can be used to communicate with devices such as personal computers, remote servers, handheld devices, smart phones, and/or other thermostats or HVAC system components. These communications can be peer-to-peer communications, communications through one or more servers located on a private network, or and/or communications through a cloud-based service.

Motion sensing as well as other techniques can be use used in the detection and/or prediction of occupancy, as is described further in the commonly assigned U.S. Ser. No. 12/881,430 filed Sep. 14, 2010, which is incorporated by reference herein. According to some embodiments, occupancy information can be a used in generating an effective and efficient scheduled program. For example, an active proximity sensor 170A can be provided to detect an approaching user by infrared light reflection, and an ambient light sensor 170B can be provided to sense visible light. The proximity sensor 170A can be used in conjunction with a plurality of other sensors to detect proximity in the range of about one meter so that the thermostat 100 can initiate "waking up" when the user is approaching the thermostat and prior to the user touching the thermostat. Such use of proximity sensing is useful for enhancing the user experience by being "ready" for interaction as soon as, or very soon after the user is ready to interact with the thermostat. Further, the wake-up-on-proximity functionality also allows for energy savings within the thermostat by "sleeping" when no user interaction is taking place or about to take place. The various types of sensors that may be used, as well as the operation of the "wake up" function are described in much greater detail throughout the remainder of this disclosure.

Figure 2:
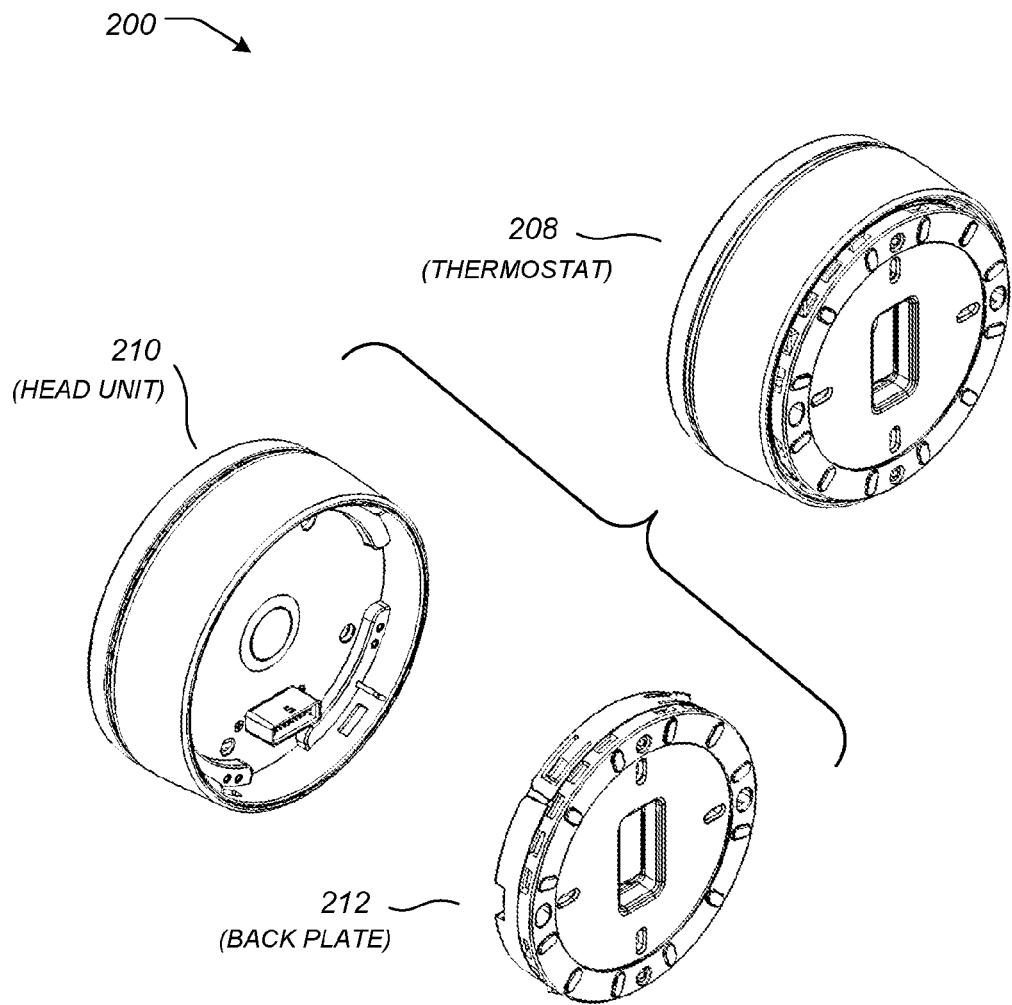
FIG. 2 illustrates an exploded perspective view of a thermostat having a head unit and the backplate, according to one embodiment.

In some embodiments, the thermostat can be physically and/or functionally divided into at least two different units. Throughout this disclosure, these two units can be referred to as a head unit and a backplate. FIG. 2 illustrates an exploded perspective view 200 of a thermostat 208 having a head unit 210 and a backplate 212, according to one embodiment. Physically, this arrangement may be advantageous during an installation process. In this embodiment, the backplate 212 can first be attached to a wall, and the HVAC wires can be attached to a plurality of HVAC connectors on the backplate 212. Next, the head unit 210 can be connected to the backplate 212 in order to complete the installation of the thermostat 208.

Figure 3A:
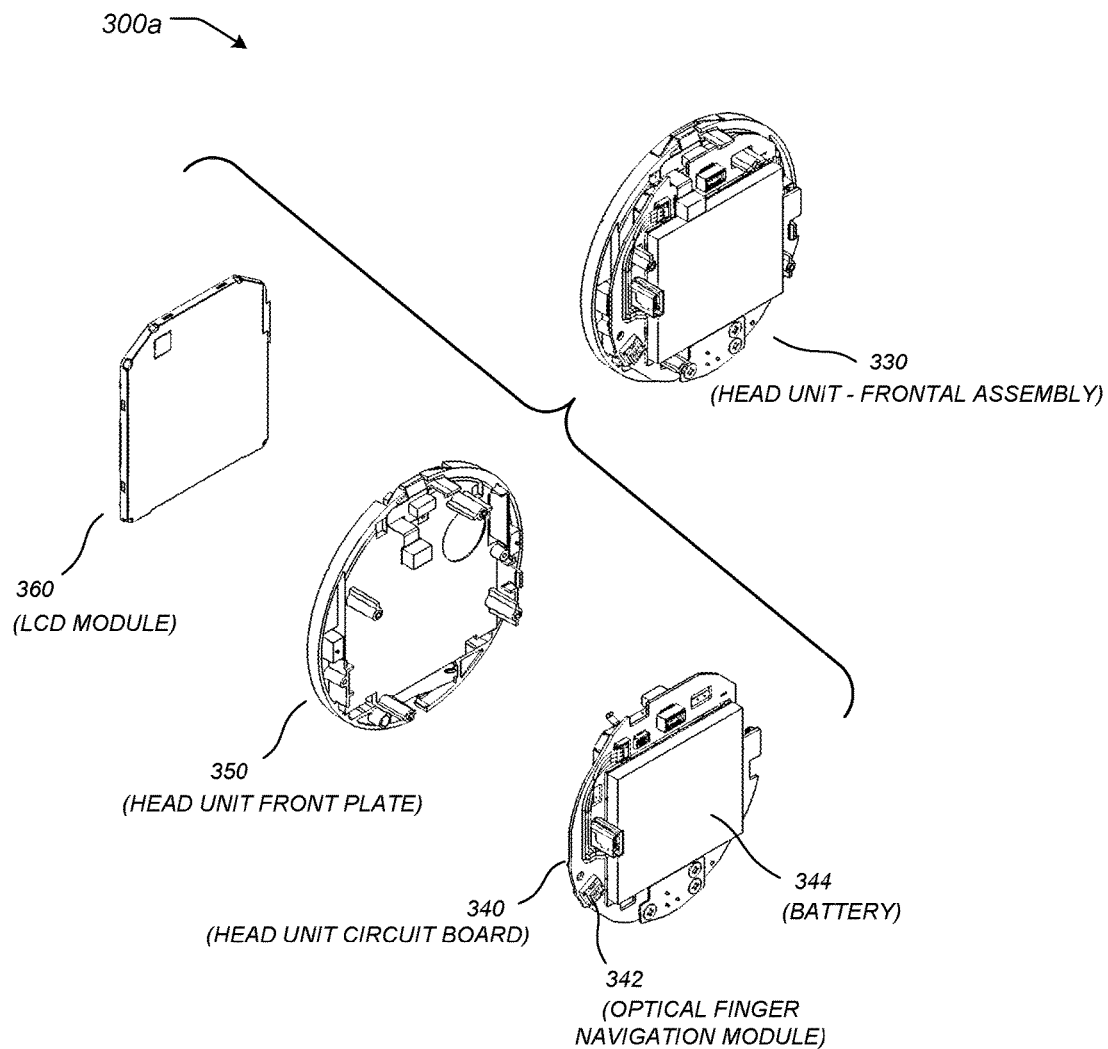
FIG. 3A illustrates an exploded perspective view of a head unit with respect to its primary components, according to one embodiment.

FIG. 3A illustrates an exploded perspective view 300a of a head unit 330 with respect to its primary components, according to one embodiment. Here, the head unit 330 may include an electronic display 360. According to this embodiment, the electronic display 360 may comprise an LCD module. Furthermore, the head unit 330 may include a mounting assembly 350 used to secure the primary components in a completely assembled head unit 330. The head unit 330 may further include a circuit board 340 that can be used to integrate various electronic components described further below. In this particular embodiment, the circuit board 340 of the head unit 330 can include a manipulation sensor 342 to detect user manipulations of the thermostat. In embodiments using a rotatable ring, the manipulation sensor 342 may comprise an optical finger navigation module as illustrated in FIG. 3A. A rechargeable battery 344 may also be included in the assembly of the head unit 330. In one preferred embodiment, rechargeable battery 344 can be a Lithium-Ion battery, which may have a nominal voltage of 3.7 volts and a nominal capacity of 560 mAh.

Figure 3B:
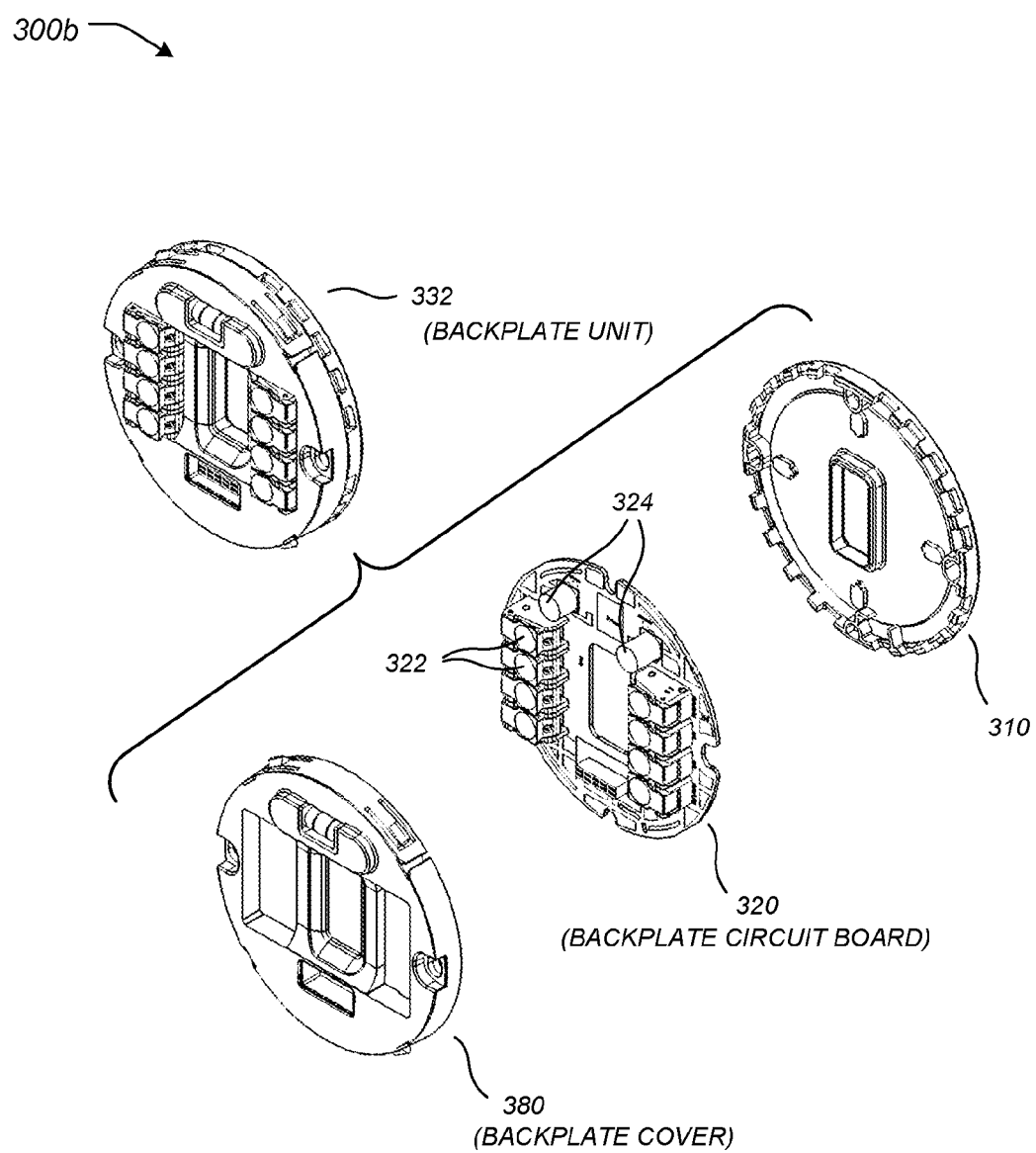
FIG. 3B illustrates an exploded perspective view of a backplate with respect to its primary components, according to one embodiment.

FIG. 3B illustrates an exploded perspective view 300b of a backplate 332 with respect to its primary components, according to one embodiment. The backplate 332 may include a frame 310 that can be used to mount, protect, or house a backplate circuit board 320. The backplate circuit board 320 may be used to mount electronic components, including one or more processing functions, and/or one or more HVAC wire connectors 322. The one or more HVAC wire connectors 322 may include integrated wire insertion sensing circuitry configured to determine whether or not a wire is mechanically and/or electrically connected to each of the one or more HVAC wire connectors 322. In this particular embodiment, two relatively large capacitors 324 are a part of power stealing circuitry that can be mounted to the backplate circuit board 320. The power stealing circuitry is discussed further herein below.

Figure 4A:
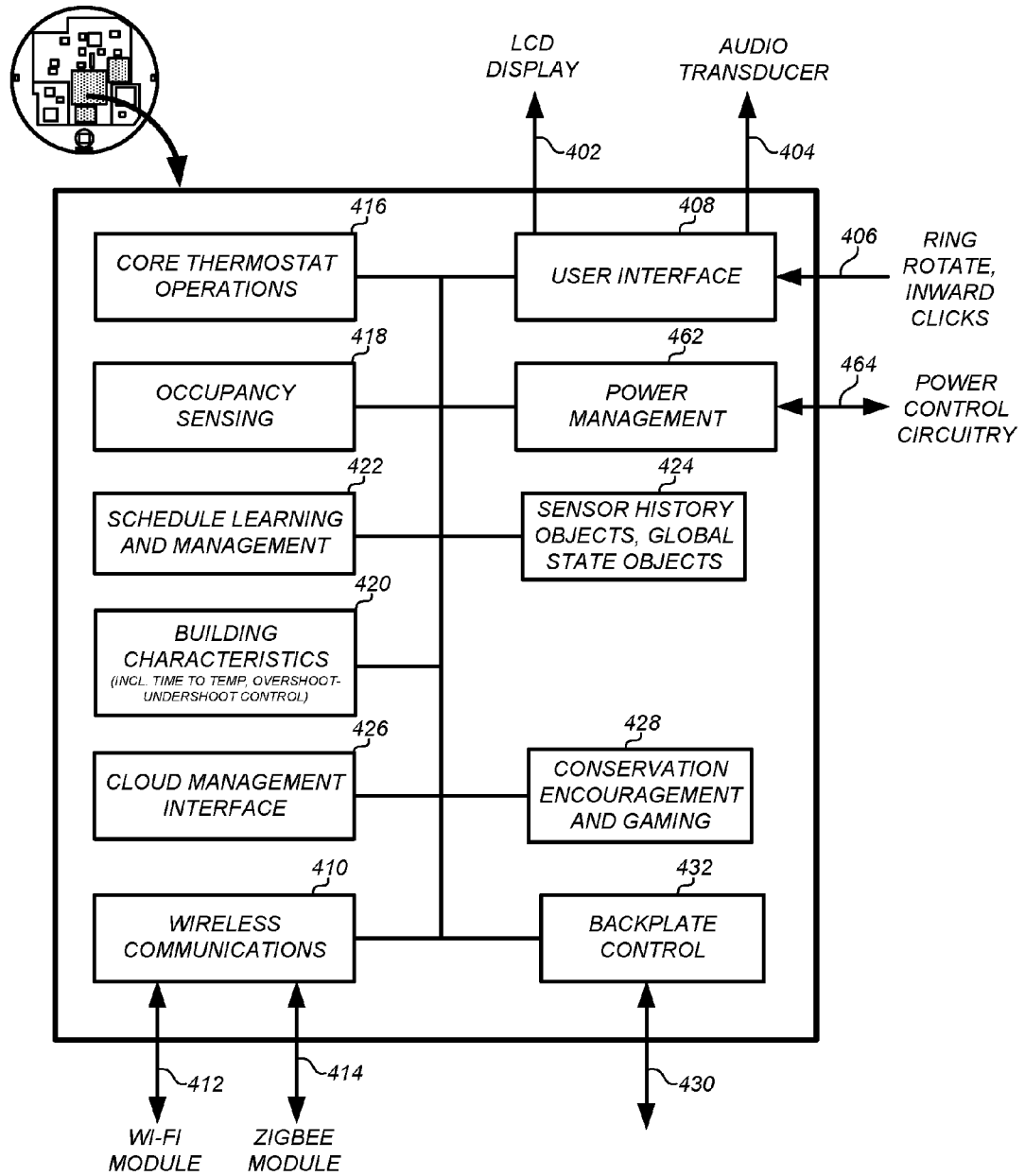
FIG. 4A illustrates a simplified functional block diagram for a head unit, according to one embodiment.

In addition to physical divisions within the thermostat that simplify installation process, the thermostat may also be divided functionally between the head unit and the backplate. FIG. 4A illustrates a simplified functional block diagram 400a for a head unit, according to one embodiment. The functions embodied by block diagram 400a are largely self-explanatory, and may be implemented using one or more processing functions. As used herein, the term "processing function" may refer to any combination of hardware and/or software. For example, a processing function may include a microprocessor, a microcontroller, distributed processors, a lookup table, digital logic, logical/arithmetic functions implemented in analog circuitry, and/or the like. A processing function may also be referred to as a processing system, a processing circuit, or simply a circuit.

In this embodiment, a processing function on the head unit may be implemented by an ARM processor. The head unit processing function may interface with the electronic display 402, an audio system 404, and a manipulation sensor 406 as a part of a user interface 408. The head unit processing function may also facilitate wireless communications 410 by interfacing with various wireless modules, such as a Wi-Fi module 412 and/or a ZigBee module 414. Furthermore, the head unit processing function may be configured to control the core thermostat operations 416, such as operating the HVAC system. The head unit processing function may further be configured to determine or sense occupancy 418 of a physical location, and to determine building characteristics 420 that can be used to determine time-to-temperature characteristics. Using the occupancy sensing 418, the processing function on the head unit may also be configured to learn and manage operational schedules 422, such as diurnal heat and cooling schedules. A power management module 462 may be used to interface with a corresponding power management module on the back plate, the rechargeable battery, and a power control circuit 464 on the back plate.

Additionally, the head unit processing function may include and/or be communicatively coupled to one or more memories. The one or more memories may include one or more sets of instructions that cause the processing function to operate as described above. The one or more memories may also include a sensor history and global state objects 424. The one or more memories may be integrated with the processing function, such as a flash memory or RAM memory available on many commercial microprocessors. The head unit processing function may also be configured to interface with a cloud management system 426, and may also operate to conserve energy wherever appropriate 428. An interface 432 to a backplate processing function 430 may also be included, and may be implemented using a hardware connector.

Figure 4B:
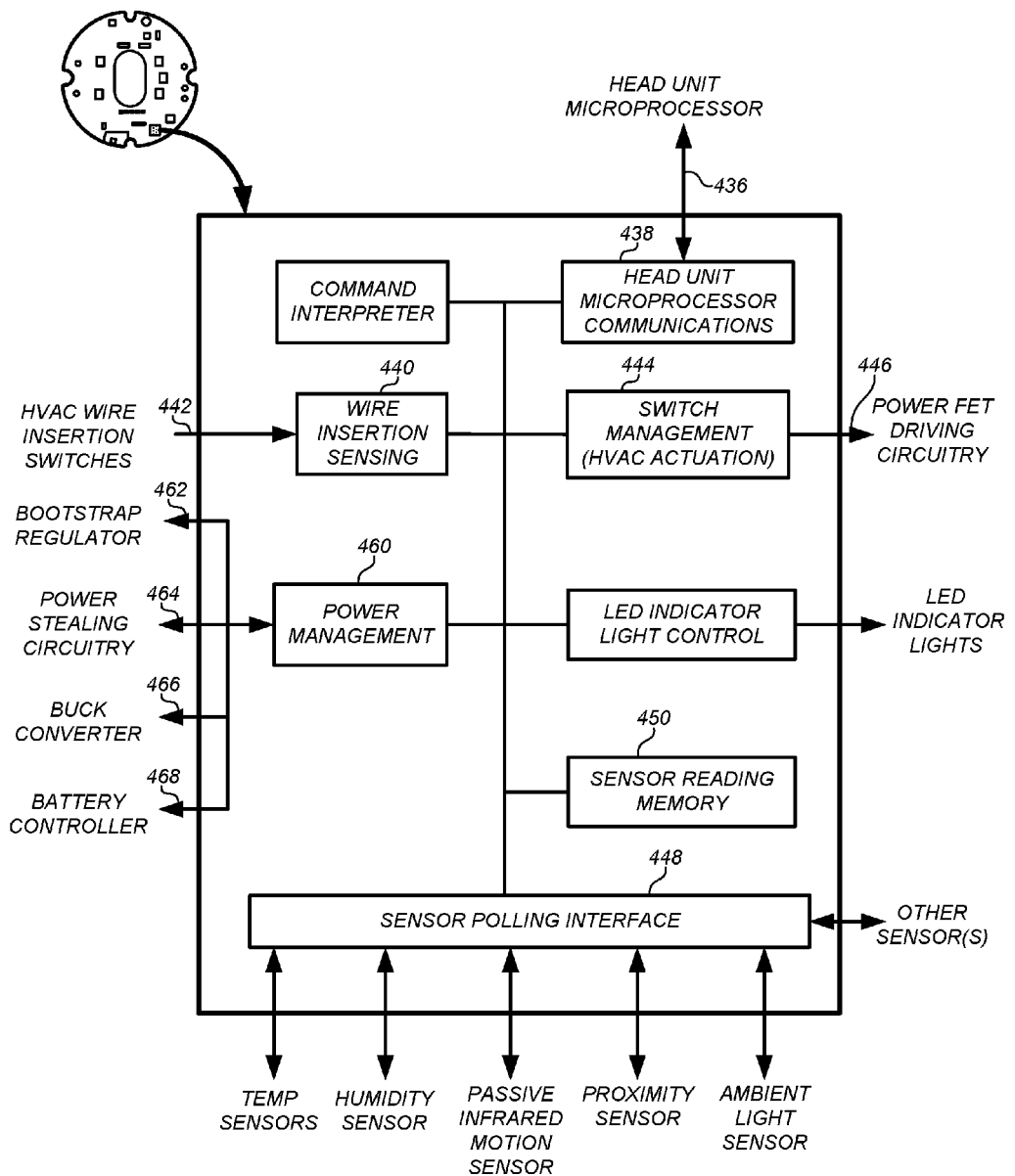
FIG. 4B illustrates a simplified functional block diagram for a backplate, according to one embodiment.

FIG. 4B illustrates a simplified functional block diagram for a backplate, according to one embodiment. Using an interface 436 that is matched to the interface 432 shown in FIG. 4A, the backplate processing function can communicate with the head unit processing function 438. The backplate processing function can include wire insertion sensing 440 that is coupled to external circuitry 442 configured to provide signals based on different wire connection states. The backplate processing function may be configured to manage the HVAC switch actuation 444 by driving power FET circuitry 446 to control the HVAC system.

The backplate processing function may also include a sensor polling interface 448 to interface with a plurality of sensors. In this particular embodiment, the plurality of sensors may include a temperature sensor, a humidity sensor, a PIR sensor, a proximity sensor, an ambient light sensor, and or other sensors not specifically listed. This list is not meant to be exhaustive. Other types of sensors may be used depending on the particular embodiment and application, such as sound sensors, flame sensors, smoke detectors, and/or the like. The sensor polling interface 448 may be communicatively coupled to a sensor reading memory 450. The sensor reading memory 450 can store sensor readings and may be located internally or externally to a microcontroller or microprocessor.

Finally, the backplate processing function can include a power management unit 460 that is used to control various digital and/or analog components integrated with the backplate and used to manage the power system of the thermostat. Although one having skill in the art will recognize many different implementations of a power management system, the power management system of this particular embodiment can include a bootstrap regulator 462, a power stealing circuit 464, a buck converter 466, and/or a battery controller 468.

Figure 5:
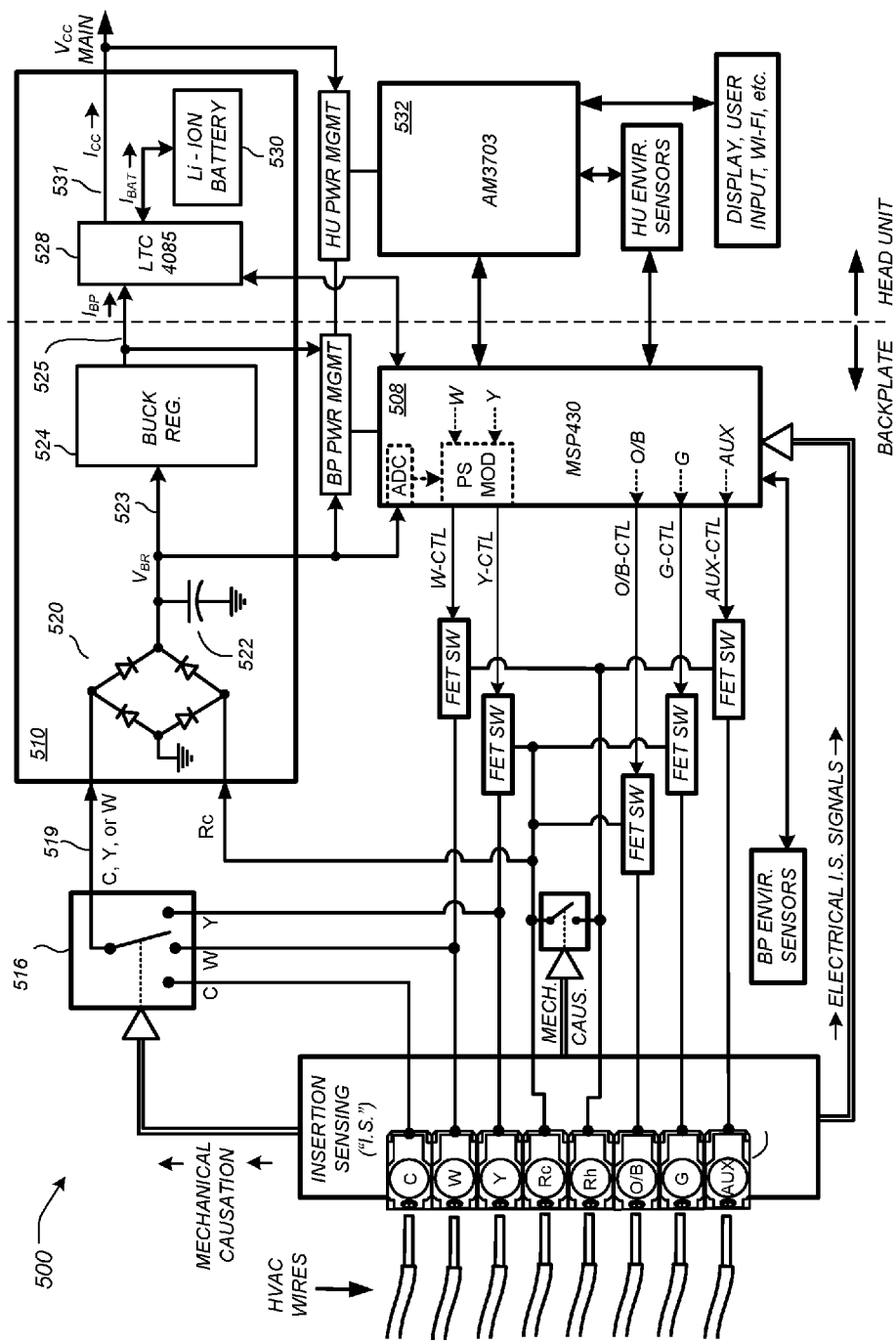
FIG. 5 illustrates a simplified circuit diagram of a system for managing the power consumed by a thermostat, according to one embodiment.

FIG. 5 illustrates a simplified circuit diagram 500 of a system for managing the power consumed by a thermostat, according to one embodiment. The powering circuitry 510 comprises a full-wave bridge rectifier 520, a storage and waveform-smoothing bridge output capacitor 522 (which can be, for example, on the order of 30 microfarads), a buck regulator circuit 524, a power-and-battery (PAB) regulation circuit 528, and a rechargeable lithium-ion battery 530. In conjunction with other control circuitry including backplate power management circuitry 527, head unit power management circuitry 529, and the microcontroller 508, the powering circuitry 510 can be configured and adapted to have the characteristics and functionality described herein below. Description of further details of the powering circuitry 510 and associated components can be found elsewhere in the instant disclosure and/or in the commonly assigned U.S. Ser. No. 13/034,678 filed Feb. 24, 2011-02-24, and U.S. Ser. No. 13/267,871, filed Oct. 6, 2011, both of which are incorporated by reference herein.

By virtue of the configuration illustrated in FIG. 5, when there is a "C" wire presented upon installation, the powering circuitry 510 operates as a relatively high-powered, rechargeable-battery-assisted AC-to-DC converting power supply. When there is not a "C" wire presented, the powering circuitry 510 operates as a power-stealing, rechargeable-battery-assisted AC-to-DC converting power supply. The powering circuitry 510 generally serves to provide the voltage Vcc MAIN that is used by the various electrical components of the thermostat, which in one embodiment can be about 4.0 volts. For the case in which the "C" wire is present, there is no need to worry about accidentally tripping (as there is in inactive power stealing) or untripping (for active power stealing) an HVAC call relay, and therefore relatively large amounts of power can be assumed to be available. Generally, the power supplied by the "C" wire will be greater than the instantaneous power required at any time by the remaining circuits in the thermostat.

However, a "C" wire will typically only be present in about 20% of homes. Therefore, the powering circuitry 510 may also be configured to "steal" power from one of the other HVAC wires in the absence of a "C" wire. As used herein, "inactive power stealing" refers to the power stealing that is performed during periods in which there is no active call in place based on the lead from which power is being stolen. Thus, for cases where it is the "Y" lead from which power is stolen, "inactive power stealing" refers to the power stealing that is performed when there is no active cooling call in place. As used herein, "active power stealing" refers to the power stealing that is performed during periods in which there is an active call in place based on the lead from which power is being stolen. Thus, for cases where it is the "Y" lead from which power is stolen, "active power stealing" refers to the power stealing that is performed when there is an active cooling call in place. During inactive or active power stealing, power can be stolen from a selected one of the available call relay wires. While a complete description of the power stealing circuitry 510 can be found in the commonly assigned applications that have been previously incorporated herein by reference, the following brief explanation is sufficient for purposes of this disclosure.

Some components in the thermostat, such as the head unit processing function, the user interface, and/or the electronic display may consume more instantaneous power than can be provided by power stealing alone. When these more power-hungry components are actively operating, the power supplied by power stealing can be supplemented with the rechargeable battery 530. In other words, when the thermostat is engaged in operations, such as when the electronic display is in an active display mode, power may be supplied by both power stealing and the rechargeable battery 530. In order to preserve the power stored in the rechargeable battery 530, and to give the rechargeable battery 530 an opportunity to recharge, some embodiments optimize the amount of time that the head unit processing function and the electronic display are operating in an active mode. In other words, it may be advantageous in some embodiments to keep the head unit processing function in a sleep mode or low power mode and to keep the electronic display in an inactive display mode as long as possible without affecting the user experience.

When the head unit processing function and the electronic display are in an inactive or sleep mode, the power consumed by the thermostat is generally less than the power provided by power stealing. Therefore, the power that is not consumed by the thermostat can be used to recharge the rechargeable battery 530. In this embodiment, the backplate processing function 508 (MSP430) can be configured to monitor the environmental sensors in a low-power mode, and then wake the head unit processing function 532 (AM3703) when needed to control the HVAC system, etc. Similarly, the backplate processing function 508 can be used to monitor sensors used to detect the closeness of a user, and wake the head unit processing system 532 and/or the electronic display when it is determined that a user intends to interface with the thermostat.

It will be understood by one having skill in the art that the various thermostat embodiments depicted and described in relation to FIGS. 1-5 are merely exemplary and not meant to be limiting. Many other hardware and/or software configurations may be used to implement a thermostat and the various functions described herein below. These embodiments should be seen as an exemplary platform in which the following embodiments can be implemented to provide an enabling disclosure. Of course, the following methods, systems, and/or software program products could also be implemented using different types of thermostats, different hardware, and/or different software.

Figure 6:
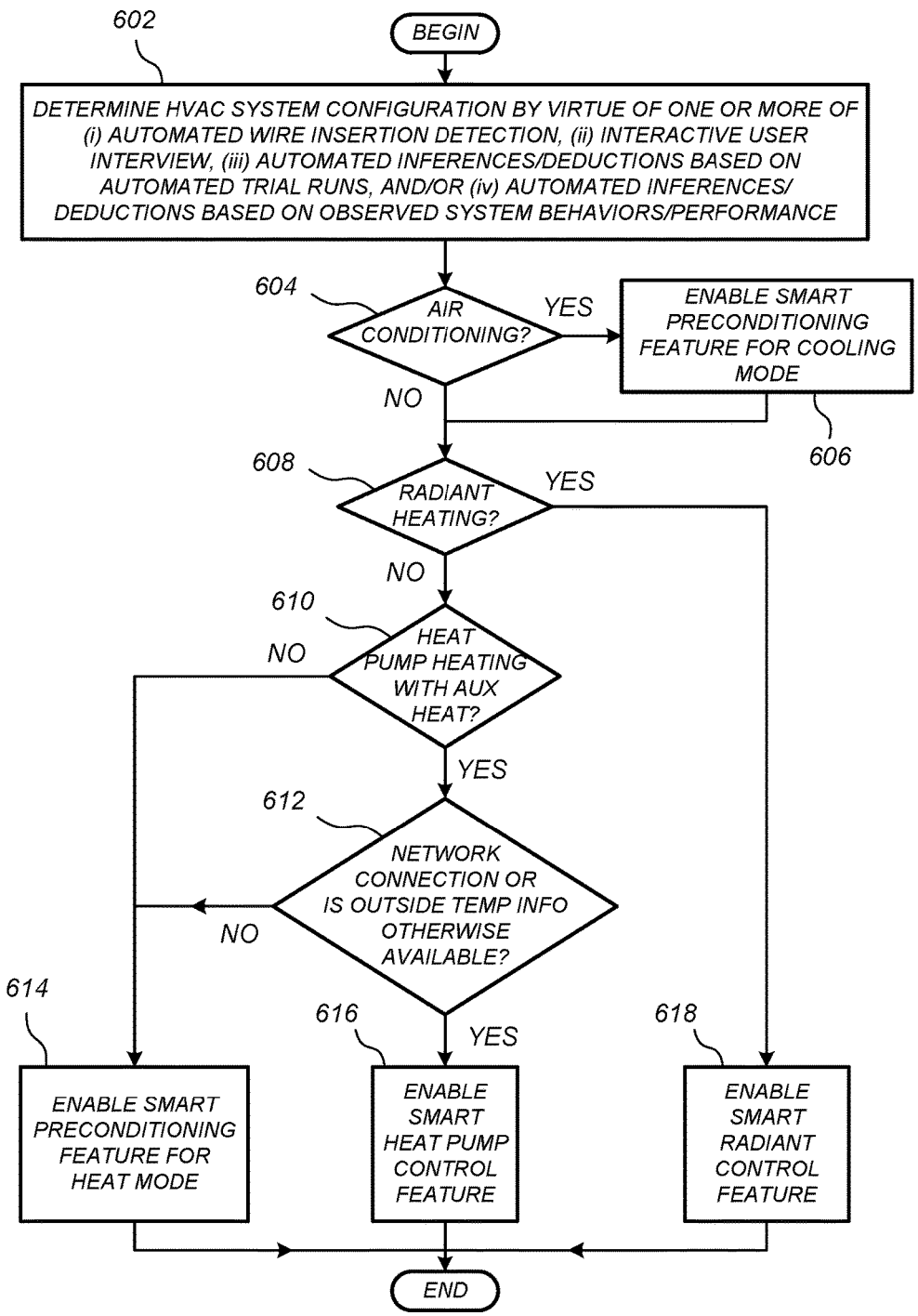
FIG. 6 illustrates steps for automated system matching that can be carried out by a thermostat, according to one embodiment.

FIG. 6 illustrates steps for automated system matching that are preferably carried out by the same thermostat or thermostatic control system that carries out one or more of the other HVAC control methods that are described in the instant patent specification. It has been found particularly desirable to make thermostat setup and governance as user-friendly as possible by judiciously automating the selection of which among a variety of available energy-saving and comfort-promoting control algorithms are appropriate for the particular HVAC configuration of the home in which the thermostat is installed. At step 602, the HVAC system features available for control by the thermostat are determined by virtue of at least one of (i) automated wire insertion detection, (ii) interactive user interview, (iii) automated inferences or deductions based on automated trial runs of the HVAC system at or near the time of thermostat installation, and (iv) automated inferences or deductions based on observed system behaviors or performance. Examples of such methods are described in one or more of the commonly assigned US20120130679A1 and US20120203379A1, both of which are incorporated by reference herein, as well as the present application.

In relation to cooling mode operation, if it is determined that the HVAC system includes air conditioning (step 604), which may be by virtue of a dedicated air conditioning system and/or a heat pump operating in the cooling direction, then at step 606 there is enabled a smart preconditioning feature for cooling mode operation. One example of a particularly advantageous smart preconditioning feature is described in the commonly assigned U.S. Ser. No. 13/632, 150 filed on Sep. 30, 2012, which is incorporated by reference herein. For some embodiments, the smart preconditioning algorithm is configured to: constantly learn how fast the home heats up or cools down by monitoring the recent heating and cooling history of the home, optionally incorporating external environmental information such as outside temperatures, sun heating effects, etc.; predict how long the HVAC system will need to actively heat or cool in order to reach a particular scheduled setpoint; and begin preconditioning toward the particular scheduled setpoint at just the right time such that the scheduled setpoint temperature will be reached at the scheduled setpoint time. User comfort is promoted by virtue of not reaching the scheduled setpoint temperature too late, while energy savings is promoted by virtue of not reaching the scheduled setpoint temperature too early.

In relation to heating mode operation, if it is determined that the HVAC system includes radiant heating (step 608), then at step 618 there is enabled a smart radiant control feature for heating mode operation. One example of a particularly advantageous smart radiant control feature is described in the commonly assigned U.S. Ser. No. 13/632, 152, filed on Sep. 30, 2012, which is incorporated by reference herein. For some embodiments, the smart radiant control feature is configured to monitor radiant heating cycles on an ongoing basis, compute an estimated thermal model of the home as heated by the radiant system, and predictively control the radiant system in a manner that takes into account the thermal model of the house, the time of day, and the previous heat cycle information. The smart radiant control feature is configured to achieve comfortable maintenance band temperatures while also minimizing frequent changes in HVAC on/off states and minimizing HVAC energy consumption. Among other advantages, uncomfortable and energy-wasting target temperature overshoots are avoided.

If it is determined that the HVAC system includes a heat pump including auxiliary resistive electrical heating (i.e., so-called auxiliary or AUX heat) (step 610), and if it is further determined (step 612) that the thermostat is network-connected (such that it can receive outside temperature information based on location data and an internet-based temperature information source) or otherwise has access to outside temperature information (such as by wired or wireless connection to an outside temperature sensor), then at step 616 a smart heat pump control feature is enabled. If at step 610 there is not a heat pump with AUX heat (which will most commonly be because there is a conventional gas furnace instead of a heat pump, or else because there is a heat pump in a so-called dual-fuel system that does not include AUX heat), then at step 614 there is enabled a smart preconditioning feature for heat mode, which can be a similar or identical opposing counterpart to the preconditioning feature for cooling mode discussed supra with respect to step 606. Similarly, if at step 612 there is no network connectivity or other access to outside temperature information, then the smart heat pump control feature of step 616 is not enabled and instead the smart preconditioning feature of step 614 is enabled.

In reference to step 616, one example of a particularly advantageous smart heat pump control feature is described in the commonly assigned U.S. Ser. No. 13/632,093, filed on Sep. 30, 2012 and entitled, "Intelligent Controller For An Environmental Control System", which is incorporated by reference herein. Although the AUX heat function allows for faster heating of the home, which can be particularly useful at lower outside temperatures at which heat pump compressors alone are of lesser efficacy, the energy costs of using AUX heat can often be two to five times as high as the energy costs of using the heat pump alone. For some embodiments, the smart heat pump control feature is configured to monitor heat pump heating cycles on an ongoing basis, tracking how fast the home is heated (for example, in units of degrees F. per hour) by the heat pump compressor alone in view of the associated outside air temperatures. Based on computed correlations between effective heating rates and outside air temperatures, and further including a user preference setting in a range from "Max Comfort" to "Max Savings" (including a "Balanced" selection in between these end points), the smart heat pump control feature judiciously activates the AUX heating function in a manner that achieves an appropriate balance between user comfort and AUX heating costs. For some embodiments, the factors affecting the judicious invocation of AUX heat include (i) a predicted amount of time needed for the heat pump alone to achieve the current temperature setpoint, (ii) whether the current temperature setpoint resulted from an immediate user control input versus whether it was a scheduled temperature setpoint, and (iii) the particular selected user preference within the "Max Comfort" to "Max Savings" range. Generally speaking, the AUX function determination will be more favorable to invoking AUX heat as the compressor-alone time estimate increases, more favorable to invoking AUX heat for immediate user control inputs versus scheduled setpoints, and more favorable to invoking AUX heat for "Max Comfort" directed preferences than for "Max Savings" directed preferences.

For some embodiments, the smart heat pump control feature further provides for automated adjustment of a so-called AUX lockout temperature, which corresponds to an outside air temperature above which the AUX heat will never be turned on, based on the monitored heat pump heating cycle information and the user preference between "Max Comfort" and "Max Savings." Generally speaking, the AUX lockout temperatures will be lower (leading to less AUX usage) for better-performing heat pumps, and will also be lower (leading to less AUX usage) as the user preference tends toward "Max Savings". For some embodiments in which there is network connectivity available such that overnight temperature forecasts can be provided, the smart heat pump control feature further provides for night time temperature economization in which an overnight setpoint temperature may be raised higher than a normally scheduled overnight setpoint if, based on the overnight temperature forecast, the AUX function would be required to reach a morning setpoint temperature from the normal overnight setpoint temperature when morning comes. Advantageously, in such situations, even though the overnight temperature inside the home is made higher it would otherwise be, the user actually saves energy and money by avoiding the use of the AUX function when morning comes.

According to some embodiments, the determinations made at one or more of steps 608 and 610 can be based on automatically observed HVAC system performance information rather than specific system identification information. For example, it may be the case that a particular heating functionality of an HVAC system is not physically a radiant system, but nevertheless tends to exhibit signs of a high thermal mass combined with substantial control lag, making it similar in nature to a radiant heating system. For such cases, the smart radiant control feature may be enabled to improve performance. Likewise, it may not be the case that the HVAC system has a heat pump with AUX functionality, but it may have a two-stage heating functionality in which the first stage (which type was likely chosen as a first stage because it was more cost-effective) tends to be very slow or "fall behind" at lower outside temperatures, and in which the second stage (which type was likely chosen as a second stage because it was less cost-effective) tends to be very time-effective in heating up the home, thus making the system act very much like a heat pump system with AUX functionality. For such cases, the smart heat pump control feature may be enabled to improve performance.

AUTOMATICALLY CONFIGURING OPERATIONAL MODES

In modern network-enabled homes, many different types of devices can be used to control various aspects of the home environment, including air temperature, humidity, fan speed, music, television, appliances, and/or the like. These modern control devices may include a number of connections, both wired and wireless, to other household systems. Depending on the complexity of these connections, modern control devices may appear difficult to install to the average homeowner and create a perception that professional installation is required in order to enjoy the benefits of modern control devices.

Presented herein are methods and systems to help simplify the connection configuration process that may otherwise prove daunting to the average homeowner. Specifically, the control device may mechanically or electrically detect the available connections to other systems within an enclosure. The control device may then intelligently analyze these connections and determine the configurations of the other systems. If the control device is able to determine the other system configurations, then the control device can operate in accordance with those configurations without requiring additional user input. However, if the control device is unable to determine these configurations (i.e. multiple system configurations are possible with the same set of connections) then a user interface on the control device may interview the user to acquire the minimal amount of information necessary to pinpoint the other system configurations. Additionally, connection errors can be detected, and users can be alerted before possible damage can occur to the other systems. These embodiments may simplify the installation process and be configured to only require user input when absolutely necessary.

As various methods and systems for determining and operating in accordance with external system configurations are presented, it will be understood that the ensuing discussion can apply to any control unit as described above. However, throughout the remainder of this disclosure a specific type of implementation will be used, namely a thermostat. It will be understood that the principles described using thermostat hardware and software can be easily applied to other control units by one having skill in the art in light of this disclosure.

In the case of the thermostat, the primary external system with which it will interface is an HVAC system. Generally, an HVAC system can communicate with the thermostat through a plurality of HVAC control wires. Depending on the configuration of the HVAC system, different wires may be available. When replacing an old thermostat with a new modern thermostat, users are typically instructed to record the connection made by each wire to the old thermostat, and then make the same connection to the corresponding connector on the new thermostat. For example, a wire connected to the C terminal of the old thermostat should be connected to the C terminal of the new thermostat.

Simply duplicating in the new thermostat the connections that were made to the old thermostat represents only half of the installation challenge. As will be understood by one having skill in the art, many different HVAC system configurations are possible depending on the climate, the geographic location, the time of year, the age of the home, the natural resources locally available, and/or the like. For example, some homes may operate using a conventional gas-powered heater and a compressor-based air conditioner. Other homes may use a heat pump. Because of the limitations of heat pumps in extreme weather, supplemental systems may be used, such as electrical strip heat, gas heaters, radiant flooring, boilers, and/or the like. Besides heating and air-conditioning, an HVAC system may also provide other features, such as humidifiers, dehumidifiers, fans, emergency heating, and/or the like.

When certain wire connections between the HVAC system and the thermostat are found to exist, a reliable inference can sometimes be made as to at least part of an HVAC system configuration. For example, if a wire is connected between the HVAC system and the O/B connector of the thermostat, then it can be reliably inferred that the HVAC system uses a heat pump. Therefore, by analyzing each of the connections to the thermostat, some or all of the system configuration can be deduced. The difficulty lies in the fact that different HVAC system configurations may use similar wire connections to the thermostat. Thus, every HVAC system configuration cannot be deduced based solely on the wire connections. For example, in a conventional system the Y1 wire may be used to activate an air conditioner, whereas in a heat pump system, the Y1 wire may be used to activate the heat pump in cooperation with an O/B wire. In a heat pump system, it may not be possible to determine whether the system is dual-fuel or single-fuel based solely on the connections. In these cases, additional user input may be required.

In cases where the HVAC system configuration can be reliably determined based on the wire connections, the thermostat can operate in accordance with that system configuration without requiring additional user input. In cases such as those above where additional information may be required, a user interface of the thermostat may present an interview-style set of questions to the user in order to acquire the needed information. The user interview may include instructions to visit a website to educate the user on different HVAC configurations that will help the user understand their HVAC system. Additionally, the user interview may include a recommendation to contact a professional installer in cases where the user is confused or the HVAC system is complicated.

Figure 7A:
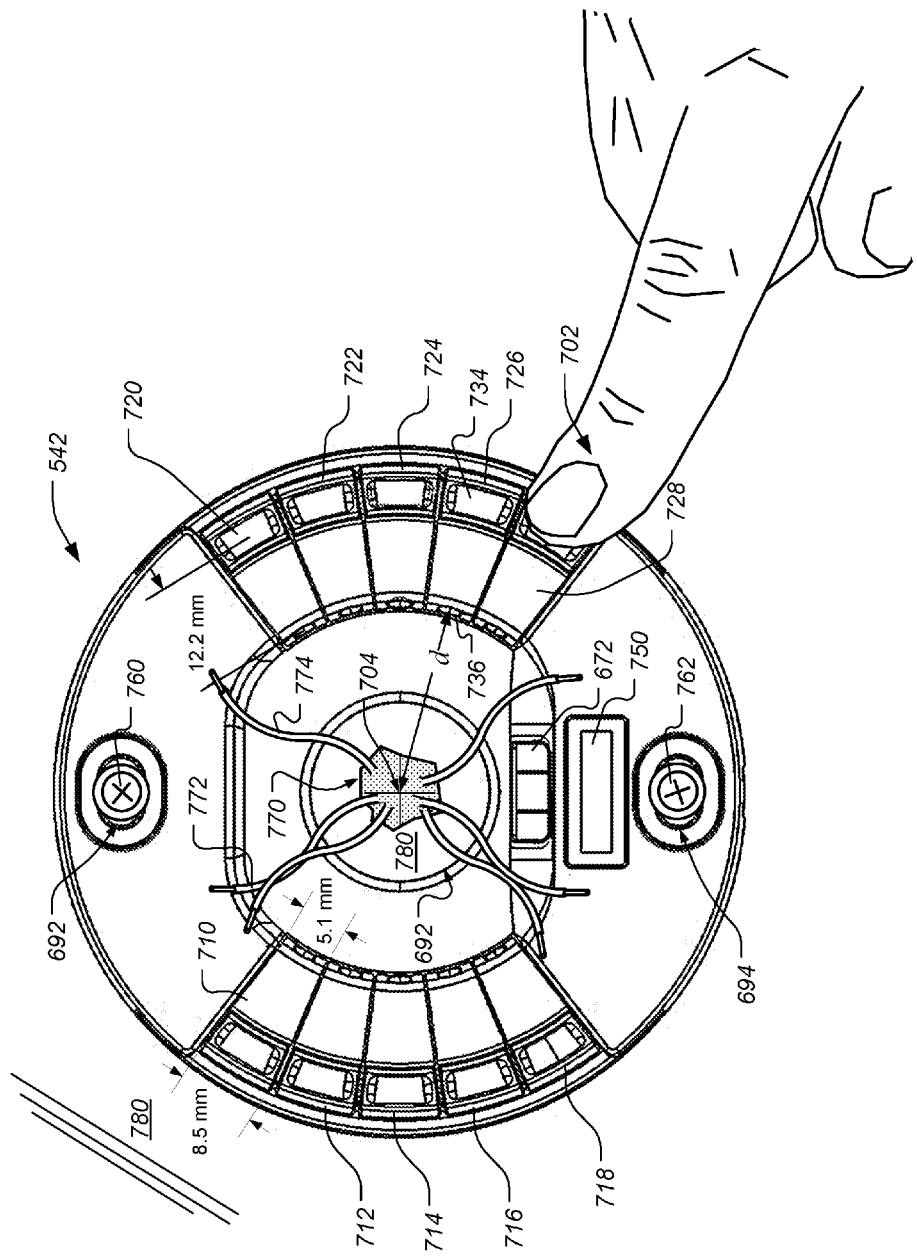
FIGS. 7A-7B are diagrams showing a thermostat backplate having a plurality of wiring terminals, according to some embodiments.
Figure 7B:
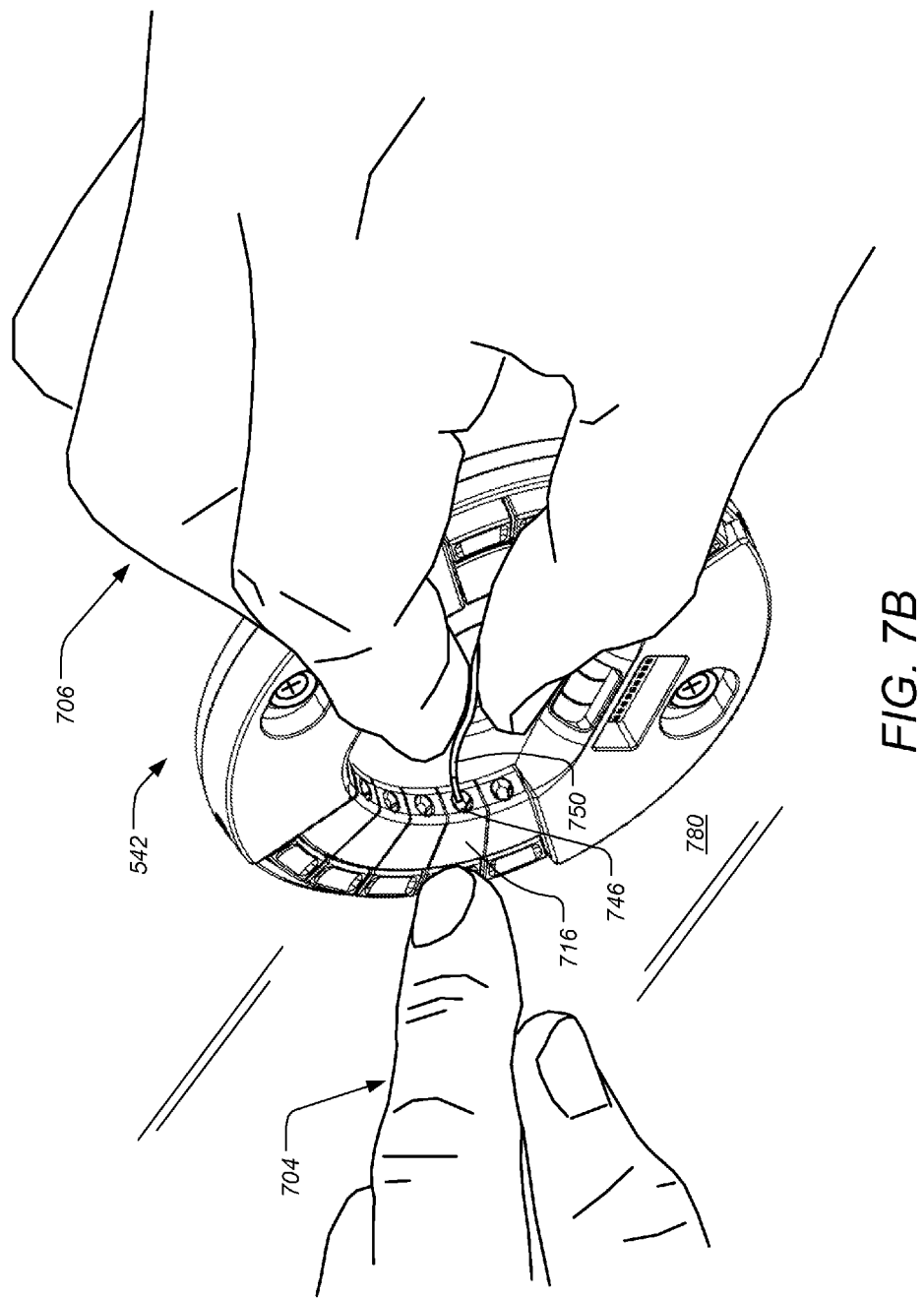

FIGS. 7A-7B are diagrams showing a thermostat backplate having a plurality of user-friendly tool-free wiring terminals, according to some embodiments. For ease of installation, the thermostat 102 is separable into a head unit 540 and backplate 542. Shown in FIG. 7A is a plan view of backplate 542 which has been configured for easy installation by a non-expert installer, such as an end-user. Back plate 542 includes two banks of HVAC wire connectors, which together provide capability for tool-free connection to up to 10 HVAC system wires. A semi-circularly arranged left bank includes 5 connectors 710, 712, 714, 716 and 718. Likewise, a semi-circularly arranged right bank includes 5 connectors 720, 722, 724, 726 and 728. Although 10 wiring connectors are shown in the embodiments of FIG. 7A, other numbers of connectors (for example 6, 8 or 12 connectors) can be similarly arranged in banks of circular arrangements. A large central opening 692 is provided through which the HVAC wires can pass when backplate 542 is wall mounted. As shown in FIG. 7A, the backplate is mounted using two screw fasteners 760 and 762 passing through backplate mounting holes 692 and 694 respectively and anchored into wall 780. A number of HVAC system wires, for example wires 772 and 774 are shown protruding through wall hole 770 and through backplate central opening 692. By arranging the connectors along an arc close to the outer periphery of the backplate 542, a relatively large number of wiring connectors can be accommodated, with each individual connector still being large enough to allow for ease of making electrical connection with HVAC wires by a non-expert without the use of tools. In particular, each wiring connector has a spring loaded, pushable button which allows for an HVAC wire to be inserted into a wire hole. For example, connector 726 has a spring loaded button 734 and a wire hole 736. When the button is released, the spring action within the connectors a wire securely grasps the wire inserted in the wire hole. Each connector is wedge shaped as shown, with the button end being wider than the wire-hole end. In the examples shown, the button end of the connector is 8.5 mm in width and the wire-hole end is 5.1 mm in width. In the embodiment shown, each connector occupies 15.3 degrees of an arc on the backplate 542, however, it has been found that connector widths of between 10-20 degrees of arc to be suitable for many applications. Another important dimension from a usability standpoint has been found to be the distance from the button surface to the wire insertion location (the wire hole). If the button to wire-hole distance is too short, it has been found that many users have difficulty in installation because the finger used to press the button tends to block a good view of the wire hole. In the embodiments shown the distance from the button center to the wire hole is 12.2 mm.

By arranging the buttons in an arc-shaped pattern close to the outer periphery of backplate 542, and by shaping each connecter in a wedge-like shape, the surface area of the buttons can be maximized since there is more room for each button when the connectors are shaped and arranged as shown. Additionally, it has been found that it is easier for many users to press a button that is very close to the periphery of a backplate device, especially located close to the left and right edges when wall-mounting a thermostat. HVAC system wires, such as wires 772 and 774 are commonly 18 gauge solid (18AWG or 1.024 mm diameter). As a result the wires protruding from the hole in the wall are rather stiff and may be difficult to bend and otherwise manipulate. By passing the HVAC wires through a central opening 692 and arranging the connectors close to the outer periphery of backplate 542 and positioning the wire holes in an arc-shaped pattern surrounding the central opening, more space is allowed the user to bend the HVAC wires. The distance d from the center 704 of the central opening 692 (and of the backplate 542) to the wire hole in each connector is 21 mm. Also, since the wire holes are arranged in a circular pattern around the central opening 692, the distance d from the wire hole to the center of the backplate is equal for each connector, thereby aiding the installation of many wires being the same length protruding from wall 780 from the same hole 770. The radial direction between the hole 770 and the wire holes of the conductors also allows for few and less complicated bending of the HVAC wires during installation, since each hole is directly facing the hole 770. Thus, for many reasons, the placement, shape orientation and arrangement of the connectors on the backplate 542 has been found to greatly increase the user install ability of the thermostat. An example of user's finger 702 is shown pressing the button of connector 728.

FIG. 7B is a perspective view of a backplate being installed on a wall, according to some embodiments. The backplate 542 is shown attached to surface of wall 780. The user has a left hand 704 that is pressing the button of connector 716 while a right hand 706 is inserting a wire 750 into the wire hole 746 of wiring connector 716. Note that due to the adequate distance between the button and wire hole of the connector, the user's finger used to press the button does not block the user's view of the wire hole. It has been found that the combination of pressing a spring loaded button and inserting the wire in a wire hole is much easier for non-expert installers than conventional screw-type wire terminals which require carefully holding a wire in place while positioning and turning a relatively small sized screw driver.

According to some embodiments, the backplate of the thermostat can be equipped with a small mechanical detection switch (not shown) for each distinct input port, such that the insertion of a wire (and, of course, the non-insertion of a wire) is automatically detected and a corresponding indication signal is provided to a processing system of the thermostat upon initial docking. In this way, the thermostat can have knowledge for each individual input port whether a wire has, or has not, been inserted into that port. Preferably, the thermostat can be also provided with electrical sensors (e.g., voltmeter, ammeter, and ohmmeter) corresponding to each of the input wiring connectors. The thermostat can thereby be enabled, by suitable programming, to perform some fundamental "sanity checks" at initial installation. By way of example, if there is no input wire at either the Rc or Rh terminal, or if there is no AC voltage sensed at either of these terminals, further initialization activity can be immediately halted, and the user notified on the user interface, because there is either no power at all or the user has inserted the Rc and/or Rh wires into the wrong terminal. By way of further example, if there is a live voltage on the order of 24 VAC detected at any of the W, Y, and G terminals, then it can be concluded that the user has placed the Rc and/or Rh wire in the wrong place. Throughout the remainder of this disclosure, these capabilities will be referred to separately as "mechanical detection" and "electrical detection." For further details of mechanical detection and electrical detection including illustrative examples of which can be used in connection with the embodiments described herein, see commonly assigned U.S. patent application Ser. No. 13/034,666 filed on Feb. 24, 2012, and U.S. patent application Ser. No. 13/624,878 filed on Sep. 21, 2012, both of which are incorporated by reference herein.

In some embodiments, it has been found particularly useful for the thermostat itself to be self-contained such that a knowledge base of possible HVAC system configurations is stored within the thermostat. The user interface may provide wiring charts, scenario diagrams, interview-style questions, and so forth that have been preloaded on the thermostat in order to facilitate easy installation. This may provide a user with all of the instructions necessary for installation without requiring network activity to access a URL or website information. In other embodiments, the thermostat may instead be provided with wire insertion sensors using mechanical detection or electrical detection in combination with a communication chip and a user interface. In this case, the thermostat may provide wiring configuration information to the cloud server from which is retrieved possible HVAC system configurations. Although this embodiment may not be self-contained like the first embodiment, the cloud-based configuration database can be updated constantly at the cloud server.

In still other embodiments the thermostat need not require a user interface at all. Instead, the interface may be provided by a smart phone, PDA, or other mobile computing device. In this case, the user may interface with the thermostat using the mobile computing device. This may allow the cost of the thermostat to be greatly reduced as a user interface may be eliminated. Additionally, the power usage of the thermostat may be conserved by not requiring a user interface. Of course, the installation methods described herein for determining an HVAC system configuration may also operate using the mobile computing interface.

It will be understood in light of this disclosure that one having skill in the art could readily combine any of these methods for providing installation information. Namely, information may be stored a priori on the thermostat, provided by a cloud server, and or interfaced with a mobile computing device, depending on the particular embodiment and use thereof. However, it has been discovered that storing all or most of the information required for installation on the thermostat can be most advantageous because no network connection is required. This avoids a so-called "chicken and egg" problem, wherein users without network connections cannot access installation information, and they are unable to diagnose the problem because they have no network connection. This scenario causes many users to simply give up and return the thermostat in exchange for a more basic model that does not provide advanced functionality.

Figure 8:
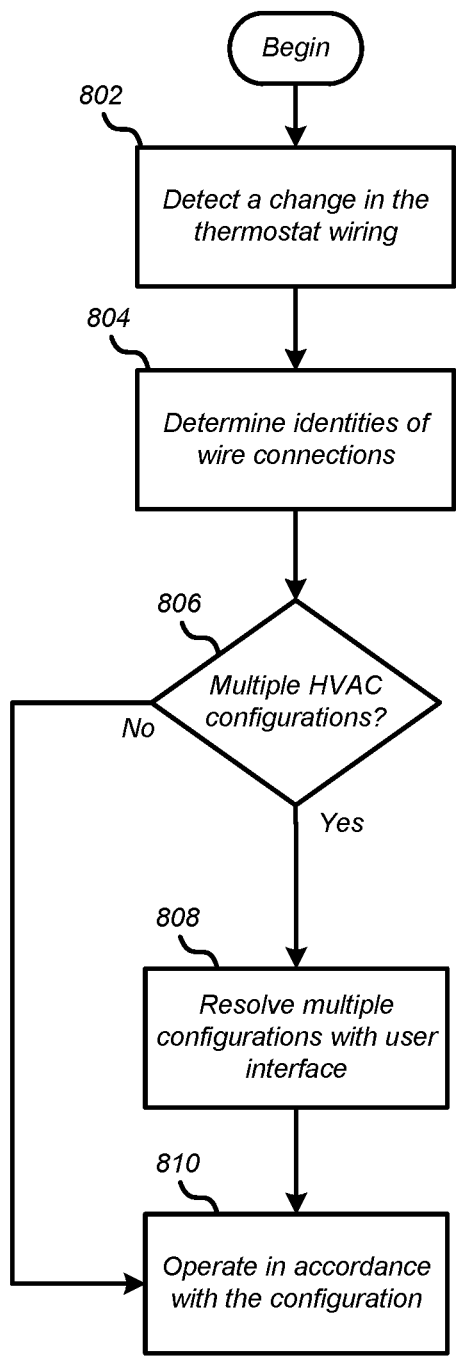
FIG. 8 illustrates a flowchart of a method for determining an HVAC configuration using wire connectors, according to one embodiment.

FIG. 8 illustrates a flowchart 800 of a method for determining an HVAC configuration using wire connectors, according to one embodiment. The method may include detecting a change in the thermostat wiring (802). The change may be detected using mechanical detection techniques and/or electrical detection techniques as described above. In one embodiment, a delay may be added such that these changes are not detected until after a batch of changes has been made, such as during installation process after the thermostat is assembled. This detection may also be carried out by a connection sensing module coupled to a plurality of HVAC connectors. The connection sensing module may be configured to determine the identities of a first subset of the plurality of HVAC connectors into which corresponding HVAC wires have been inserted.

The method may also include determining identities of the wire connectors (804). In one embodiment, this step may comprise a processing system that is configured to process the identities of the subset of HVAC connectors to determine a configuration of the HVAC system to be controlled.

The method may further include determining whether multiple HVAC system configurations are indicated by the connected wires (806). In one embodiment, this may be determined by identifying, based on the identities of the first subset of identified HVAC connectors, whether (i) only a single possible HVAC system configuration is indicated thereby, or (ii) multiple possible HVAC system configurations are indicated thereby.

If it is determined that only a single possible HVAC system configuration is indicated, then the method may include operating the HVAC system according to the single possible HVAC system configuration (810). Alternatively, if it is determined that multiple HVAC configurations are possible, the method may include resolving the multiple possible HVAC system configurations down to a particular one HVAC configuration (808). In one embodiment, the multiple HVAC system configurations may be resolved based on at least one user response to at least one inquiry to a user presented on a user interface. Examples of such user interfaces may be discussed further herein below. After the multiple HVAC system configurations have been resolved to a single HVAC configuration, the system may then operate in according to the particular HVAC system configuration (810).

It should be appreciated that the specific steps illustrated in FIG. 8 provide particular methods of determining an HVAC system configuration according to various embodiments of the present invention. Other sequences of steps may also be performed according to alternative embodiments. For example, alternative embodiments of the present invention may perform the steps outlined above in a different order. Moreover, the individual steps illustrated in FIG. 8 may include multiple sub-steps that may be performed in various sequences as appropriate to the individual step. Furthermore, additional steps may be added or removed depending on the particular applications. One of ordinary skill in the art would recognize many variations, modifications, and alternatives.

The method described above can be implemented using virtually any control unit for an enclosure. In the case of a thermostat, the method described above can be used to configure the thermostat to be compatible with virtually any HVAC system configuration. The particular thermostat described herein includes ten distinct HVAC wire connectors. However, it will be understood that other thermostat embodiments may include more or fewer HVAC wire connectors, which may have different names or labels associated with HVAC wires. Depending on which wires are available, and which wire connectors are used by the particular thermostat embodiment, different logical algorithms may be used to determine an HVAC configuration.

In order to provide an enabling disclosure, a description is provided below for one particular logical algorithm used in a preferred thermostat embodiment. In light of this disclosure, one having skill in the art can readily adapt the algorithm described below to be compatible with virtually any HVAC system configuration. This exemplary algorithm can be implemented using high or low level programming languages on a microcontroller or microprocessor in the thermostat embodiments. For example, the flowcharts and algorithms described below may be implemented, for example, using "switch" statements or a nested series of "if-then-else" control structures. It should be noted that the exact order of operations described below is merely exemplary, and not meant to be limiting. Alternate embodiments could vary both the order in which mechanical connections are tested and the logical pathways dependent on the results of detecting mechanical connections.

Figure 9:
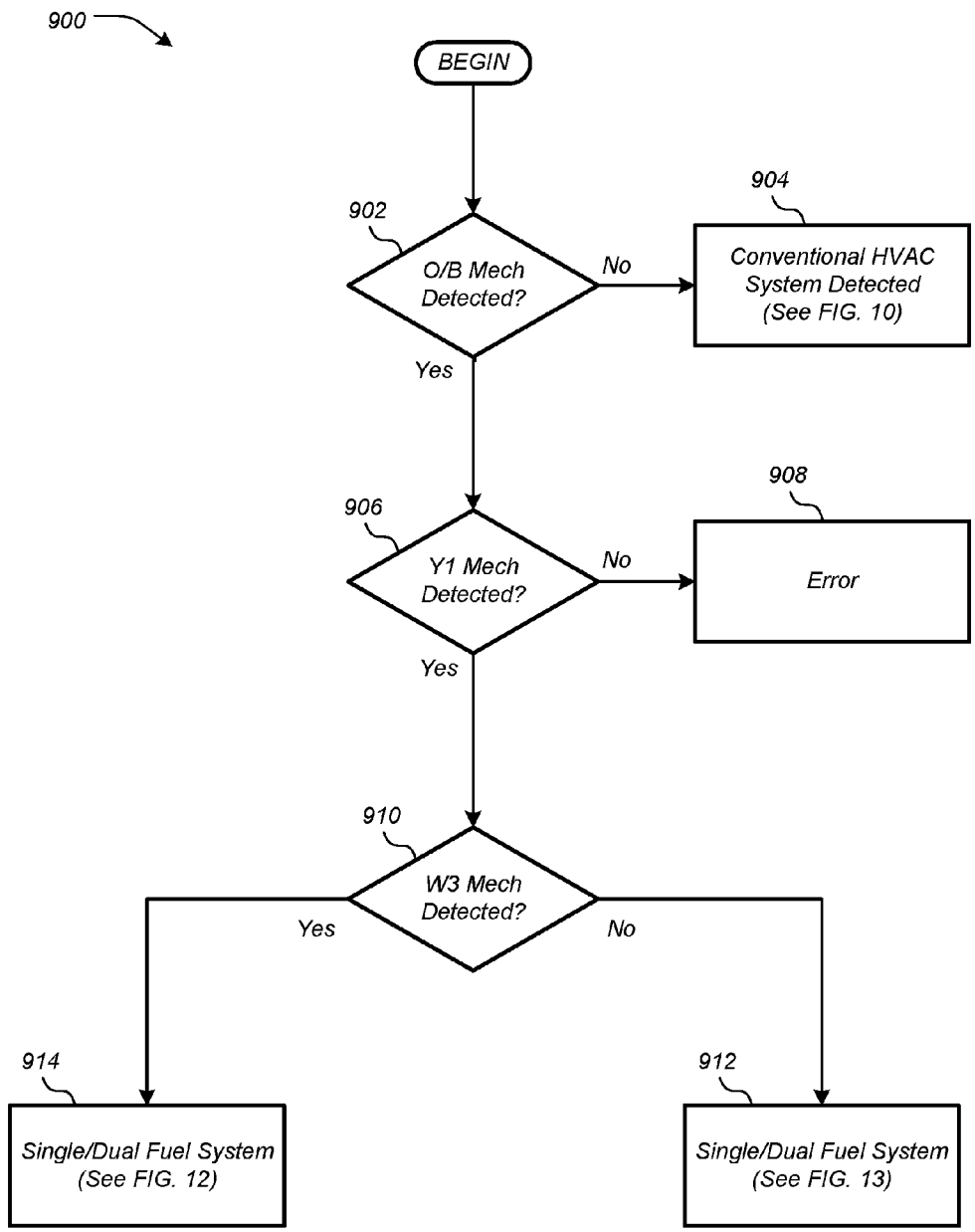
FIG. 9 illustrates a flowchart of a method of determining whether an HVAC system uses a heat pump, according to one embodiment.

FIG. 9 illustrates a flowchart 900 of a method of determining whether an HVAC system uses a heat pump, according to one embodiment. In this embodiment, it can first be determined whether a wire has been mechanically inserted into an O/B connector of the thermostat (902). The O/B wire can be used to control the direction of a heat pump, i.e. whether the heat pump is heating or cooling the inside of the enclosure. Generally, the O/B wire is not used in a conventional HVAC system. As used herein, the term "conventional" may be used to refer to any HVAC system that does not use a heat pump. Therefore, if a wire is not mechanically detected in the O/B connector, it can be reliably determined that the HVAC system uses a conventional heater and/or air conditioner (904). The discussion for conventional systems continues in relation to FIG. 10 described herein below.

Next, the method may determine whether a wire is mechanically detected at the Y1 connector (906). Generally, the Y1 wire is used to activate the heat pump. If no wire is detected at the Y1 connector, then this may result in an error condition (908). For example, a message can be displayed on the user interface informing the user that a Y1 wire is not detected, and the heat pump requires a Y1 wire. The user could also be referred to a website explaining the issue and providing more information. Refer to FIGS. 14-18 later in this disclosure for a discussion of addressing errors and/or ambiguities using the user interface of the thermostat.

If a wire is detected at the Y1 connector, it may next be determined whether a wire is mechanically detected at the W3 connector (910). At this point, the thermostat knows that it is dealing with a heat pump based HVAC system; however, many different heat pump configurations can exist. In this particular embodiment, the W3 wire can be used to segregate the various possible heat pump configurations into two categories. The first category of heat pump systems uses the W3 wire (914), and will be discussed in relation to FIG. 12 below. Similarly, the second category of heat pump system does not use the W3 wire (912), and will be discussed in relation to FIG. 13 below.

Figure 10:
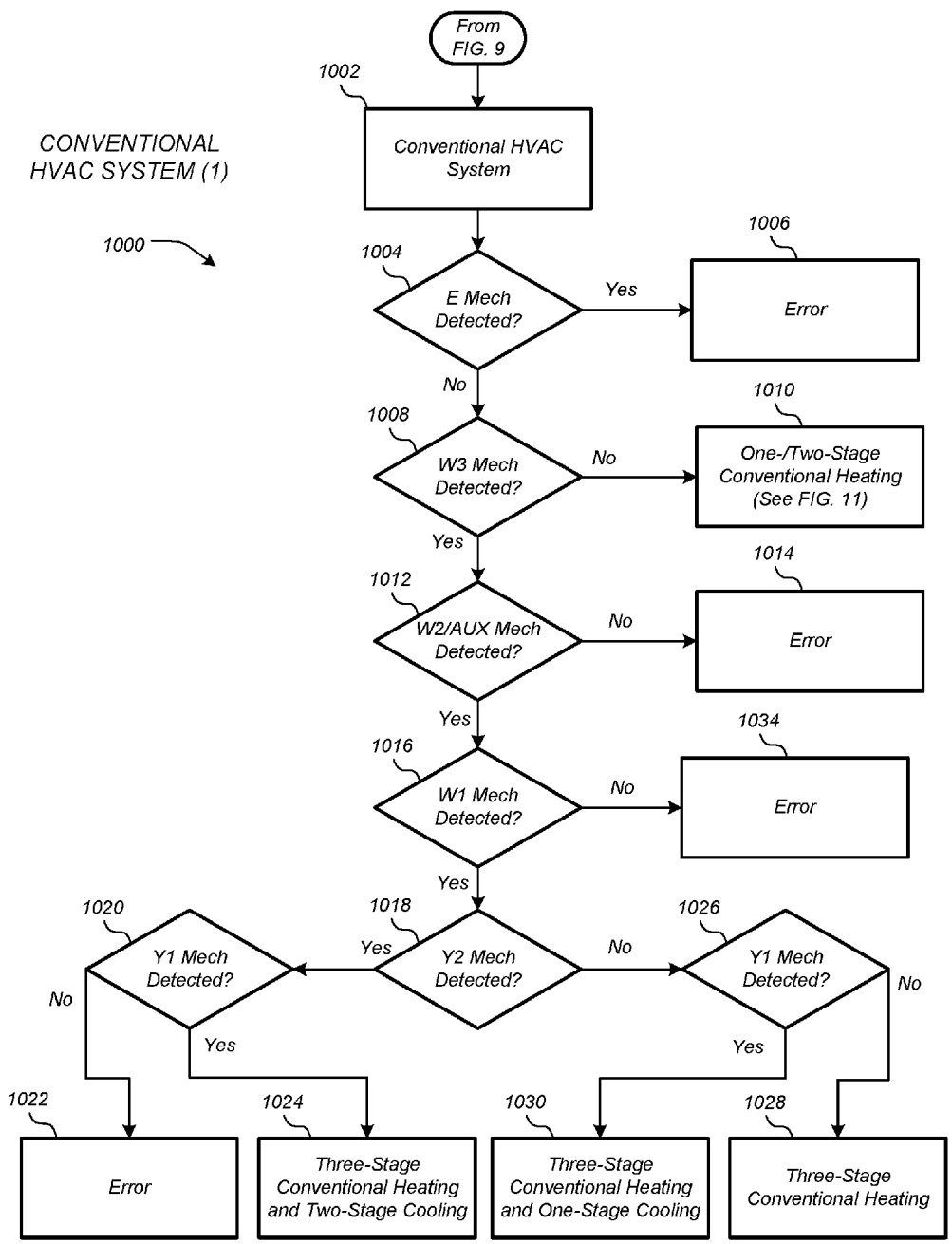
FIG. 10 illustrates a flowchart of a method for determining an HVAC system configuration for a conventional HVAC system, according to one embodiment.

FIG. 10 illustrates a flowchart 1000 of a method for determining an HVAC system configuration for a conventional HVAC system, according to one embodiment. Flowchart 1000 may be considered a continuation of flowchart 900 from FIG. 9. At this point, it may have already been established that a conventional HVAC system—rather than a heat pump—is connected to the thermostat because no O/B wire was connected (1002). Next, it can be determined whether a wire is mechanically detected at the E connector. If an E wire is detected, an error may be displayed on the user interface informing a user that the E wire should only be connected when an O/B wire is connected in a heat pump system (1006).

Next, it can be determined whether a wire is mechanically detected at the W3 connector (1008). If a W3 wire is not detected, then it may be possible to determine that a one-stage or a two-stage conventional heating unit is connected to the thermostat (1010). This option may be processed in accordance with the flowchart discussed below in relation to FIG. 11 below. If a W3 wire is mechanically detected, then it can next be determined whether a wire is mechanically detected at the W2/AUX connector (1012). If a W2/AUX wire is not detected, then an error may be displayed on a user interface explaining that a W3 wire also requires a W2/AUX wire (1014). Next, it can be determined whether a wire is mechanically detected at the W1 connector (1016). If a W1 wire is not detected, then an error may be displayed on the user interface that additional wires may be required because the W2/AUX wire has been detected by itself (1034).

Next, it can be determined whether a wire is mechanically detected at the Y2 connector (1018), as well as whether a wire is mechanically detected at the Y1 connector (1020, 1026). If a Y2 wire is connected but a Y1 wire is not connected, then an error may be displayed on a user interface informing a user that a Y2 wire requires a Y1 wire (1022). If both a Y1 wire and a Y2 wire are connected, then the thermostat may determine that a three-stage conventional heating with a two-stage conventional cooling HVAC system configuration is present (1024). If a Y1 wire is connected without a Y2 wire, then the thermostat may determine that a three-stage conventional heating and one-stage conventional cooling HVAC system configuration is present (1030). Finally, if it is determined that neither the Y1 wire nor the Y2 wire is connected, then it may be determined that a three-stage conventional heating HVAC system configuration is present (1028).

Figure 11:
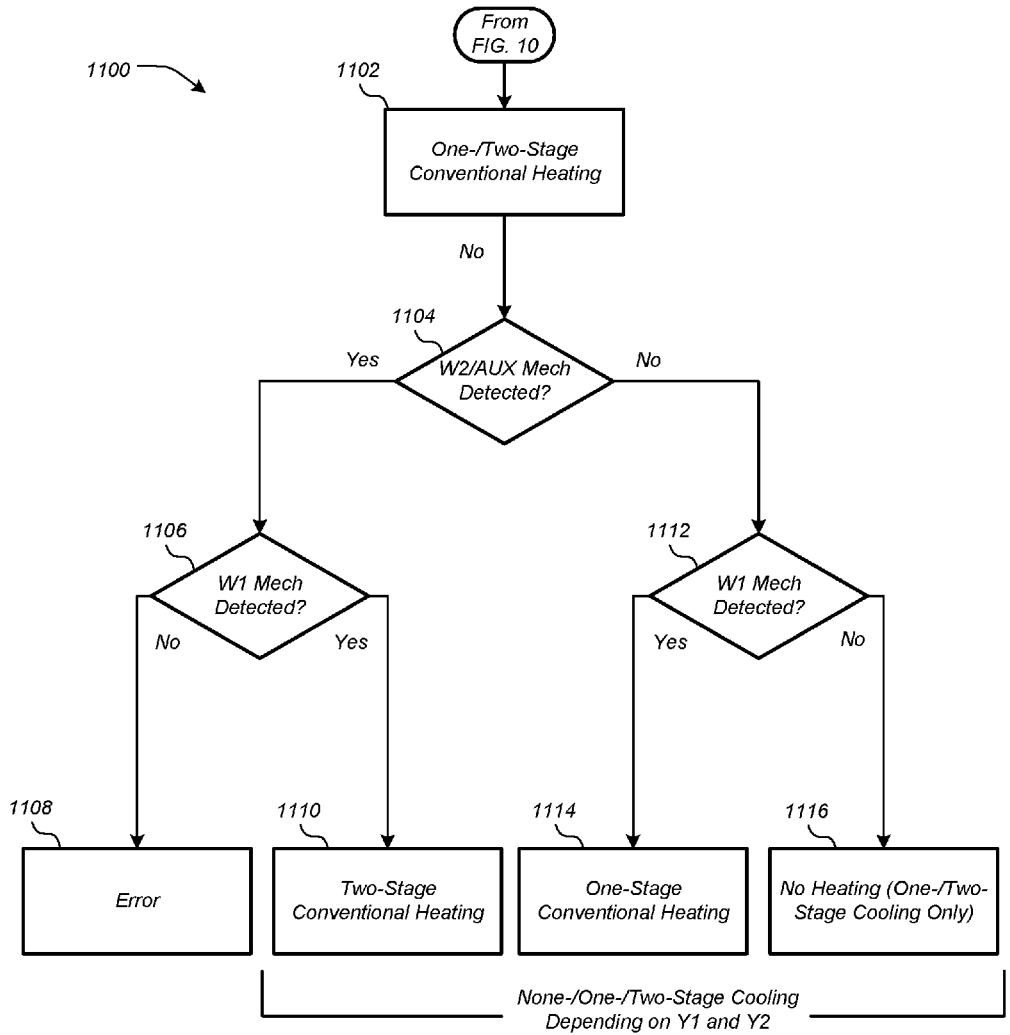
FIG. 11 illustrates a flowchart of a method for determining an HVAC system configuration for one-stage or two-stage conventional heating, according to one embodiment.

One-stage or two-stage conventional heating systems can be detected by continuing on from flowchart 1000 at step 1010. FIG. 11 illustrates a flowchart 1100 of a method for determining an HVAC system configuration for one-stage or two-stage conventional heating, according to one embodiment. As previously detected, based on the absence of a wire in the W3 connector, it may be determined a one-stage or two-stage conventional heating HVAC system configuration may be present (1102).

Next, it may be determined whether a wire is mechanically detected at the W2/AUX connector of the thermostat (1104), as well as whether a wire is mechanically detected at the W1 connector of the thermostat (1106, 1112). If a W2/AUX wire is detected without a W1 wire, then an error may be displayed on the user interface that additional wires may be required because the W2/AUX wire has been detected by itself (1108). If a W2/AUX wire and a W1 wire are both detected, then a two-stage conventional heating system may be determined to be present (1110). Depending on the presence of the Y1 and Y2 wires, either a one-stage or a two-stage cooling system may also be present. If no W2/AUX wire is connected, but a W1 wire is connected, then an error may be present. Again, depending on the presence of the Y1 and Y2 wires, either a one-stage or a two-stage cooling system may also be present. Finally, if neither a W2/AUX wire or a W1 wire are connected, then depending upon the presence of the Y1 and Y2 wires, either a one-stage or a two-stage cooling system may be present without a heating system.

Figure 12:
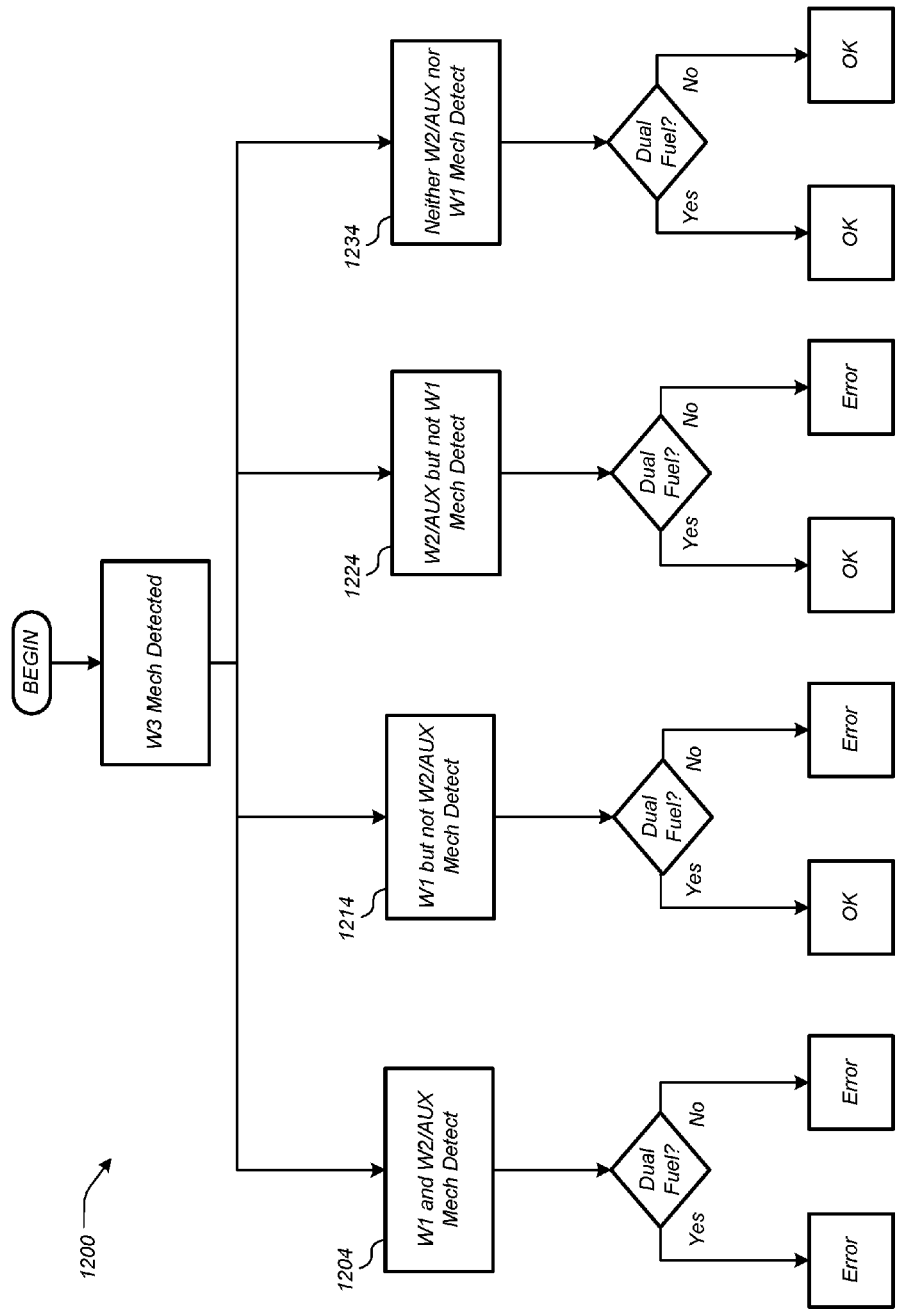
FIG. 12 illustrates a flowchart of a method for determining an HVAC system configuration for a heat pump system with a W3 wire connection, according to one embodiment.

Turning back briefly to FIG. 9, if an O/B wire was mechanically detected, then a heat pump system was determined to be connected to the thermostat. Assuming that a connection was also made to the Y1 connector, it could be assumed that either a single-fuel system or a dual-fuel system configuration was present. FIG. 12 illustrates a flowchart 1200 of a method for determining an HVAC system configuration for a heat pump system with the W3 wire connection (continuing from step 914 of FIG. 9), according to one embodiment. After detecting the W3 wire, it may next be determined whether connections are made to the W2/AUX connector and/or the W1 connector (1204, 1214, 1224, 1234).

The next step in the method can be modified to include inputs other than mechanical wire connections. In this particular embodiment, a user interface may be configured to present a user with an interview-style question(s) to determine whether the heat pump is single-fuel or dual-fuel. Depending upon one or more inputs provided to the user interface in response to the interview style question(s), the thermostat may then determine whether a final HVAC system configuration can be determined, or whether an error message should be presented on the user interface.

Figure 13:
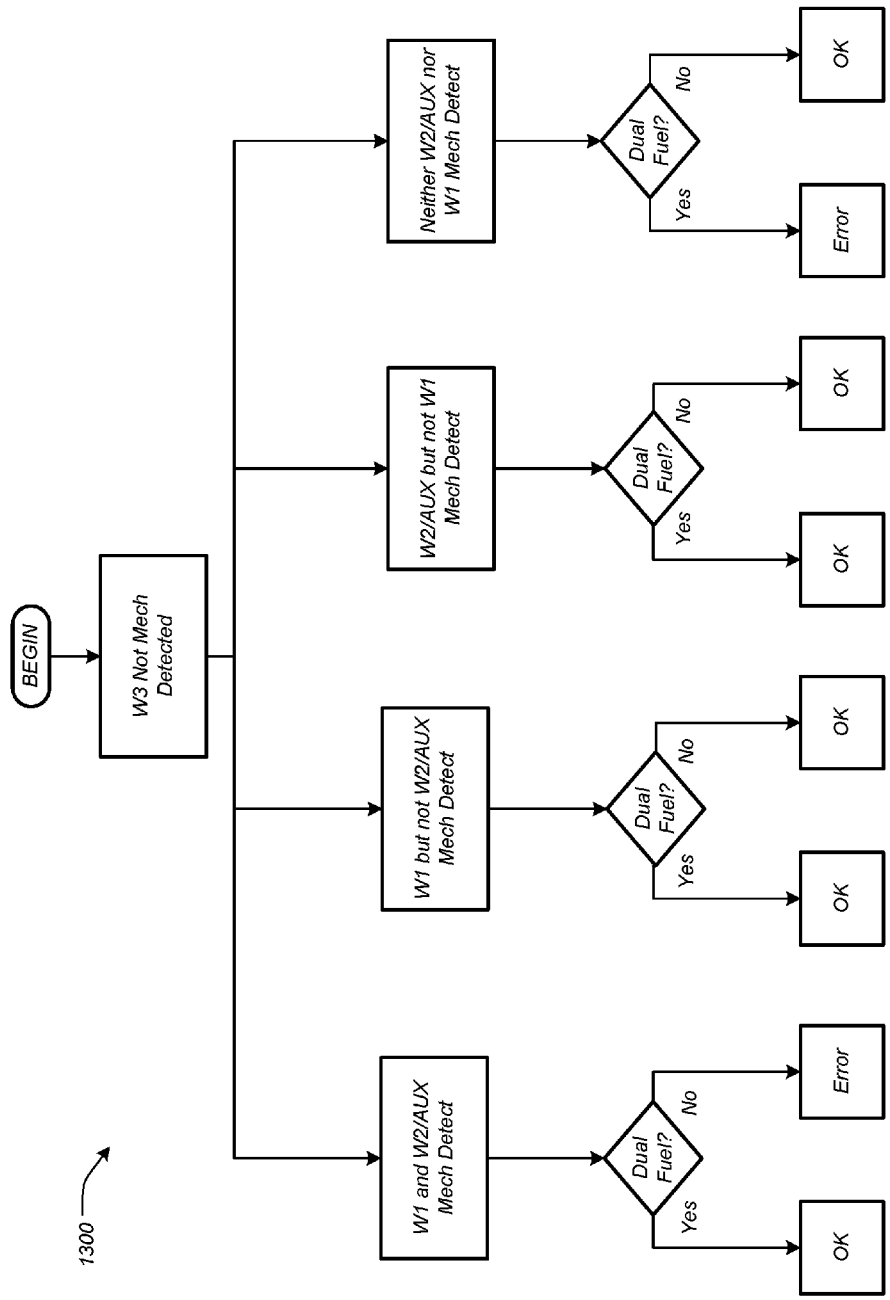
FIG. 13 illustrates a flowchart of a method for determining an HVAC system configuration for a heat pump system without the W3 wire connection, according to one embodiment.

Similarly, FIG. 13 illustrates a flowchart 1300 of a method for determining an HVAC system configuration for a heat pump system without the W3 wire connection (continuing from step 912 of FIG. 9), according to one embodiment. Again, a user interface may be configured to present a user with an interview-style question(s) to determine whether the heat pump is single-fuel or dual-fuel. Depending upon one or more inputs provided to the user interface in response to the interview style question(s), the thermostat may then determine whether a final HVAC system configuration can be determined, or whether an error message should be presented on the user interface.

It will be understood that numerous details and decisions may have been omitted from the flowcharts illustrated in FIGS. 9-13 for brevity. For example, instead of illustrating final HVAC system configurations in flowchart 1200, an indication of whether a final system configuration could be determined was presented. One having skill in the art could use the flowcharts and discussion included herein to readily fill in the remaining details. For convenience and to provide an enabling disclosure, listed below is an exemplary pseudo-code implementation of these flowcharts that may be implemented by any digital or analog computing or processing system. Of course, many other specific implementations would be readily understood in light of this disclosure, and this example could be edited or altered depending on the particular embodiment, location, and/or HVAC system.

HVAC CONTROL WIRE CHECK [O/B, W1, W2/AUX, W3, Y1, Y2, E]

a. O/B detected mechanically
i. Y1 not detected mechanically [Error]
ii. Y1 detected mechanically
  1. W3 detected mechanically
    a. W1 and W2/AUX detected mechanically
      i. Dual fuel selected [Error]
        1. O/B, Y1, W3, W1, W2/AUX [one-stage heat pump heating and cooling with three-stage conventional heating]
        2. O/B, Y1, W3, W1, W2/AUX, Y2 [two-stage heat pump heating and cooling with three-stage conventional heating]

ii. Dual fuel not selected [Error]
   1. O/B, Y1, W3, W1, W2/AUX [one-stage heat pump heating and cooling with three-stage electric strip heating]
   2. O/B, Y1, W3, W1, W2/AUX, Y2 [two-stage heat pump heating and cooling with three-stage electric strip heating]
b. W1 detected mechanically but W2/AUX not detected mechanically
  i. Dual fuel selected [OK]
    1. O/B, Y1, W3, W1 [one-stage heat pump heating and cooling with two-stage conventional heating]
    2. O/B, Y1, W3, W1, Y2 [two-stage heat pump heating and cooling with two-stage conventional heating]
  ii. Dual fuel not selected [Error]
    1. O/B, Y1, W3, W1 [one-stage heat pump heating and cooling with two-stage electric strip heating]
    2. O/B, Y1, W3, W1, Y2 [two-stage heat pump heating and cooling with two-stage electric strip heating]
c. W2/AUX detected mechanically but W1 not detected mechanically
  i. Dual fuel selected [OK]
    1. O/B, Y1, W3, W2/AUX [one-stage heat pump heating and cooling with two-stage conventional heating]
    2. O/B, Y1, W3, W2/AUX, Y2 [two-stage heat pump heating and cooling with two-stage conventional heating]
  ii. Dual fuel not selected [Error]
    1. O/B, Y1, W3, W2/AUX [one-stage heat pump heating and cooling with two-stage electric strip heating]
    2. O/B, Y1, W3, W2/AUX, Y2 [two-stage heat pump heating and cooling with two-stage electric strip heating]
d. Neither W1 nor W2/AUX detected mechanically
  i. Dual fuel selected [OK]
    1. O/B, Y1, W3 [one-stage heat pump heating and cooling with one-stage conventional heating]
    2. O/B, Y1, W3, Y2 [two-stage heat pump heating and cooling with one-stage conventional heating]
  ii. Dual fuel not selected [OK]
    1. O/B, Y1, W3 [one-stage heat pump heating and cooling with one-stage electric strip heating]
    2. O/B, Y1, W3, Y2 [two-stage heat pump heating and cooling with one-stage electric strip heating]

2. W3 not detected mechanically
  a. W1 and W2/AUX detected mechanically
    i. Dual fuel selected [OK]
      1. O/B, Y1, W1, W2/AUX [one-stage heat pump heating and cooling with two-stage conventional heating]
      2. O/B, Y1, W1, W2/AUX, Y2 [two-stage heat pump heating and cooling with two-stage conventional heating]
      3. O/B, Y1, W1, W2/AUX, E [one-stage heat pump heating and cooling with two-stage conventional heating and emergency heating]
      4. O/B, Y1, W1, W2/AUX, Y2, E [two-stage heat pump heating and cooling with two-stage conventional heating and emergency heating]
    ii. Dual fuel not selected [Error]
      1. O/B, Y1, W1, W2/AUX [one-stage heat pump heating and cooling with two-stage electric strip heating]
      2. O/B, Y1, W1, W2/AUX, Y2 [two-stage heat pump heating and cooling with two-stage electric strip heating]
      3. O/B, Y1, W1, W2/AUX, E [one-stage heat pump heating and cooling with two-stage electric strip heating and emergency heating]
      4. O/B, Y1, W1, W2/AUX, Y2, E [two-stage heat pump heating and cooling with two-stage electric strip heating and emergency heating]
  b. W1 detected mechanically but W2/AUX not detected mechanically
    i. Dual fuel selected [OK]
      1. O/B, Y1, W1 [one-stage heat pump heating and cooling with one-stage electric strip heating]
      2. O/B, Y1, W1, Y2 [two-stage heat pump heating and cooling with one-stage electric strip heating]
      3. O/B, Y1, W1, E [one-stage heat pump heating and cooling with one-stage electric strip heating and emergency heating]
      4. O/B, Y1, W1, Y2, E [two-stage heat pump heating and cooling with one-stage electric strip heating emergency heating]
    ii. Dual fuel not selected [OK]
      1. O/B, Y1, W1 [one-stage heat pump heating and cooling with 1. one-stage conventional heating]
      2. O/B, Y1, W1, Y2 [two-stage heat pump heating and cooling with one-stage conventional heating]
      3. O/B, Y1, W1, E [one-stage heat pump heating and cooling with one-stage conventional heating and emergency heating]
      4. O/B, Y1, W1, Y2, E [two-stage heat pump heating and cooling with one-stage conventional heating emergency heating]
  c. W2/AUX detected mechanically but W1 not detected mechanically
    i. Dual fuel selected [OK]
      1. O/B, Y1, W2/AUX [one-stage heat pump heating and cooling with one-stage electric strip heating]
      2. O/B, Y1, W2/AUX, Y2 [two-stage heat pump heating and cooling with one-stage electric strip heating]
      3. O/B, Y1, W2/AUX, E [one-stage heat pump heating and cooling with one-stage electric strip heating and emergency heating]
      4. O/B, Y1, W2/AUX, Y2, E [two-stage heat pump heating and cooling with one-stage electric strip heating emergency heating]
    ii. Dual fuel not selected [OK]
      1. O/B, Y1, W2/AUX [one-stage heat pump heating and cooling with one-stage conventional heating]
      2. O/B, Y1, W2/AUX, Y2 [two-stage heat pump heating and cooling with one-stage conventional heating]
      3. O/B, Y1, W2/AUX, E [one-stage heat pump heating and cooling with one-stage conventional heating and emergency heating]
      4. O/B, Y1, W2/AUX, Y2, E [two-stage heat pump heating and cooling with one-stage conventional heating emergency heating]

d. Neither W1 nor W2/AUX detected mechanically
   i. Dual fuel selected [Error]
      1. O/B, Y1 [one-stage heat pump heating and cooling (but no conventional 1. heating)]
      2. 2. O/B, Y1, Y2 [two-stage heat pump heating and cooling (but no conventional heating)]
      3. O/B, Y1, E [one-stage heat pump heating and cooling with emergency heating (but no conventional heating)]
      4. O/B, Y1, Y2, E [two-stage heat pump heating and cooling with emergency heating (but no conventional heating)]
   ii. Dual fuel not selected [OK]
      1. O/B, Y1 [one-stage heat pump heating and cooling]
      2. O/B, Y1, Y2 [two-stage heat pump heating and cooling]
      3. O/B, Y1, E [one-stage heat pump heating and cooling with emergency heating]
      4. O/B, Y1, Y2, E [two-stage heat pump heating and cooling and emergency heating]
b. O/B not detected mechanically
i. E detected mechanically [Error]
ii. E not detected mechanically
   1. W3 detected mechanically
      a. W2/AUX not detected mechanically [Error]
      b. W2/AUX detected mechanically
         i. W1 not detected mechanically [Error]
         ii. W1 detected mechanically
            1. Y2 detected mechanically
               a. Y1 not detected mechanically [Error]
               b. Y1 detected mechanically [OK]
                  i. W3, W2/AUX, W1, Y2, Y1 [three-stage conventional heating and two-stage cooling]
            2. Y2 not detected mechanically [OK]
               a. W3, W2/AUX, W1 [three-stage conventional heating]
               b. W3, W2/AUX, W1, Y1 [three-stage conventional heating and one-stage cooling]
   2. W3 not detected mechanically
      a. W2/AUX detected mechanically
         i. W1 not detected mechanically [Error]
         ii. W1 detected mechanically
            1. Y2 detected mechanically
               a. Y1 not detected a. mechanically [Error]
               b. Y1 detected mechanically [OK]
                  i. W2/AUX, W1, Y2, Y1 [two-stage conventional heating and two-stage cooling]
            2. Y2 not detected mechanically [OK]
               a. W2/AUX, W1 [two-stage conventional heating]
               b. W2/AUX, W1, Y1 [two-stage conventional heating and one-stage cooling]
      b. W2/AUX not detected mechanically
         i. W1 detected mechanically
            1. Y2 detected mechanically
               a. Y1 not detected mechanically [Error]
               b. Y1 detected mechanically [OK]
                  i. W1, Y2, Y1 [one-stage conventional heating and two-stage cooling]
            2. Y2 not detected mechanically [OK]
               a. W1 [one-stage heating]
               b. W1, Y1 [one-stage heating and one-stage cooling]
         ii. W1 not detected mechanically
            1. Y1 not detected mechanically [Error]
            2. Y1 detected mechanically [OK]
               a. Y1 [one-stage cooling]
               b. Y1, Y2 [two-stage cooling]

USER INTERFACE

During the process of determining whether an HVAC system configuration can be determined, the thermostat may ascertain that the wires mechanically connected to the wiring connectors form an invalid combination that is not supported by the thermostat. In these cases, a user interface of the thermostat may be used to provide an output. The output may indicate that there is an error with the wiring configuration. The output may also indicate possible solutions for the error, the severity of the error, external references that may be consulted to solve the error, and/or possible effects of the error.

FIG. 14A illustrates a user interface of a thermostat for providing an output describing a wiring error, according to one embodiment. Here, a user may have previously made wire connections to the wire connectors of the thermostat before turning the thermostat on. The thermostat may run through a hardware or software implementation of the logic and flowcharts described elsewhere herein to determine whether an HVAC system configuration can be determined. In this example, a wire may be mechanically detected at the Rc connector. The thermostat may determine that at least a Y1 or a W1 wire is necessary to run a valid HVAC system. In response, a wiring report 1402 may be presented on the user interface. The wiring report 1402 may include an error code 1404 as well as a message 1406 providing additional information about the error condition. For example, the message 1406 may explain that no heating or cooling wires were detected, and that at least a Y1 or a W1 wire is required. Additionally, the wiring report 1402 may include a reference 1408 to an external data source where more information regarding the error condition may be found, such as a website.

Often, users may be installing their new thermostat by themselves without the aid or advice of a professional HVAC installer. Therefore, additional information may be provided on the user interface in order to simplify the installation process. For example, pictures of the wiring condition may be provided to the user along with graphical representations and/or animations that illustrate how the error may be diagnosed and/or solved. FIG. 14B illustrates a user interface of a thermostat providing a graphical output of mechanical wiring connections that have been detected, according to one embodiment. Here, each of a plurality of HVAC wire connectors 1410 may be illustrated for user. For example, the plurality of HVAC wire connectors 1410 may be arranged graphically on the user interface to match the actual physical arrangement provided by the thermostat. Notice that the plurality of HVAC connectors 1410 displayed by the user interface are arranged similarly to the physical arrangement shown in FIG. 7A. In this case, the connectors are arranged radially along the perimeter of the thermostat. In other embodiments, they may be arranged in a grid pattern, and oval pattern, or any other arrangement.

The user interface can show an electrical connection made for each of the plurality of HVAC wire connectors 1410. For example, electrical connection 1412 made to the Rc wire connector shows that a power wire has been electrically sensed at the connector. Furthermore, the wire connectors that are implicated by the error may also be highlighted. For example, the Y1 and the W1 connectors may have a different color, outline, or other such indicator arranged to draw a user's attention to those connectors. In this embodiment, a color or shading of the connectors implicated by the error has been altered compared to the connectors not responsible for or related to the error in the graphic display.

These types of informative and instructive user interfaces may become even more important as the wiring configurations become more complex. FIG. 15A illustrates a user interface of a thermostat providing a graphical output of multiple wiring connections, according to one embodiment. As before, a wiring report 1502, an error code 1504, a message 1506, and a reference 1508 may be provided by the user interface. In this case, the message 1506 may inform a user that additional wires are connected in addition to the AUX/W2 wire. This may correspond to a case similar to that of step 1034 of FIG. 10, where a conventional HVAC system is detected with an AUX/W2 connection without a W1 connection.

FIG. 15B illustrates a corresponding user interface of a thermostat providing a graphical wiring diagram, according to one embodiment. Here, the plurality of HVAC wire connectors 1510 may show connections 1512 that have been mechanically detected. Here, valid connections have been made to the Y1 connector, the Rc connector, and the W2/AUX connector. Additionally, the graphical representation of the W1 connector may be highlighted such that the user may match the graphical representation to the actual HVAC connector layout and remedy the error by making the proper connection.

Figure 16A:
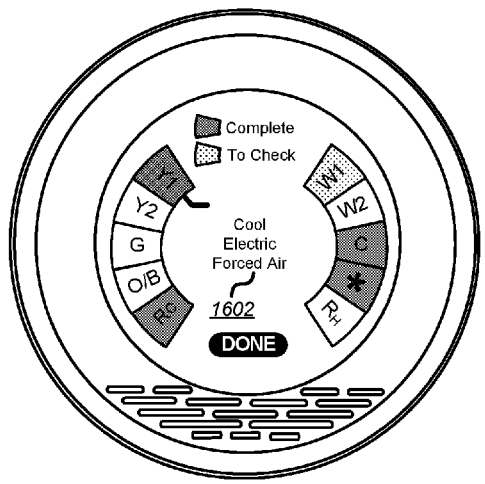
FIG. 16A illustrates a user interface of a thermostat providing a graphical description of a current wiring configuration, according to one embodiment.

In addition to providing information related to installation and wiring errors, the user interface may also be configured to provide valid configuration information to the user. FIG. 16A illustrates a user interface of a thermostat providing a graphical description of a current wiring configuration, according to one embodiment. In this embodiment, each wire at which a mechanical connection is detected may be selected using the user interface in order to bring up additional information related to that connection. For instance, the user interface may allow a user to cycle through each connection and verify that it is being interpreted correctly by the thermostat. Each connection may be color-coded or otherwise highlighted to show users connections that have been checked and connections that still need to be checked.

In this example, a message 1602 may be displayed for each connection describing how the thermostat is interpreting the connection. For instance, the Y1 connection may be interpreted by the thermostat to control an electric air conditioner using forced air. If a user determines that this is an incorrect interpretation of the wiring connection, the user may select the Y1 connection using the user interface and navigate to a screen providing interactive options for changing the way the Y1 connection is interpreted.

Figure 16B:
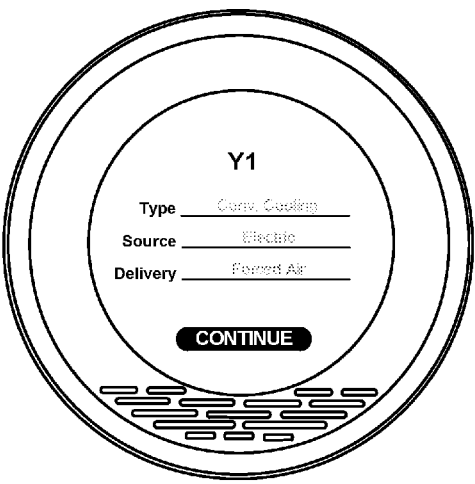
FIG. 16B illustrates a thermostat user interface providing additional information for a particular connector, according to one embodiment.

FIG. 16B illustrates a thermostat user interface providing additional information for a particular connector, according to one embodiment. If a user selects the Y1 connection in the previous interface, the interface of FIG. 16B may show that the thermostat will operate according to the displayed characteristics of the Y1 wire. Assuming that no O/B wire is connected, the Y1 wire may be construed to operate a conventional cooling system. The source may be electrical, and the cooling system may operate with a forced air delivery. In some cases where multiple options are available, a user may select either the source, type, or delivery associated with the Y1 wire and choose a different option from a menu that may be displayed on the user interface.

The user interface may also be adaptable such that it can handle many different types of HVAC system configurations. Some HVAC systems may include additional wires that are not specifically labeled on the HVAC connectors of the thermostat. Additional features such as radiant floor heating, humidifiers, dehumidifiers, emergency heating systems, second stages for heating and cooling systems, and/or the like may be numerous, and thus it would be impractical to provide a dedicated wire connector for each option that may be rarely used. In order to handle these various additional options, certain embodiments described herein will include a wildcard connector labeled with, for example, an asterisk or a star. The thermostat function associated with this connector may be configured by a user using the user interface to handle one of the many various optional HVAC features that may be available.

Figure 17A:
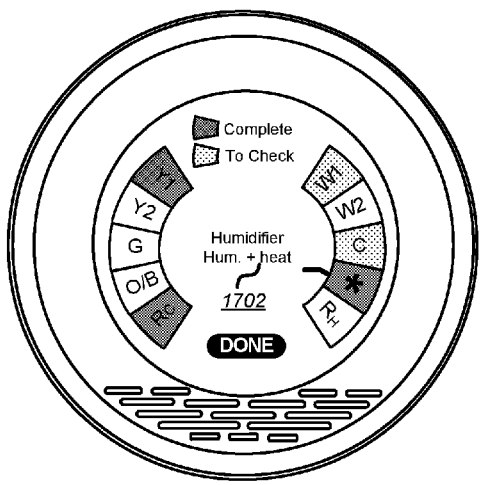
FIG. 17A illustrates a thermostat with a user interface displaying a connection to a wildcard connector, according to one embodiment.

FIG. 17A illustrates a thermostat with a user interface displaying a connection to the wildcard connector, according to one embodiment. In this embodiment, the user interface may display a currently selected function 1702 when the wildcard connector is selected. In this case, the wildcard connector is configured to operate a bypass humidifier (i.e. a humidifier that requires concurrent heat). In this particular embodiment, the functions associated with the wildcard connector are displayed as part of a check routine for each connector. Generally, if a wire is connected to the wildcard connector, the thermostat may provide a graphical display similar to that of FIG. 17A such that the user can configure the function of the wildcard connector before the thermostat begins operating. This may take place during an installation routine.

Figure 17B:
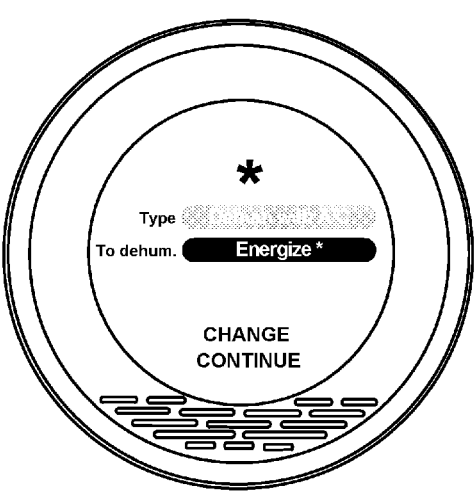
FIG. 17B illustrates a thermostat with a user interface displaying a configuration screen for the wildcard connector, according to one embodiment.

FIG. 17B illustrates a thermostat with a user interface displaying a configuration screen for the wildcard connector, according to one embodiment. In this case, the user interface may be used to change the function of the wildcard connector to a dehumidifier used with the air conditioner (i.e. an air conditioner with a dehumidifying mode). The dehumidifier may be activated by energizing the wildcard connector. Both of these settings, along with other settings that may not be shown explicitly, may be changed using this or a similar user interface.

The user interfaces provided thus far may allow users to make both simple and complex changes to the way their thermostat interacts with their HVAC system. These user interfaces may provide a simplified process that enables the average homeowner to perform even difficult installation procedures. However, in some cases the installation process may become too difficult for the average homeowner. Modern HVAC systems may become very complex, and incorrect wiring may cause unexpected HVAC activity, uncomfortable environmental conditions, or even equipment damage.

In order to prevent these unpleasant outcomes, some embodiments may intelligently determine when an installation process or HVAC configuration may require a professional installer. This determination may be made while the thermostat is analyzing the mechanically-sensed wire connections. This determination may also be made while the thermostat is receiving configuration inputs from a user via the user interface. The thermostat may be configured to detect common errors, configurations that are known to cause damage, unknown configurations, or even user confusion. For example, a user making numerous changes throughout the installation process may be determined to be ill-equipped to confidently install his or her own thermostat without causing damage.

When a professional installation is considered to be desirable for a particular installation, the thermostat may provide a message on the user interface recommending a professional installer. Some embodiments may provide a reference to a website or to another resource for finding professional installers well-versed with the particular type of HVAC system and/or thermostat. A user may then heed the warning provided by the thermostat and contact the professional installer, or the user may override the warning and continue with the installation process.

Figure 18A:
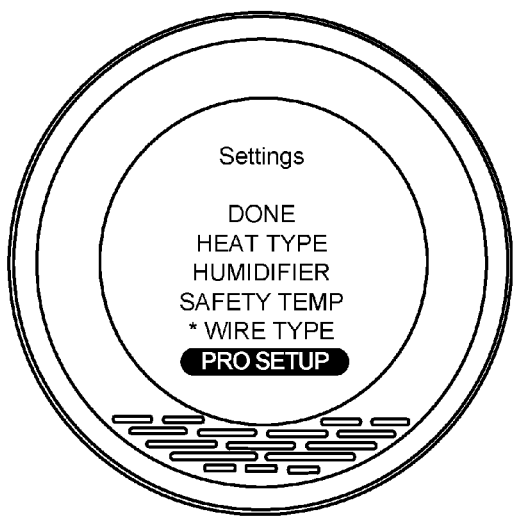
FIG. 18A illustrates a settings screen for accessing a professional setup interface.
Figure 18B:
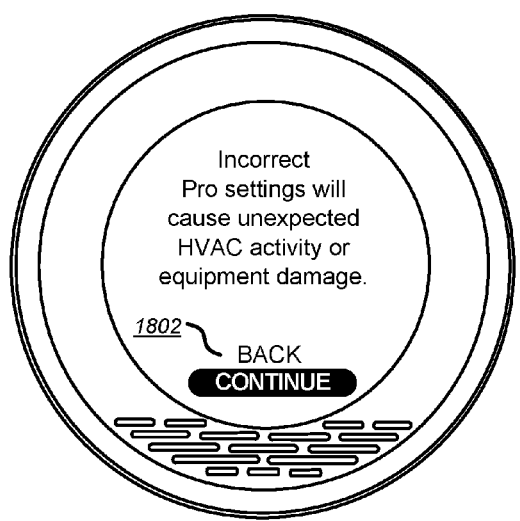
FIG. 18B illustrates a warning that may be displayed for professional setup, according to one embodiment.

Additionally, a user may be able to select professional setup. FIG. 18A illustrates a settings screen for accessing a professional setup interface. A professional setup interface may provide additional options that are not provided to a regular homeowner. These options may be segregated into the professional setup interface in order to simplify the installation process for a regular homeowner. Additionally, these options may be complex and may require special training and/or experience. In one embodiment, a warning may be presented to a user when selecting the professional setup interface. FIG. 18B illustrates a warning that may be displayed for professional setup, according to one embodiment. For example, a warning may provide a description of the dangers of proceeding with the professional setup interface without proper training. The interface may also provide an option 1802 allowing the user to continue with the professional setup interface or to go back to the regular setup interface.

Figure 19:
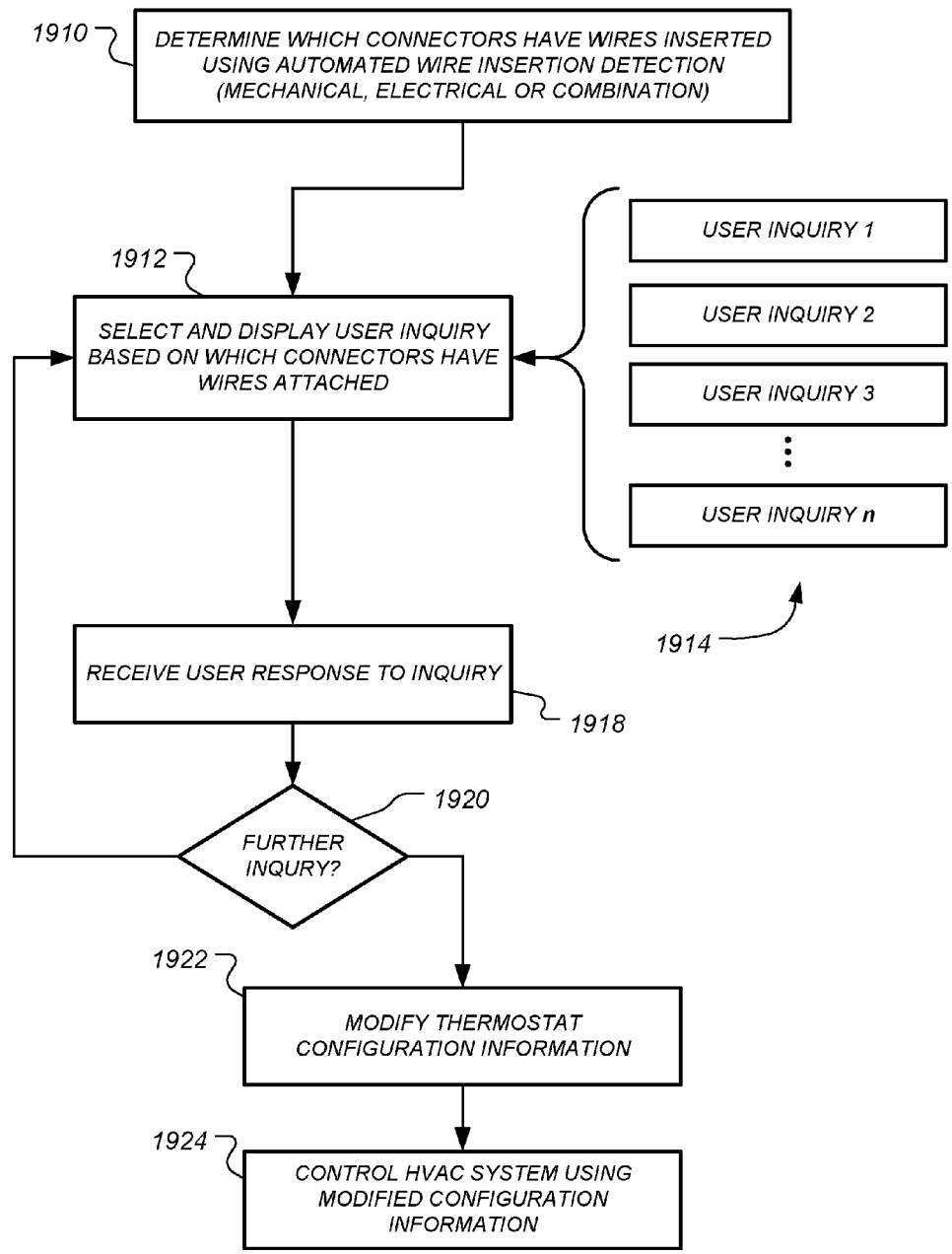
FIG. 19 is a flowchart illustrating aspects of a method for installing and configuring a thermostat, according to some embodiments.
Figure 20:
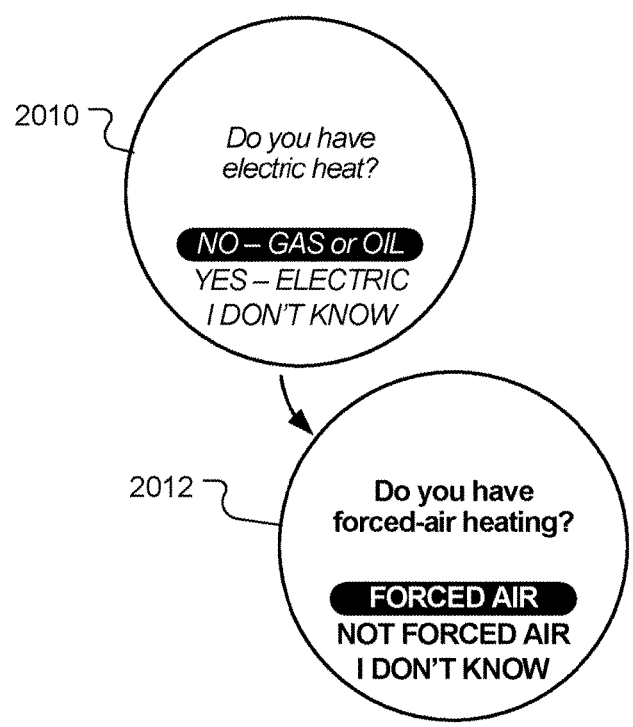
FIG. 20 illustrates examples of two user inquiries relating to heating systems that can be selected and displayed to a user, according to one embodiment.

FIG. 19 is a flowchart illustrating aspects of a method for installing and configuring a thermostat, according to some embodiments. It has been found that the user installation experience can be significantly enhanced through the use of customized selected presentation of inquiries based on available information. In particular, it has been found that the user installation experience can be greatly enhanced by presenting the user with questions that pertain to the particular types of HVAC configurations that are possible or likely based on the automated wire insertion technology as described herein. In step 1910, the automated wire insertion technology, which can be either mechanical detection, electronic detection, or a combination of both is used to determine which of the HVAC wire connectors have wires connected thereto. In step 1912, a selection is made from a number of possible user inquiries 1914 used to resolve configuration ambiguities as described herein. For example, if an O/B is not detected, in step 1910 then it is assumed that a "conventional" HVAC system is being connected to the thermostat, and therefore user inquiries regarding configurations of heat pumps are not selected for display to a user, thus greatly simplifying user's installation process. In one example, O/B, if E, W3, and W2 wires are not detected, but Y1 and W1 wires are detected, it is determined as described above and shown in FIGS. 9-11 that the HVAC system is a conventional system with one-stage heating and one-stage cooling. However, according to some embodiments it is useful to know whether the type of heating, for example electric or fossil fuels, and whether it is radiant or forced air. In this case an inquiry such as shown in screen 2010 of FIG. 20 is presented to ask the user if the HVAC system uses electric heat. In step 1918 of FIG. 19, the user's response is received. If the user's response is to inquiry 2010 is "NO—GAS or OIL", then according to some embodiments in decision 1920 a it is decided that a further inquiry will be presented to further determine the type of heating system that is being connected to the thermostat. In this example, another selection is made in step 1912, this time selecting an inquiry such as shown in screen 2012 of FIG. 20, which asks the user if the HVAC system uses forced air. Based on the user's responses and the determined wire connections, in step 1922 of FIG. 19 the thermostat configuration information is modified and stored and in step 1924 the HVAC system is controlled using the modified configuration. Note that many other examples of user inquiries 1914 can be selected and displayed depending on the particular HVAC wire detection scenario at hand. In another example, if a wildcard connector labeled with, for example an asterisk as shown in FIG. 17A, then in step 1912 user inquiries relating to the wildcard connector can be selected an displayed. Thus, through the use of automatically detecting connected wires and selectively displaying relevant inquiries to the user and not displaying irrelevant inquiries, the user experience in installing the thermostat can be significantly streamlined.

The subject matter of this patent specification relates to the subject matter of the following commonly assigned applications, each of which is incorporated by reference herein: U.S. Ser. No. 13/034,678 filed Feb. 24, 2011; U.S. Ser. No. 13/038,191 filed Mar. 1, 2011; U.S. Ser. No. 13/656,189 filed Oct. 19, 2012; U.S. Ser. No. 13/467,029 filed May 8, 2012; U.S. Ser. No. 13/624,878 filed Sep. 21, 2012; and U.S. Ser. No. 13/632,133 filed Sep. 30, 2012. The above-referenced patent applications are collectively referenced herein as "the commonly assigned incorporated applications."

Whereas many alterations and modifications of the present invention will no doubt become apparent to a person of ordinary skill in the art after having read the foregoing description, it is to be understood that the particular embodiments shown and described by way of illustration are in no way intended to be considered limiting. By way of example, in some embodiments the described methods are advantageously combined with an automated delay, if necessary, for software updating from a cloud based service provider as described in U.S. Ser. No. 13/632,133, supra. Therefore, reference to the details of the preferred embodiments is not intended to limit their scope.

What is claimed is:

1. An electronic device, comprising:
a set of one or more wire connectors, wherein each wire connector of the set is configured to receive a wire connected with a remote system and each wire connector of the set of one or more wire connectors is associated with two or more possible functions;
a connection sensing module coupled with the set of one or more wire connectors, the connection sensing module configured to identify a wire connector of the set of one or more wire connectors with which a wire connected with the remote system has been connected; and
a processing system in communication with a user interface, the processing system being configured to be in communication with the remote system via the wire, the processing system configured to:
determine to provide a user inquiry based on the connection sensing module identifying the wire connector with which the wire connected with the remote system has been connected;
cause the user inquiry to be output via the user interface, the user inquiry requesting information for identifying a function of the wire;
receive a response to the user inquiry via the user interface; and
operate the electronic device based on the response to the user inquiry and the connection sensing module identifying the wire connector with which the wire has been connected.

2. The electronic device of claim 1, further comprising an electronic display wherein the user interface is presented on the electronic display of the electronic device.

3. The electronic device of claim 1, wherein the user interface is presented via a computerized device distinct from the electronic device.

4. The electronic device of claim 1, wherein the connection sensing module comprises a detection switch, the detection switch mechanically detecting a presence of the wire.

5. The electronic device of claim 1, further comprising:
a second set of one or more single-function wire connectors each configured to receive a wire, wherein:
each wire connector of the second set of one or more single-function wire connectors is associated with a single function;
the connection sensing module is coupled with the second set of single-function wire connectors, the connection sensing module configured to identify a single-function wire connector of the second set of single-function wire connectors with which a second wire connected with the remote system has been connected; and
the processing system is further configured to operate the electronic device based on the connection sensing module identifying the single-function wire connector with which the wire has been connected.

6. The electronic device of claim 5, wherein:
the electronic device is a thermostat;
the single-function wire connector is a single-function HVAC (heating, ventilation, and air conditioning) connector; and
the wire connector is a multi-function HVAC terminal.

7. The electronic device of claim 1, wherein the user interface presents a photographic representation of the set of one or more wire connectors that indicates wire connectors having connected wires that have been detected by the connection sensing module.

8. The electronic device of claim 1, wherein the user interface presents a graphical representation of the set of one or more wire connectors that indicates wire connectors having connected wires that have been detected by the connection sensing module.

9. The electronic device of claim 5, wherein:
the connection sensing module coupled with the set of one or more wire connectors and the set of one or more single-function wire connectors identifies a different arrangement of one or more wires connected with the set of one or more wire connectors and the set of one or more single-function wire connectors; and
the processing system is further configured to operate the electronic device based on the connection sensing module identifying the different arrangement of the one or more wires connected with the set of one or more wire connectors and the set of one or more single-function wire connectors without presenting a corresponding user inquiry due to no configuration ambiguity being present.

10. The electronic device of claim 1, wherein the connection sensing module comprises an electrical sensor, the electrical sensor electrically detecting a presence of the wire connected with the wire connector.

11. The electronic device of claim 1, wherein the processing system is further configured to operate the electronic device based on one or more inferences identified based on previous operation of the electronic device.

12. A method for installing an electronic device, comprising:
determining, by the electronic device, which wire connectors of a set of one or more wire connectors have a wire attached, wherein each wire connector of the set is configured to receive a wire and each wire connector of the set of one or more wire connectors is associated with two or more possible functions;
determining to output a user inquiry based on the electronic device identifying the wire connector with which the wire has been connected;
causing the user inquiry to be output via a user interface, the user inquiry requesting information for identifying a function of the wire;
receiving a response to the user inquiry via the user interface; and
operating the electronic device based on the response to the user inquiry received via the user interface and the electronic device identifying the wire connector with which the wire has been connected.

13. The method for installing the electronic device of claim 12, further comprising presenting, via an electronic display of the electronic device, the user interface comprising the user inquiry.

14. The method for installing the electronic device of claim 12, when the user interface is presented via a computerized device distinct from the electronic device.

15. The method for installing the electronic device of claim 12, wherein determining which wire connectors of the set of one or more wire connectors have a wire attached comprises determining whether a detection switch is mechanically actuated by the presence of a wire.

16. The method for installing the electronic device of claim 12, further comprising:
determining, by the electronic device, which single-function wire connectors of a second set of one or more single-function wire connectors have a wire attached, wherein each wire connector of the second set of one or more single-function wire connectors is associated with a single function; and
identifying a single-function wire connector of the second set of single-function wire connectors with which a second wire connected with the remote system has been connected; wherein operating the electronic device is further based on identifying the single-function wire connector with which the wire has been connected.

17. The method for installing the electronic device of claim 16, wherein:
the electronic device is a thermostat;
the remote system is an HVAC (heating, ventilation, and air conditioning) system;
the single-function wire connector is a single-function HVAC connector;
the wire connector is a multi-function HVAC terminal; and
operating the electronic device comprises the electronic device controlling activation of the HVAC system.

18. The method for installing the electronic device of claim 12, further comprising:
presenting, as part of the user interface, a photographic representation of the set of one or more wire connectors that indicates wire connectors with which wires have been connected.

19. The method for installing the electronic device of claim 12, further comprising:
presenting, as part of the user interface, a graphical representation of the set of one or more wire connectors that indicates wire connectors with which wires have been connected.

20. The method for installing the electronic device of claim 16, further comprising:
identifying a different arrangement of one or more wires inserted into the set of one or more wire connectors and the set of one or more single-function wire connectors; and
operating the electronic device based on the electronic device identifying the different arrangement of the one or more wires connected with the set of one or more wire connectors and the set of one or more single-function wire connectors without presenting a corresponding user inquiry due to no configuration ambiguity being present.

21. The method for installing the electronic device of claim 12, wherein determining which wire connectors of the set of one or more wire connectors have a wire connected comprises analyzing a measurement from an electrical sensor of the electronic device.

22. The method for installing the electronic device of claim 12, wherein operating the electronic device is further based on one or more inferences identified based on previous operation of the electronic device.

23. An electronic apparatus, comprising:
a wire terminal means configured to receive a wire corresponding to a remote system and the wire terminal means is associated with two or more possible functions;
a connection sensing means in communication with the wire terminal means, the connection sensing means configured to identify that the wire terminal means has the wire connected; and
a processing means in communication with a user interface means, the processing means configured to be in communication with the remote system via the wire, the processing means configured to:
determine to provide a user inquiry based on the connection sensing means identifying the wire terminal means with which the wire has been connected;
cause the user inquiry to be output via the user interface means, the user inquiry requesting information for identifying a function of the wire;
receive a response to the user inquiry via the user interface means; and
control the remote system based on the response to the user inquiry and the connection sensing means identifying the wire terminal means having the wire connected.

24. The electronic apparatus of claim 23, further comprising a display means wherein the user interface means is presented on the display means of the electronic apparatus.

25. The electronic apparatus of claim 23, wherein the user interface means is presented via a means remote and distinct from the electronic apparatus.

26. The electronic apparatus of claim 23, wherein the connection sensing apparatus comprises a detection switch, the detection switch mechanically detecting the wire being connected with the wire terminal means.

27. The electronic apparatus of claim 23, further comprising:
a single-function wire terminal means configured to receive a second wire, wherein:
the single-function wire terminal means is associated with a single function; and
the connection sensing means is coupled with the single-function wire terminal means, the connection sensing means configured to identify that a second wire has been connected with the single-function wire terminal means; and
the processing means is further configured to operate the electronic apparatus based on the connection sensing means identifying the single-function wire terminal means with which the second wire has been connected.

28. The electronic apparatus of claim 27, wherein:
the electronic apparatus is a thermostat;
the single-function wire terminal means is a single-function HVAC (heating, ventilation, and air conditioning) connector; and
the wire terminal means is a multi-function HVAC terminal.

29. The electronic apparatus of claim 23, wherein the user interface means presents a photographic representation of the wire terminal means that the wire has been connected with the wire terminal means.

30. The electronic apparatus of claim 23, wherein the user interface means presents a graphical representation of the wire terminal means that indicates the connected wire has been detected by the connection sensing means.

31. The electronic apparatus of claim 27, wherein:
the connection sensing means coupled with the wire terminal means and the single-function wire terminal means is further configured to identify a different arrangement of one or more wires being connected; and
the processing means is further configured to operate the electronic apparatus based on the connection sensing means identifying the different arrangement without presenting a corresponding user inquiry due to no configuration ambiguity being present.

32. The electronic apparatus of claim 23, wherein the connection sensing means comprises an electrical sensor, the electrical sensor electrically detecting the wire being connected with the wire terminal means.

33. The electronic apparatus of claim 23, wherein the processing means is further configured to operate the electronic apparatus based on one or more inferences identified based on previous operation of the electronic apparatus.

* * * * *

UNITED STATES PATENT AND TRADEMARK OFFICE
CERTIFICATE OF CORRECTION

PATENT NO. : 9,995,499 B2  
APPLICATION NO. : 15/400107  
DATED : June 12, 2018  
INVENTOR(S) : Anthony Michael Fadell et al.

Page 1 of 1

It is certified that error appears in the above-identified patent and that said Letters Patent is hereby corrected as shown below:

In the Claims  
Column 31, Line 47, Claim 9: after "the" insert --second--.  
Column 31, Line 50, Claim 9: after "the" insert --second--.  
Column 32, Line 41, Claim 16: delete "connected with the remote system".  
Column 32, Line 48, Claim 17: replace "the" with --the wire and the second wire are connected with a--.  
Column 32, Line 48, Claim 17: after "system" insert --that--.  
Column 33, Line 5, Claim 20: after "the" insert --second--.  
Column 33, Line 10, Claim 20: after "the" insert --second--.  
Column 34, Line 2, Claim 26: replace "apparatus" with --means--.

Signed and Sealed this  
Eighteenth Day of September, 2018

Andrei Iancu  
*Director of the United States Patent and Trademark Office*